US006856891B2

(12) United States Patent
Yasui

(10) Patent No.: US 6,856,891 B2
(45) Date of Patent: Feb. 15, 2005

(54) CONTROL APPARATUS, CONTROL METHOD AND ENGINE CONTROL UNIT

(75) Inventor: Yuji Yasui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/656,255

(22) Filed: Sep. 8, 2003

(65) Prior Publication Data

US 2004/0050034 A1 Mar. 18, 2004

(30) Foreign Application Priority Data

Sep. 12, 2002 (JP) .................................... 2002-267222

(51) Int. Cl.[7] ............................................ G06F 17/00

(52) U.S. Cl. ..................... 701/109; 701/106; 701/102; 701/101; 701/114; 123/688; 123/479; 73/118.1

(58) Field of Search ............................. 701/109, 106, 701/101, 102, 113, 114, 107; 123/688, 479; 73/118.1; 204/401

(56) References Cited

U.S. PATENT DOCUMENTS 5,325,711 A * 7/1994 Hamburg et al. .......... 73/118.1
5,365,216 A * 11/1994 Kotwicki et al. ........... 340/439
5,758,494 A * 6/1998 Davey ......................... 60/274
6,370,935 B1 * 4/2002 He et al. ...................... 73/1.34
6,564,543 B1 * 5/2003 Orzel et al. .................. 60/277
6,568,177 B1 * 5/2003 Surnilla ....................... 60/285

* cited by examiner

*Primary Examiner*—Willis R. Wolfe
*Assistant Examiner*—Johnny H. Hoang
(74) *Attorney, Agent, or Firm*—Squire, Sanders & Dempsey L.L.P.

(57) ABSTRACT

A control apparatus is provided for eliminating a step in a control input before and after switching between control processing based on one modulation algorithm selected from a Δ modulation algorithm, a ΔΣ modulation algorithm, and a ΣΔ modulation algorithm and control processing based on a response specified control algorithm to avoid a sudden change in the output of a controlled object in the event of the switching. The control apparatus comprises an ECU for calculating a predicted value for an output deviation, calculating a target air/fuel ratio in accordance with the predicted value based on the ΔΣ modulation algorithm and sliding mode control algorithm, selecting the target air/fuel ratio calculated based on one of the algorithms in accordance with a particular operating condition of an internal combustion engine, and switching the calculation of the target air/fuel ratio when the selection of the target air/fuel ratio is changed from the ΔΣ modulation algorithm to the sliding mode control algorithm if the absolute predicted value is equal to or less than a predetermined value.

6 Claims, 31 Drawing Sheets

FIG. 4

$$A=\begin{bmatrix} a1 & a2 \\ 1 & 0 \end{bmatrix} \quad \cdots\cdots (4)$$

$$B=\begin{bmatrix} b1 \\ 0 \end{bmatrix} \quad \cdots\cdots (5)$$

$$PREVO2(k)=\alpha 1\cdot VO2(k)+\alpha 2\cdot VO2(k-1)+\sum_{i=1}^{dt}\beta i\cdot DKCMD(k-i) \quad \cdots\cdots (6)$$

Where $\alpha 1$ :One-row, one-column element of $A^{dt}$;
$\alpha 2$ :One-row, two-column element of $A^{dt}$; and
$\beta i$ :One-row element of $A^{i-1}B$.

$$PREVO2(k)=\alpha 1\cdot VO2(k)+\alpha 2\cdot VO2(k-1)+\sum_{i=1}^{d'-1}\beta i\cdot DKCMD(k-i)+\sum_{j=d'}^{dt}\beta j\cdot DKACT(k-j) \quad \cdots\cdots (7)$$

Where $\beta j$ :One-row element of $A^{j-1}B$.

F I G. 5

$$\theta(k)=\theta(k-1)+KP(k)\cdot ide\_f(k) \quad \cdots\cdots (8)$$

$$\theta(k)^T=[a1'(k),\ a2'(k),\ b1'(k)] \quad \cdots\cdots (9)$$

$$ide\_f(k)=\frac{1}{n}\sum_{i=1}^{n} ide(i) \quad \cdots\cdots (10)$$

$$ide(k)=VO2(k)-VO2HAT(k) \quad \cdots\cdots (11)$$

$$VO2HAT(k)=\theta(k-1)^T\zeta(k) \quad \cdots\cdots (12)$$

$$\zeta(k)^T=[VO2(k-1),\ VO2(k-2),\ DKACT(k-d-dd)] \quad \cdots\cdots (13)$$

$$KP(k)=\frac{P(k)\,\zeta(k)}{1+\zeta(k)^T\,P(k)\,\zeta(k)} \quad \cdots\cdots (14)$$

$$P(k+1)=\frac{1}{\lambda_1}\left(I-\frac{\lambda_2 P(k)\,\zeta(k)\,\zeta(k)^T}{\lambda_1+\lambda_2\,\zeta(k)^T\,P(k)\,\zeta(k)}\right)P(k) \quad \cdots\cdots (15)$$

Where I is a unit matrix

FIG. 10

$$Usl(k) = Ueq(k) + Urch(k) + Uadp(k) \quad \cdots\cdots (26)$$

$$Ueq(k) = \frac{-1}{S1 \cdot b1}\{[S1 \cdot (a1-1) + S2] \cdot VO2(k+dt) + (S1 \cdot a2 - S2) \cdot VO2(k+dt-1)\} \quad \cdots\cdots (27)$$

$$Urch(k) = \frac{-F}{S1 \cdot b1} \cdot \sigma(k+dt) \quad \cdots\cdots (28)$$

$$Uadp(k) = \frac{-G}{S1 \cdot b1} \sum_{i=0}^{k+dt} \Delta T \cdot \sigma(i) \quad \cdots\cdots (29)$$

FIG. 11

$$\sigma PRE(k) = S1 \cdot PREVO2(k) + S2 \cdot PREVO2(k-1) \quad \cdots\cdots (30)$$

$$Usl(k) = Ueq(k) + Urch(k) + Uadp(k) \quad \cdots\cdots (31)$$

$$Ueq(k) = \frac{-1}{S1 \cdot b1}\{[S1 \cdot (a1-1) + S2] \cdot PREVO2(k) + (S1 \cdot a2 - S2) \cdot PREVO2(k-1)\} \quad \cdots\cdots (32)$$

$$Urch(k) = \frac{-F}{S1 \cdot b1} \cdot \sigma PRE(k) \quad \cdots\cdots (33)$$

$$Uadp(k) = \frac{-G}{S1 \cdot b1} \sum_{i=0}^{k} \Delta T \cdot \sigma PRE(i) \quad \cdots\cdots (34)$$

201

CONTROL APPARATUS, CONTROL METHOD AND ENGINE CONTROL UNIT

BACKGROUND OF THE INVENTION

1. Field of the Invention

The present invention relates to a control apparatus, a control method and an engine control unit which apply a controlled object with a control input calculated in accordance with a deviation of an output of the controlled object from a target value to converge the output of the controlled object to the target value, and more particularly, to a control apparatus, a control method and an engine control unit of this kind which are configured to calculate a control input by switching from calculation processing based on one of a Δ modulation algorithm, a ΔΣ modulation algorithm and a ΣΔ modulation algorithm, to calculation processing based on a response specified control algorithm, and vice versa.

2. Description of the Prior Art

The applicant has previously proposed a control apparatus of the type mentioned above for controlling an air/fuel ratio of an air/fuel mixture for an internal combustion engine, for example, in Japanese Patent Application No. 2001-400988. This control apparatus comprises an oxygen concentration sensor disposed downstream of a catalyzer in an exhaust passage of the internal combustion engine, an ADSM controller for controlling the air/fuel ratio of an air/fuel mixture in accordance with a control algorithm based on a ΔΣ modulation algorithm, and a PRISM controller for controlling the air/fuel ratio of the air/fuel mixture in accordance with a control algorithm based on a sliding mode control algorithm.

This control apparatus executes the air/fuel ratio control using the ADSM controller and PRISM controller, one of which is selected in accordance with a particular operating condition of the internal combustion engine. More specifically, the ADSM controller relies on the control algorithm based on the ΔΣ modulation algorithm to calculate a target air/fuel ratio in accordance with a deviation of an output of the oxygen concentration sensor from a predetermined target value for converging the output of the oxygen concentration sensor to the target value, and controls the air/fuel ratio of the air/fuel mixture in accordance with the target air/fuel ratio thus calculated. The PRISM controller in turn relies on the control algorithm based on the sliding mode control algorithm to calculate a target air/fuel ratio in accordance with a deviation of the output of the oxygen concentration sensor from a predetermined target value for converging the output of the oxygen concentration sensor to the target value, and controls the air/fuel ratio of the air/fuel mixture in accordance with the target air/fuel ratio thus calculated.

With the air/fuel ratio control conducted by the ADSM controller or PRISM controller, the output of the oxygen concentration sensor is controlled to converge to the target value, thereby maintaining a high exhaust gas purification percentage of the catalyzer in consequence. In this event, with the air/fuel ratio control conducted by the ADSM controller, when the output of the oxygen concentration sensor is richer than the target value (i.e., exhaust gases supplied to the catalyzer is richer), the ADSM controller controls the air/fuel ratio of the air/fuel mixture such that the output of the oxygen concentration sensor converges to the target value at a lower rate than when the output of the oxygen concentration sensor is leaner than the target value. When the air/fuel ratio of the air/fuel mixture is controlled to rapidly converge the output of the oxygen concentration sensor, which is richer than the target value, to the target value, the target air/fuel ratio is set to a leaner value, thereby supplying the catalyzer with exhaust gases the air/fuel ratio which is made rapidly leaner. As a result, the NOx purification percentage is degraded due to an extremely lean catalyst in an upstream region of the catalyzer. The aforementioned control strategy is taken for preventing such degradation of the NOx purification percentage.

According to the conventional air/fuel ratio control apparatus described above, in the event of switching from the air/fuel ratio control conducted by the ADSM controller to the air/fuel ratio control conducted by the PRISM controller, if the output of the oxygen concentration sensor has been much richer than the target value before the switching, the PRISM controller sets the target air/fuel ratio as the control input to a leaner value than the value calculated by the ADSM controller after the switching of the air/fuel ratio control with the intention that the output of the oxygen concentration sensor converges to the target value at a rate higher than the ADSM controller. This setting can cause a sudden and large change of the air/fuel ratio of the air/fuel mixture toward the lean side, resulting in a step before and after the switching. As a result, the NOx purification percentage can be degraded due to the excessively lean catalyst in the upstream region of the catalyzer. This is because the PRISM controller employs the sliding mode control algorithm, which is one type of response specified control algorithm, to converge the output of the oxygen concentration sensor to the target value at a higher rate than the ADSM controller, thereby improving the accuracy of the air/fuel ratio control.

SUMMARY OF THE INVENTION

The present invention has been made to solve the foregoing problem, and it is an object of the invention to provide a control apparatus, a control method and an engine control unit for controlling a controlled object such that its output converges to a target value by switching from calculation processing based on one of a Δ modulation algorithm, a ΔΣ modulation algorithm and a ΣΔ modulation algorithm, to calculation processing based on a response specified control algorithm, and vice verse, so that a step (sudden change) in a control input can be eliminated before and after the switching from one control processing to the other to avoid a sudden change in the output of the controlled object in the event of such switching.

To achieve the above object, according to a first aspect of the present invention, there is provided a control apparatus which is characterized by comprising deviation calculating means for calculating a deviation of an output of a controlled object from a predetermined target value; first control input calculating means for calculating a control input to the controlled object for converging the output of the controlled object to the target value in accordance with the calculated deviation based on one modulation algorithm selected from a Δ modulation algorithm, a ΔΣ modulation algorithm, and a ΣΔ modulation algorithm; second control input calculating means for calculating a control input to the controlled object for converging the output of the controlled object to the target value in accordance with the calculated deviation based on a response specified control algorithm; detecting means for detecting a state of the controlled object; selecting means for selecting one of the first and second control input calculating means in accordance with the detected state of the controlled object as control input calculating means; and switching means responsive to a change in the control input calculating means selected by the selecting means from one of the first and second control input calculating means to the other for switching from the one control input calculating means to the other control input calculating means when the calculated deviation falls within a predetermined range.

According to this control apparatus, the first control input calculating means calculates a control input to the controlled object for converging the output of the controlled object to the target value in accordance with the deviation of the output of the controlled object from the predetermined target value based on one modulation algorithm selected from a Δ modulation algorithm, a ΔΣ modulation algorithm, and a ΣΔ modulation algorithm, and the second control input calculating means calculates a control input to the controlled object for converging the output of the controlled object to the target value in accordance with the deviation of the output of the controlled object from the predetermined target value based on a response specified control algorithm. Also, the selecting means selects one of the first and second control input calculating means in accordance with the detected state of the controlled object as control input calculating means, and the switching means is responsive to a change in the control input calculating means selected by the selecting means from one of the first and second control input calculating means to the other for switching from the one control input calculating means to the other control input calculating means when the calculated deviation falls within a predetermined range. Generally, in the Δ modulation algorithm, ΔΣ modulation algorithm, and ΣΔ modulation algorithm, a control input calculated thereby repeats inversions between a predetermined upper limit value and lower limit value. In the response specified control algorithm, in turn, a control input calculated thereby presents such a value that specifies the responsibility of the output of a controlled object to a target value, for example, the rate at which the output converges to the target value. For the reasons set forth above, the first and second control input calculating means calculate different control inputs from each other even in accordance with the same deviation. Particularly, the absolute calculated value provided by the second control input calculating means may largely exceed the absolute calculated value provided by the first control input calculating means. On the other hand, according to the control apparatus of the present invention, since the control input calculating means is switched when the deviation falls within a predetermined range, it is possible to eliminate a step (i.e., a sudden change) in the control input before and after the switching from one control input calculating means to the other, for example, by setting the predetermined range around zero. In this way, a sudden change can be avoided in the output of the controlled object in the event of switching the control input calculating means.

To achieve the above object, according to a second aspect of the present invention, there is provided a control method which is characterized by comprising the steps of calculating a deviation of an output of a controlled object from a predetermined target value; calculating a first control input to the controlled object for converging the output of the controlled object to the target value in accordance with the calculated deviation based on one modulation algorithm selected from a Δ modulation algorithm, a ΔΣ modulation algorithm, and a ΣΔ modulation algorithm; calculating a second control input to the controlled object for converging the output of the controlled object to the target value in accordance with the calculated deviation based on a response specified control algorithm; detecting a state of the controlled object; selecting one of the first and second control inputs in accordance with the detected state of the controlled object as a control input; and switching, in response to a change from one of the first and second control inputs to the other one, from the one control input to the other control input when the calculated deviation falls within a predetermined range.

This control method provides the same advantageous effects as described above concerning the control apparatus according to the first aspect of the invention.

To achieve the above object, according to a third aspect of the present invention, there is provided an engine control unit which is characterized by including a control program for causing a computer to calculate a deviation of an output of a controlled object from a predetermined target value; calculate a first control input to the controlled object for converging the output of the controlled object to the target value in accordance with the calculated deviation based on one modulation algorithm selected from a Δ modulation algorithm, a ΔΣ modulation algorithm, and a ΣΔ modulation algorithm; calculate a second control input to the controlled object for converging the output of the controlled object to the target value in accordance with the calculated deviation based on a response specified control algorithm; detect a state of the controlled object; select one of the first and second control inputs in accordance with the detected state of the controlled object as a control input; and switch, in response to a change from one of the first and second control inputs to the other one, from the one control input to the other control input when the calculated deviation falls within a predetermined range.

This engine control unit provides the same advantageous effects as described above concerning the control apparatus according to the first aspect of the invention.

Preferably, in the control apparatus described above, the second control input calculating means comprises a limiting means for setting the control input to a value within a predetermined allowable range in an initial stage of the switching from the first control input calculating means to the second control input calculating means.

According to this preferred embodiment of the control apparatus, the limiting means sets the control input to a value within a predetermined allowable range in an initial stage of the switching from the first control input calculating means to the second control input calculating means. Therefore, by appropriately setting the allowable range, the absolute value of the control input after the switching can be prevented from largely exceeding the absolute value of the control input before the switching upon switching to the second control input calculating means, which would otherwise be caused by the aforementioned characteristics of the two control input calculating means, thereby ensuring that a step in the control input is eliminated before and after the switching.

Preferably, in the control method described above, the step of calculating a second control input comprises the step of setting the control input to a value within a predetermined allowable range in an initial stage of the switching from the first control input to the second control input.

This preferred embodiment of the control method provides the same advantageous effects as described above concerning the control apparatus according to the first aspect of the invention.

Preferably, in the engine control unit described above, the control program further causes the computer to set the control input to a value within a predetermined allowable range in an initial stage of the switching from the first control input to the second control input.

This preferred embodiment of the engine control unit provides the same advantageous effects as described above concerning the control apparatus according to the first aspect of the invention.

To achieve the above object, according to a fourth aspect of the present invention, there is provided a control apparatus which is characterized by comprising an air/fuel ratio sensing means for outputting a detection signal indicative of an air/fuel ratio of exhaust gases which flow through an exhaust passage of an internal combustion engine; deviation calculating means for calculating a deviation of an output of the air/fuel ratio sensing means from a predetermined target value; first air/fuel ratio calculating means for calculating a target air/fuel ratio of an air/fuel mixture supplied to the internal combustion engine for converging the output of the air/fuel ratio sensing means to the target value in accordance with the calculated deviation based on one modulation algorithm selected from a Δ modulation algorithm, a ΔΣ modulation algorithm, and a ΣΔ modulation algorithm; second air/fuel ratio calculating means for calculating a target air/fuel ratio of the air/fuel mixture supplied to the internal combustion engine for converging the output of the air/fuel ratio sensing means to the target value in accordance with the calculated deviation based on a response specified control algorithm; operating condition parameter detecting means for detecting an operating condition parameter indicative of an operating condition of the internal combustion engine; selecting means for selecting one of the first and second air/fuel ratio calculating means in accordance with the detected operating condition parameter as air/fuel ratio calculating means; switching means responsive to a change in the air/fuel ratio calculating means selected by the selecting means from one of the first and second air/fuel ratio calculating means to the other one for switching from the one air/fuel ratio calculating means to the other air/fuel ratio calculating means when the calculated deviation falls within a predetermined range; and air/fuel ratio control means for controlling the air/fuel ratio of the air/fuel mixture supplied to the internal combustion engine in accordance with the air/fuel ratio calculated by the switched air/fuel ratio calculating means.

According to this control apparatus, the deviation calculating means calculates a deviation of the output of the air/fuel ratio sensing means from the predetermined target value, the first air/fuel ratio calculating means calculates a target air/fuel ratio of the air/fuel mixture supplied to the internal combustion engine for converging the output of the air/fuel ratio sensing means to the target value in accordance with the calculated deviation based on one modulation algorithm selected from a Δ modulation algorithm, a ΔΣ modulation algorithm, and a ΣΔ modulation algorithm, and the second air/fuel ratio calculating means calculates a target air/fuel ratio of the air/fuel mixture supplied to the internal combustion engine for converging the output of the air/fuel ratio sensing means to the target value in accordance with the calculated deviation based on a response specified control algorithm. Further, the selecting means selects one of the first and second air/fuel ratio calculating means in accordance with the detected operating condition parameter as air/fuel ratio calculating means, the switching means is responsive to a change in the air/fuel ratio calculating means selected by the selecting means from one of the first and second air/fuel ratio calculating means to the other one for switching from the one air/fuel ratio calculating means to the other air/fuel ratio calculating means when the calculated deviation falls within a predetermined range, and the air/fuel ratio control means controls the air/fuel ratio of the air/fuel mixture supplied to the internal combustion engine in accordance with the air/fuel ratio calculated by the switched air/fuel ratio calculating means. As described above, in the Δ modulation algorithm, ΔΣ modulation algorithm, and ΣΔ modulation algorithm, the target air/fuel ratio calculated thereby repeats inversions between a predetermined upper limit value and lower limit value. In the response specified control algorithm, in turn, the target air/fuel ratio calculated thereby presents such a value that specify the responsibility of the output of the air/fuel ratio sensing means to a target value, for example, the rate at which the output converges to the target value. For the reasons set forth above, the first and second air/fuel ratio calculating means calculate different control inputs from each other even in accordance with the same deviation. Particularly, the absolute calculated value provided by the second air/fuel ratio calculating means may largely exceed the absolute calculated value provided by the first control input calculating means. On the other hand, according to the control apparatus of the present invention, since the air/fuel ratio calculating means is switched when the deviation falls within a predetermined range, it is possible to eliminate a step in the target air/fuel ratio before and after the switching from one air/fuel ratio calculating means to the other, for example, by setting the predetermined range around zero, thereby avoiding a sudden fluctuations in the state of exhaust gases in the exhaust passage in the event of switching the air/fuel ratio calculating means. As a result, when a catalyzer is provided, for example, in the exhaust passage, the catalyzer can be prevented from a degradation in its exhaust gas purification percentage due to sudden fluctuations in the state of exhaust gases.

To achieve the above object, according to a fifth aspect of the present invention, there is provided a method of controlling an air/fuel ratio of an air/fuel mixture supplied to an internal combustion engine, which is characterized by comprising the steps of outputting a detection signal indicative of an air/fuel ratio of exhaust gases which flow through an exhaust passage of the internal combustion engine; calculating a deviation of the detected air/fuel ratio from a predetermined target value; calculating a first target air/fuel ratio of the air/fuel mixture supplied to the internal combustion engine for converging the air/fuel ratio to the target value in accordance with the calculated deviation based on one modulation algorithm selected from a Δ modulation algorithm, a ΔΣ modulation algorithm, and a ΣΔ modulation algorithm; calculating a second target air/fuel ratio of the air/fuel mixture supplied to the internal combustion engine for converging the air/fuel ratio to the target value in accordance with the calculated deviation based on a response specified control algorithm; detecting an operating condition parameter indicative of an operating condition of the internal combustion engine; selecting one of the target first and second air/fuel ratios in accordance with the detected operating condition parameter as a target air/fuel ratio; switching, in response to a change from one of the first and second target air/fuel ratios to the other one, from the one target air/fuel ratio to the other target air/fuel ratio when the calculated deviation falls within a predetermined range; and controlling the air/fuel ratio of the air/fuel mixture supplied to the internal combustion engine in accordance with the switched target air/fuel ratio.

This control method provides the same advantageous effects as described above concerning the control apparatus according to the fourth aspect of the invention.

To achieve the above object, according to a sixth aspect of the present invention, there is provided an engine control unit including a control program for causing a computer to output a detection signal indicative of an air/fuel ratio of exhaust gases which flow through an exhaust passage of an internal combustion engine; calculate a deviation of the detected air/fuel ratio from a predetermined target value; calculate a first target air/fuel ratio of the air/fuel mixture supplied to the internal combustion engine for converging the air/fuel ratio to the target value in accordance with the calculated deviation based on one modulation algorithm selected from a Δ modulation algorithm, a ΔΣ modulation algorithm, and a ΣΔ modulation algorithm; calculate a second target air/fuel ratio of the air/fuel mixture supplied to the internal combustion engine for converging the air/fuel ratio to the target value in accordance with the calculated deviation based on a response specified control algorithm; detect an operating condition parameter indicative of an operating condition of the internal combustion engine; select one of the target first and second air/fuel ratios in accordance with the detected operating condition parameter as a target air/fuel ratio; switch, in response to a change from one of the first and second target air/fuel ratios to the other one, from the one target air/fuel ratio to the other target air/fuel ratio when the calculated deviation falls within a predetermined range; and control the air/fuel ratio of the air/fuel mixture supplied to the internal combustion engine in accordance with the switched target air/fuel ratio.

This engine control unit provides the same advantageous effects as described above concerning the control apparatus according to the fourth aspect of the invention.

Preferably, in the control apparatus described above, the second air/fuel ratio calculating means comprises limiting means for setting the target air/fuel ratio to a value within a predetermined allowable range in an initial stage of the switching from the first air/fuel ratio calculating means to the second air/fuel ratio calculating means.

According to this preferred embodiment of the control apparatus, the limiting means sets the target air/fuel ratio to a value within a predetermined allowable range in an initial stage of the switching from the first air/fuel ratio calculating means to the second air/fuel ratio calculating means. Therefore, by appropriately setting the allowable range, the absolute value of the target air/fuel ratio after the switching can be prevented from largely exceeding the absolute value of the target air/fuel ratio before the switching before and after the switching of the air/fuel ratio calculating means, which would otherwise be caused by the aforementioned characteristics of the two air/fuel ratio calculating means, thereby ensuring that a step in the target air/fuel ratio is eliminated before and after the switching of the air/fuel ratio calculating means.

Preferably, in the control method described above, the step of calculating a second target air/fuel ratio comprises the step of setting the target air/fuel ratio to a value within a predetermined allowable range in an initial stage of the switching from the first target air/fuel ratio to the second target air/fuel ratio.

This preferred embodiment of the control method provides the same advantageous effects as described above concerning the control apparatus according to the fourth aspect of the invention.

Preferably, in the engine control unit described above, the control program further causes the computer to set the target air/fuel ratio to a value within a predetermined allowable range in an initial stage of the switching from the first target air/fuel ratio to the second target air/fuel ratio.

This preferred embodiment of the engine control unit provides the same advantageous effects as described above concerning the control apparatus according to the fourth aspect of the invention.

BRIEF DESCRIPTION OF THE DRAWINGS

FIG. 4 shows a set of exemplary equations which express a prediction algorithm for a state predictor;

FIG. 5 shows a set of exemplary equations which express an identification algorithm for an on-board identifier;

FIG. 10 shows a set of equations which express a sliding mode control algorithm;

FIG. 11 shows a set of equations which express a sliding mode control algorithm for the PRISM controller;

DETAILED DESCRIPTION OF THE EMBODIMENTS

Figure 1:
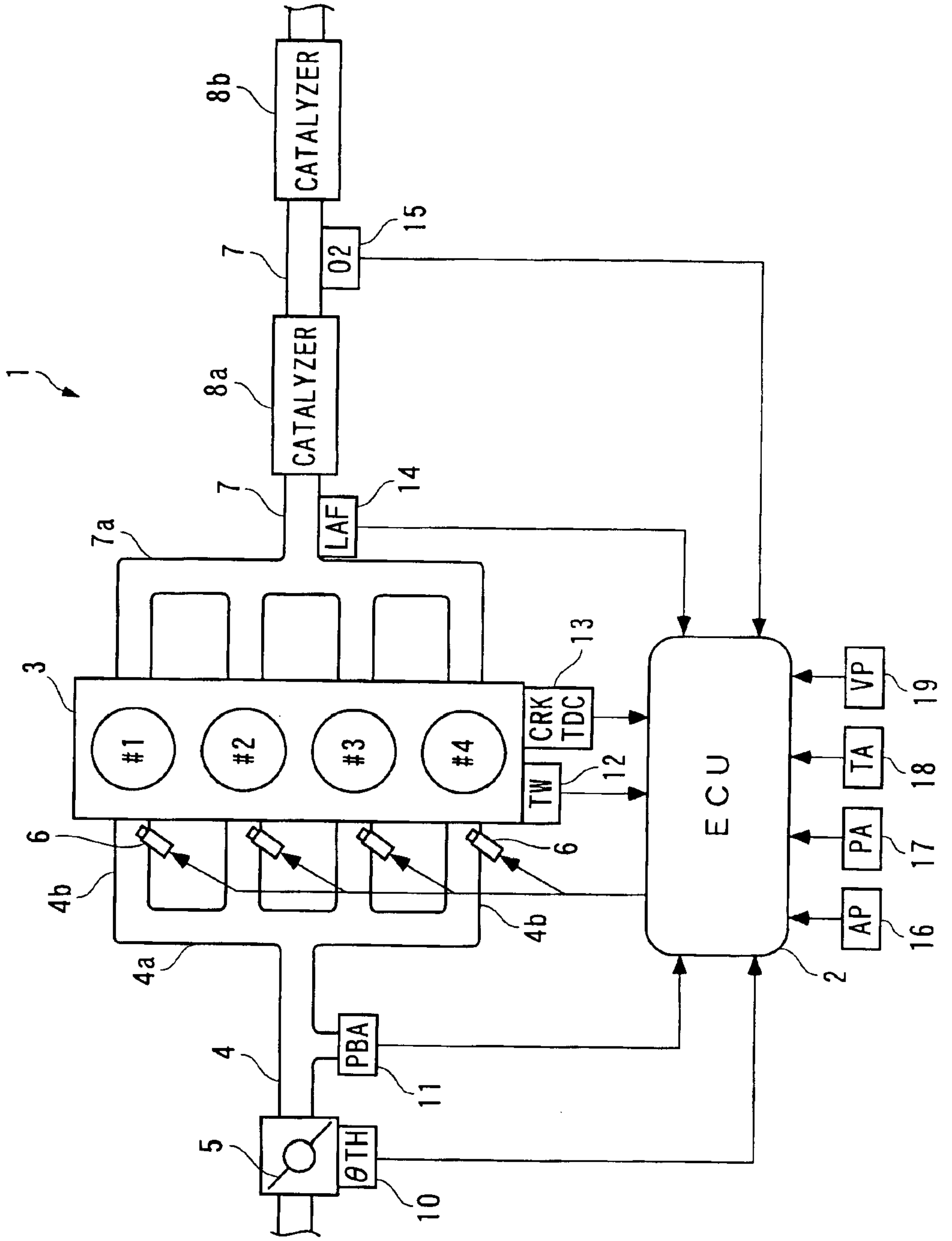
FIG. 1 is a block diagram generally illustrating a control apparatus according to a first embodiment of the present invention, and an internal combustion engine which applies the control apparatus.

In the following, a control apparatus according to a first embodiment of the present invention will be described with reference to the accompanying drawings. The control apparatus in the first embodiment is configured, by way of example, to control an air/fuel ratio for an internal combustion engine. FIG. 1 generally illustrates the configuration of the control apparatus 1 according to the first embodiment, and an internal combustion engine (hereinafter called the "engine") 3 which applies this air/fuel ratio control apparatus 1. As illustrated, the control apparatus 1 comprises an electronic control unit (ECU) 2 which controls the air/fuel ratio of an air/fuel mixture supplied to the engine 3 in accordance with a particular operating condition thereof, as will be later described.

The engine 3 is an in-line four-cylinder gasoline engine equipped in a vehicle, not shown, and has four, a first to a fourth cylinder #1–#4. A throttle valve opening sensor 10, for example, comprised of a potentiometer or the like, is provided near a throttle valve 5 in an intake pipe 4 of the engine 3. The throttle valve opening sensor 10 detects an opening θTH of the throttle valve 5 (hereinafter called the "throttle valve opening"), and sends a detection signal indicative of the throttle valve opening θTH to the ECU 2.

An absolute intake pipe inner pressure sensor 11 is further provided at a location of the intake pipe 4 downstream of the throttle valve 5. The absolute intake pipe inner pressure sensor 11, which implements operating condition parameter detecting means and load parameter detecting means, is comprised, for example, of a semiconductor pressure sensor or the like for detecting an absolute intake pipe inner pressure PBA within the intake pipe 4 to output a detection signal indicative of the absolute intake pipe inner pressure PBA to the ECU 2.

The intake pipe 4 is connected to the four cylinders #1–#4, respectively, through four branches 4*b* of an intake manifold 4*a*. An injector 6 is attached to each of the branches 4*b* at a location upstream of an intake port, not shown of each cylinder. Each injector 6 is controlled by a driving signal from the ECU 2 in terms of a final fuel injection amount TOUT, which indicates a valve opening time, and an injection timing when the engine 3 is in operation.

A water temperature sensor 12 comprised, for example, of a thermistor or the like is attached to the body of the engine 3. The water temperature sensor 12 detects an engine water temperature TW, which is the temperature of cooling water that circulates within a cylinder block of the engine 3, and outputs a detection signal indicative of the engine water temperature TW to the ECU 2.

A crank angle sensor 13 is mounted on a crank shaft (not shown) of the engine 3. The crank angle sensor 13, which implements operating condition parameter detecting means and load parameter detecting means, outputs a CRK signal and a TDC signal, both of which are pulse signals, to the ECU 2 as the crank shaft is rotated.

The CRK signal generates one pulse every predetermined crank angle (for example, 30°). The ECU 2 calculates a rotational speed NE of the engine 3 (hereinafter called the "engine rotational speed") in response to the CRK signal. The TDC signal in turn indicates that a piston (not shown) of each cylinder is present at a predetermined crank angle position which is slightly in front of a TDC (top dead center) position in an intake stroke, and generates one pulse every predetermined crank angle.

At locations downstream of an exhaust manifold 7*a* in an exhaust pipe 7 (exhaust passage), a first and a second catalyzer 8*a*, 8*b* are provided in this order from the upstream side, spaced apart from each other. Each catalyzer 8*a*, 8*b* is a combination of an NOx catalyst and a three-way catalyst. The catalyzers 8*a*, 8*b* purify NOx in exhaust gases during a lean burn operation through oxidation/reduction actions of the NOx catalyst, and purify CO, HC and NOx in exhaust gases during an operation other than the lean burn operation through oxidation/reduction actions of the three-way catalyst.

An oxygen concentration sensor (hereinafter called the "O2 sensor) 15 is mounted between the first and second catalyzers 8*a*, 8*b* as an air/fuel ratio sensor. The O2 sensor 15 is made of zirconium, a platinum electrode, and the like, and sends an output Vout to the ECU 2 based on the oxygen concentration in exhaust gases downstream of the first catalyzer 8*a*. The output Vout of the O2 sensor 15 goes to a voltage value at high level (for example, 0.8 V) when an air/fuel mixture richer than the stoichiometric air/fuel ratio is burnt, and goes to a voltage value at low level (for example, 0.2 V) when the air/fuel mixture is lean. Also, the output Vout goes to a predetermined target value Vop (for example, 0.6 V) between the high level and low level when the air/fuel mixture is near the stoichiometric air/fuel ratio (see FIG. 2).

An LAF sensor 14 is mounted near a junction of the exhaust manifold 7*a* upstream of the first catalyzer 8*a*. The LAF sensor 14 is comprised of a sensor similar to the O2 sensor 15, and a detecting circuit such as a linearizer in combination for linearly detecting an oxygen concentration in exhaust gases over a wide range of the air/fuel ratio extending from a rich region to a lean region to send an output KACT proportional to the detected oxygen concentration to the ECU 2. The output KACT is represented as an equivalent ratio proportional to an inverse of the air/fuel ratio.

Figure 2:
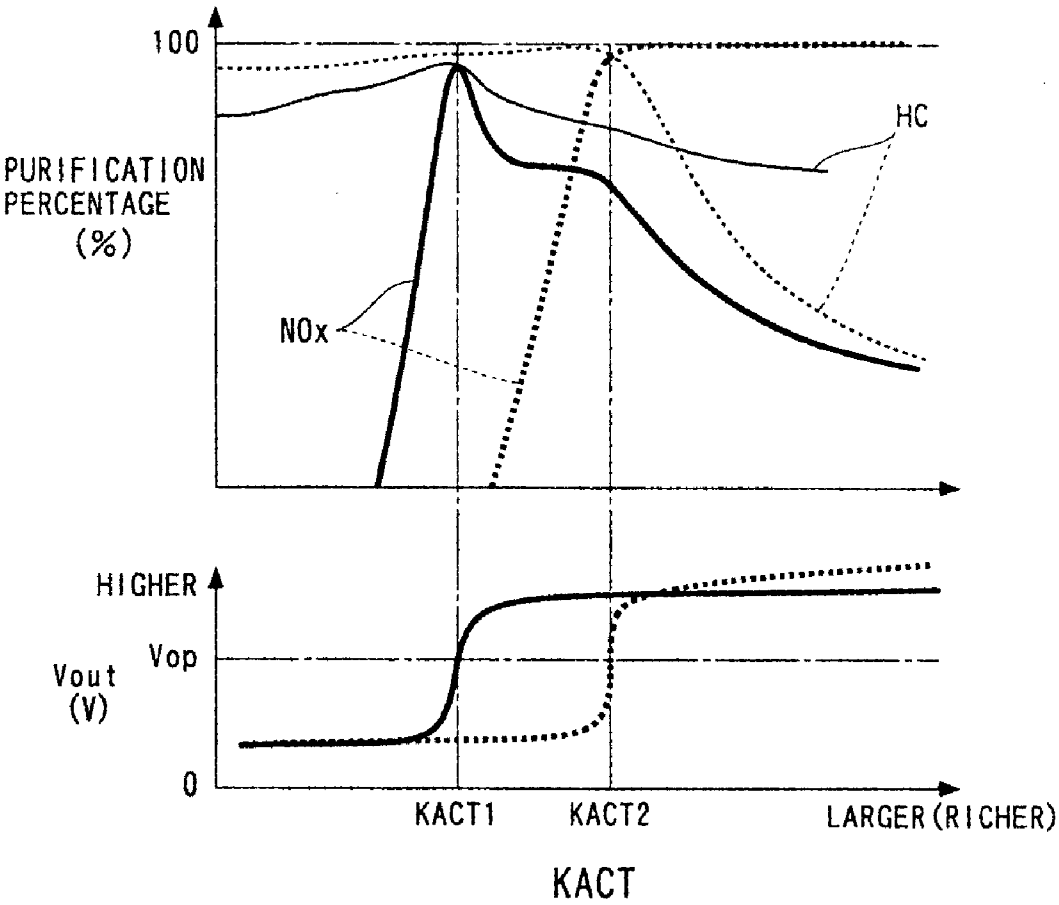
FIG. 2 is a graph showing an exemplary result of measurements made with a deteriorated and a normal first catalyzer for HC and NOx purification percentages of both first catalyzers and an output Vout of an O2 sensor 15, with respect to an output KACT of an LAF sensor, respectively.

Referring next to FIG. 2, description will be made on the relationship between an exhaust gas purifying percentage provided by the first catalyzer 8*a* and the output Vout (voltage value) of the O2 sensor 15. FIG. 2 shows exemplary results of measuring the HC and NOx purifying percentage provided by the first catalyzer 8*a* and the output Vout of the O2 sensor 15 when the output KACT of the LAF sensor 14, i.e., the air/fuel ratio of an air/fuel mixture supplied to the engine 3 varies near the stoichiometric air/fuel ratio, for two cases where the first catalyzer 8*a* is deteriorated due to a long-term use and therefore has degraded capabilities of purifying, and where the first catalyzer 8*a* is not deteriorated and therefore has high capabilities of purifying. In FIG. 2, data indicated by broken lines show the results of measurements when the first catalyzer 8*a* is not deteriorated, and data indicated by solid lines show the results of measurements when the first catalyzer 8*a* is deteriorated. FIG. 2 also shows that the air/fuel ratio of the air/fuel mixture is richer as the output KACT of the LAF sensor 14 is larger.

As shown in FIG. 2, when the first catalyzer 8*a* is deteriorated, its capabilities of purifying exhaust gases are degraded, as compared with the one not deteriorated, so that the output Vout of the O2 sensor 15 crosses the target value Vop when the output KACT of the LAF sensor 14 is at a value KACT1 deeper in a lean region. On the other hand, the first catalyzer 8*a* has the characteristic of most efficiently purifying HC and NOx when the output Vout of the O2 sensor 15 is at the target value Vop, irrespective of whether the first catalyzer 8*a* is deteriorated or not. It is therefore appreciated that exhaust gases can be most efficiently purified by the first catalyzer 8*a* by controlling the air/fuel ratio of the air/fuel mixture to bring the output Vout of the O2 sensor 15 to the target value Vop. For this reason, in the air/fuel ratio control later described, a target air/fuel ratio KCMD is calculated such that the output Vout of the O2 sensor 15 converges to the target value Vop.

The ECU 2 is further connected to an accelerator opening sensor 16, an atmospheric pressure sensor 17, an intake air temperature sensor 18, a vehicle speed sensor 19, and the like. The accelerator opening sensor 16 detects an amount AP by which the driver treads on an accelerating pedal, not shown, of the vehicle (hereinafter called the "accelerator opening"), and outputs a detection signal indicative of the accelerator opening AP to the ECU 2. Likewise, the atmospheric pressure sensor 17, intake air temperature sensor 18 and vehicle speed sensor 19 detect the atmospheric pressure PA, an intake air temperature TA, and a vehicle speed VP, respectively, and output detection signals indicative of the respective detected values to the ECU 2.

The ECU 2 is based on a microcomputer which comprises an I/O interface, a CPU, a RAM, a ROM, and the like. The ECU 2 determines an operating condition of the engine 3 in accordance with the outputs of the variety of sensors 10–19 mentioned above, and calculates the target air/fuel ratio KCMD by executing adaptive air/fuel ratio control processing or map search processing, later described, in accordance with a control program previously stored in the ROM and data stored in the RAM. Further, as will be described later, the ECU 2 calculates the final fuel injection amount TOUT of the injector 6 for each cylinder based on the calculated target air/fuel ratio KCMD, and drives the injector 6 using a driving signal based on the calculated final fuel injection amount TOUT to control the air/fuel ratio of the air/fuel mixture. In the first embodiment, the ECU 2 implements deviation calculating means, first control input calculating means, second control input calculating means, selecting means, switching means, limiting means, first air/fuel ratio calculating means, second air/fuel ratio calculating means, operating condition parameter detecting means, and air/fuel ratio control means.

Figure 3:
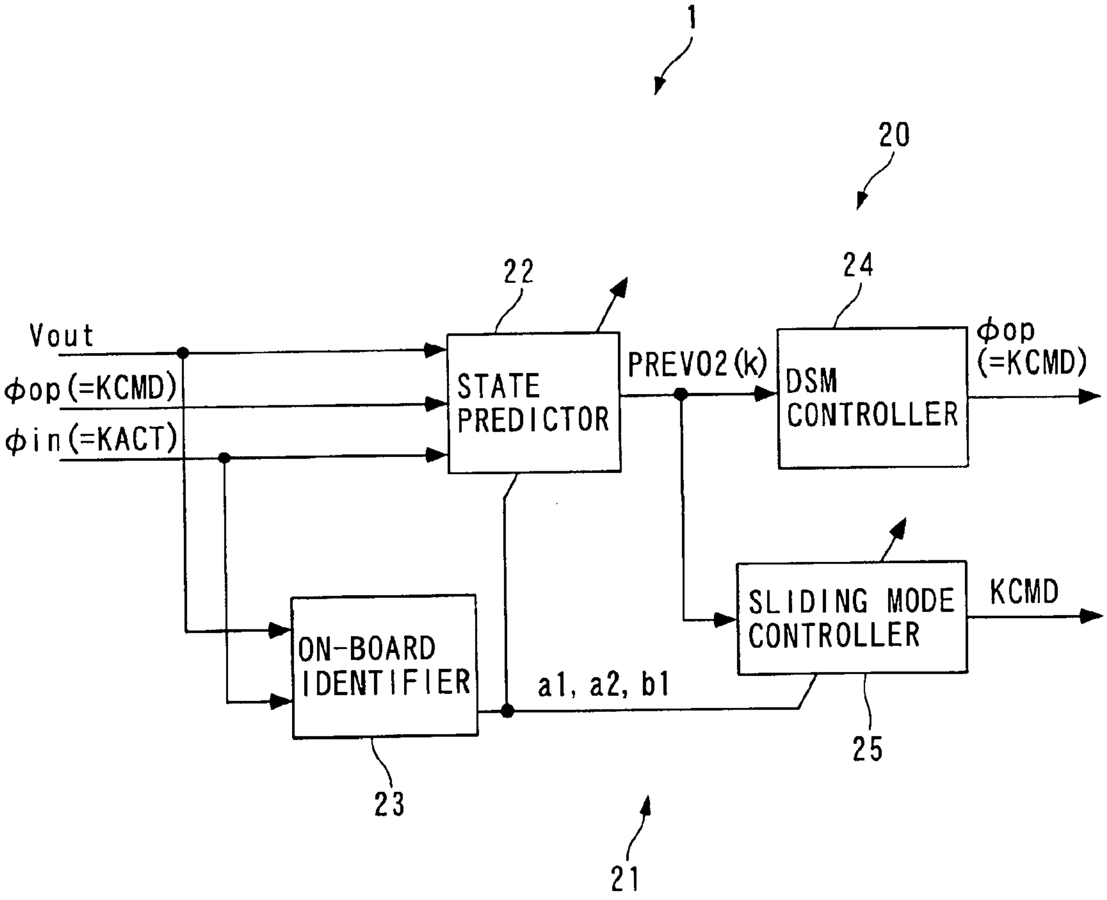
FIG. 3 is a block diagram illustrating the configuration of an ADSM controller and a PRISM controller in the control apparatus.

As illustrated in FIG. 3, the control apparatus 1 comprises an ADSM controller 20 and a PRISM controller 21 for calculating the target air/fuel ratio KCMD. Specifically, both controllers 20, 21 are implemented by the ECU 2.

In the following, the ADSM controller 20 will be described. The ADSM controller 20 calculates the target air/fuel ratio KCMD for converging the output Vout of the O2 sensor 15 to the target value Vop in accordance with a control algorithm of adaptive prediction ΔΣ modulation control (hereinafter abbreviated as "ADSM"), later described. The ADSM controller 20 comprises a state predictor 22, an on-board identifier 23, and a DSM controller 24.

Description will first be made on the state predictor 22 (which implements deviation calculating means). The state predictor 22 calculates a predicted value PREVO2 (deviation) of an output deviation VO2 in accordance with a prediction algorithm, later described. Assume, in the first embodiment, that a control input to a controlled object is the target air/fuel ratio KCMD of an air/fuel mixture; the output of the controlled object is the output Vout of the O2 sensor 15; and the controlled object is a system from an intake system of the engine 3 including the injectors 6 to the O2 sensor 15 downstream of the first catalyzer 8*a* in an exhaust system including the first catalyzer 8*a*. Then, this controlled object is modelled, as expressed by the following equation (1), as an ARX model (auto-regressive model with exogenous input) which is a discrete time based model.

$$VO2(k)=a1\cdot VO2(k-1)+a2\cdot VO2(k-2)+b1\cdot DKCMD(k-dt)$$

where VO2 represents an output deviation which is a deviation (Vout−Vop) between the output Vout of the O2 sensor 15 and the aforementioned target value Vop; DKCMD represents an air/fuel ratio deviation which is a deviation (KCMD−FLAFBASE) between a target air/fuel ratio KCMD (=ϕop) and a reference value FLAFBASE; and a character k represents the order of each discrete data in a sampling cycle. The reference value FLAFBASE is set to a predetermined fixed value. Model parameters a1, a2, b1 are sequentially identified by the on-board identifier 23 in a manner described below.

dt in the equation (1) represents a prediction time period from the time at which an air/fuel mixture set at the target air/fuel ratio KCMD is supplied to the intake system by the injectors 6 to the time at which the target air/fuel ratio KCMD is reflected to the output Vout of the O2 sensor 15, and is defined by the following equation (2):

$$dt=d+d'+dd \tag{2}$$

where d represents a dead time in the exhaust system from the LAF sensor 14 to the O2 sensor 15; d', a dead time in an air/fuel ratio manipulation system from the injectors 6 to the LAF sensor 14; and dd represents a phase delay time between the exhaust system and air/fuel ratio manipulation system, respectively (it should be noted that in a control program for the adaptive air/fuel ratio control processing, later described, the phase delay time dd is set to zero (dd=0) for calculating the target air/fuel ratio KCMD while switching between the ADSM processing and PRISM processing).

The predicted value PREVO2 in turn shows a predicted output deviation VO2(k+dt) after the lapse of the prediction time period dt from the time at which the air/fuel mixture set at the target air/fuel ratio KCMD has been supplied to the intake system. When an equation for calculating the predicted value PREVO2 is derived based on the aforementioned equation (1), the following equation (3) is defined:

$$\begin{aligned} PREVO2(k) &\approx VO2(k+dt) \\ &= a1\cdot VO2(k+dt-1)+a2\cdot VO2(k+dt-2)+ \\ &\quad b1\cdot DKCMD(k) \end{aligned} \tag{3}$$

In this equation (3), it is necessary to calculate VO2(k+dt−1), VO2(k+dt−2) corresponding to future values of the output deviation VO2(k), so that actual programming of the equation (3) is difficult. Therefore, matrixes A, B are defined using the model parameters a1, a2, b1, as equations (4), (5) shown in FIG. 4, and a recurrence formula of the equation (3) is repeatedly used to transform the equation (3) to derive equation (6) shown in FIG. 4. Further, when a LAF output deviation DKACT is defined as a deviation (KACT−FLAFBASE) of the output KACT (=φin) of the LAF sensor 14 from the reference value FLAFBASE, a relationship expressed by DKACT(k)=DKCMD(k−d') is established. Equation (7) shown in FIG. 4 is derived by applying this relationship to the equation (6) in FIG. 4. When the equation (7) is used, the predicted value PREVO2 is calculated from the output deviation VO2, LAF output deviation DKACT and air/fuel ratio deviation KCMD, so that the predicted value PREVO2 can be calculated as a value which reflects the air/fuel ratio of exhaust gases actually supplied to the first catalyzer 8*a*, thereby improving the calculation accuracy, i.e., the prediction accuracy more than when the equation (6) is used. For the reason set forth above, the first embodiment employs the aforementioned equation (7) as the prediction algorithm.

Next, description will be made on the on-board identifier 23. The on-board identifier 23 identifies (calculates) the model parameters a1, a2, b1 in the aforementioned equation (1) in accordance with a sequential identification algorithm described below. Specifically, a vector θ(k) for model parameters is calculated by equations (8), (9) shown in FIG. 5. In the equation (8) in FIG. 5, KP(k) is a vector for a gain coefficient, and ide_f(k) is an identification error filter value. In the equation (9), $\theta(k)^T$ represents a transposed matrix of θ(k), and a1'(k), a2'(k) and b1'(k) represent model parameters before they are limited in range in limit processing, later described. In the following description, the term "vector" is omitted if possible.

An identification error filter value ide_f(k) in the equation (8) is derived by applying moving average filtering processing expressed by equation (10) in FIG. 5 to an identification error ide(k) calculated by equations (11)–(13) shown in FIG. 5. n in the equation (10) in FIG. 5 represents the order of filtering (an integer equal to or larger than one) in the moving average filtering processing, and VO2HAT(k) in the equation (12) represents an identified value of the output deviation VO2. The order of filtering n is set in accordance with an exhaust gas volume AB_SV, as later described.

Further, the vector KP(k) for the gain coefficient in the equation (8) in FIG. 5 is calculated by equation (14) in FIG. 5. P(k) in equation (14) is a third-order square matrix as defined by equation (15) in FIG. 5. Since the first embodiment employs the weighted least-square algorithm for identification, the weighting parameters λ1, λ2 in equation (15) are set to λ (λ1=λ) and one (λ2=1), respectively (λ is a predetermined value set as represented by 0<λ<1).

Next, the DSM controller 24 will be described. The DSM controller 24 calculates the target air/fuel ratio KCMD as a control input φop(k) in accordance with a control algorithm which applies the ΔΣ modulation algorithm, based on the predicted value PREVO2 calculated by the state predictor 22, and inputs the calculated target air/fuel ratio KCMD to the controlled object to control the output Vout of the O2 sensor 15, as the output of the controlled object, such that it converges to the target value Vop.

Figure 6:
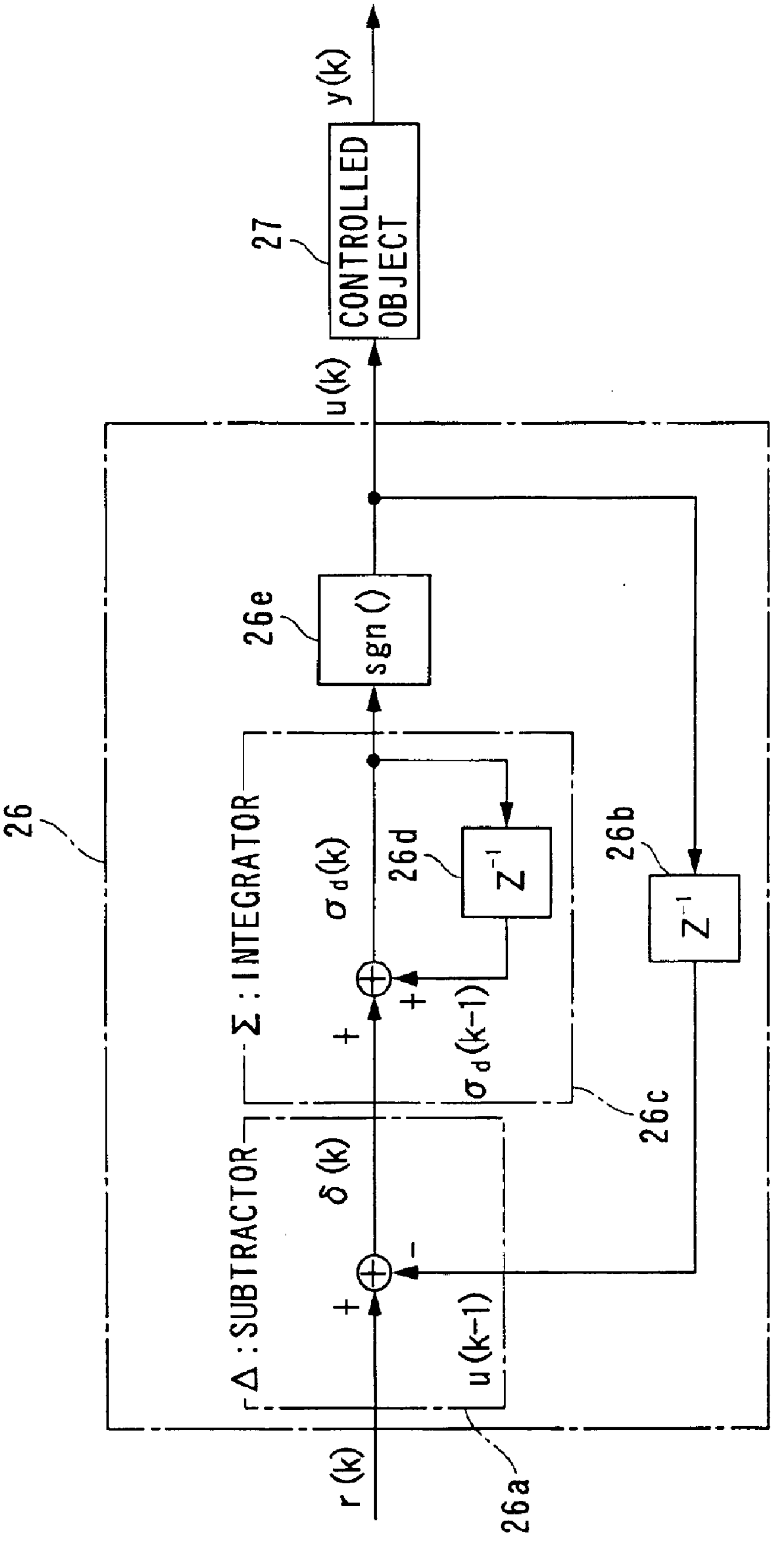
FIG. 6 is a block diagram illustrating the configuration of a controller for executing a ΔΣ modulation, and a control system which comprises the controller.

First, a general ΔΣ modulation algorithm will be described with reference to FIG. 6. FIG. 6 illustrates the configuration of a control system which controls a controlled object 27 by a controller 26 to which the ΔΣ modulation algorithm is applied. As illustrated, in the controller 26, a subtractor 26*a* generates a deviation signal δ(k) as a deviation between a reference signal r(k) and a DSM signal u(k−1) delayed by a delay element 26*b*. Next, an integrator 26*c* generates an integrated deviation value $\sigma_d(k)$ as a signal indicative of the sum of the deviation signal δ(k) and an integrated deviation value $\sigma_d(k-1)$ delayed by a delay element 26*d*. Next, a quantizer 26*e* (sign function) generates a DSM signal u(k) as a sign of the integrated deviation value $\sigma_d(k)$. Consequently, the DSM signal u(k) thus generated is inputted to the controlled object 27 which responsively delivers an output signal y(k).

The foregoing ΔΣ modulation algorithm is expressed by the following equations (16)–(18):

$$\delta(k)=r(k)-u(k-1) \tag{16}$$

$$\sigma_d(k)=\sigma_d(k-1)+\delta(k) \tag{17}$$

$$u(k)=sgn(\sigma_d(k)) \tag{18}$$

where the value of the sign function $sgn(\sigma_d(k))$ takes 1 ($sgn(\sigma_d(k))=1$) when $\sigma_d(k)\geqq 0$, and −1 ($sgn(\sigma_d(k))=-1$) when $\sigma_d(k)<0$ ($sgn(\sigma_d(k))$ may be set to zero ($sgn(\sigma_d(k))=0$) when $\sigma_d(k)=0$).

Figure 7:
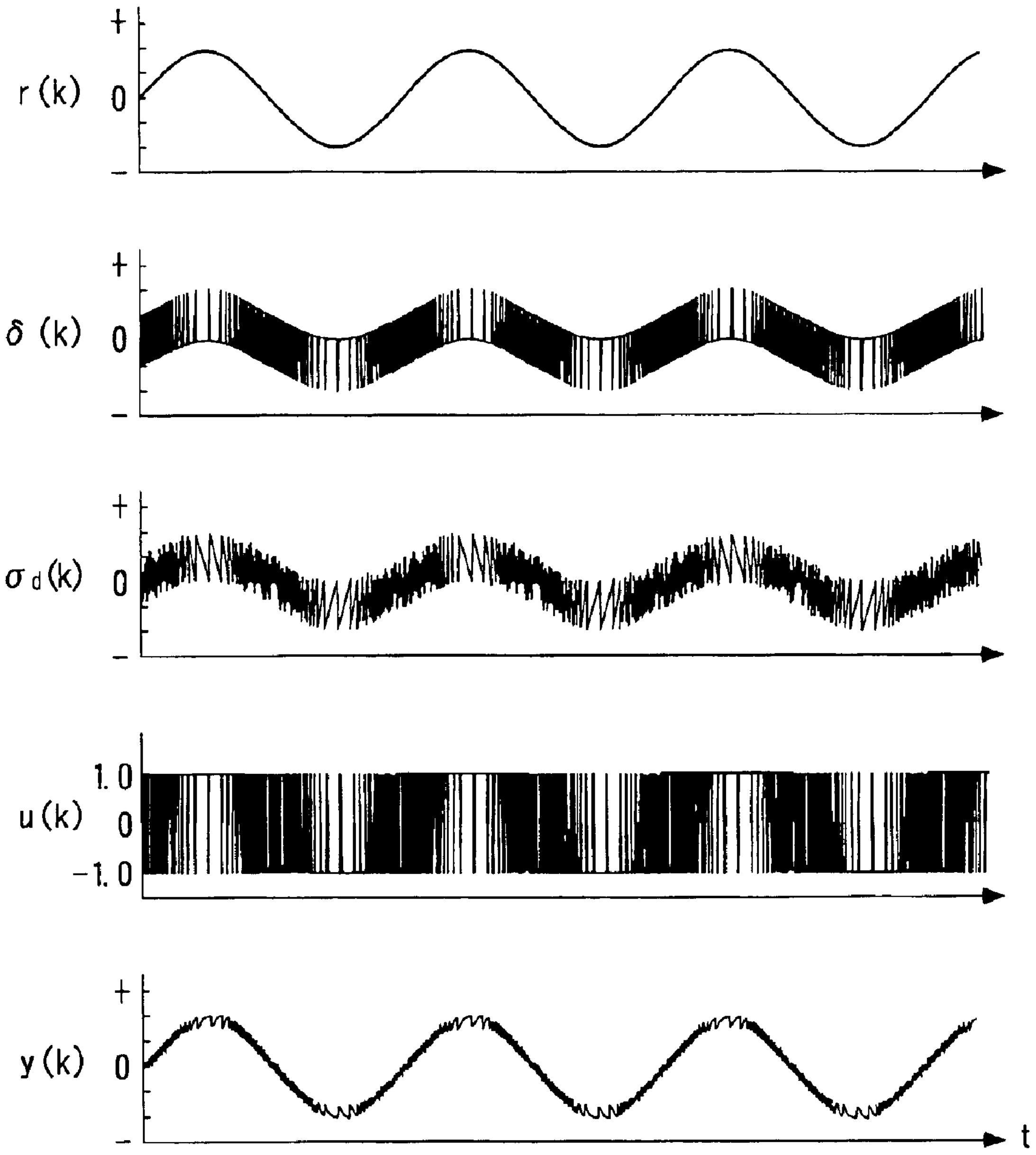
FIG. 7 is a timing chart showing an exemplary result of the control conducted by the control system in FIG. 6.

FIG. 7 shows the result of control simulation performed for the foregoing control system. As shown, when the sinusoidal reference signal r(k) is inputted to the control system, the DSM signal u(k) is generated as a square-wave signal and is fed to the controlled object 27 which responsively outputs the output signal y(k) which has a different amplitude from and the same frequency as the reference signal r(k), and is generally in a similar waveform though noise is included. As described, the ΔΣ modulation algorithm is characterized in that the DSM signal u(k) can be generated when the controlled object 27 is fed with the DSM signal u(k) generated from the reference signal r(k) such that the controlled object 27 generates the output y(k) which has a different amplitude from and the same frequency as the reference signal r(k) and is generally similar in waveform to the reference signal r(k). In other words, the ΔΣ modulation algorithm is characterized in that the DSM signal u(k) can be generated (calculated) such that the reference signal r(k) is reproduced in the actual output y(k) of the controlled object 27.

Figure 8:
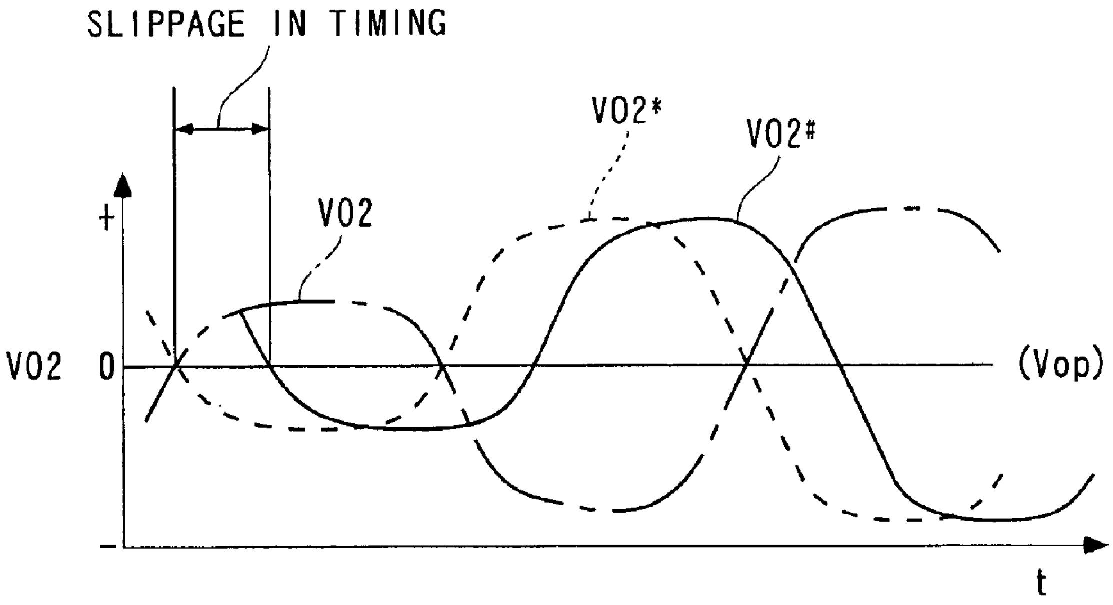
FIG. 8 is a timing chart for explaining the principles of an adaptive prediction type ΔΣ modulation control conducted by the ADSM controller.

The DSM controller 24 takes advantage of such characteristic of the ΔΣ modulation algorithm to calculate the control input φop(k), i.e., the target air/fuel ratio KCMD(k) for converging the output Vout of the O2 sensor 15 to the target value Vop. Describing the principles of the calculation, when the output deviation VO2 fluctuates with respect to the value of zero, for example, as indicated by a one-dot chain line in FIG. 8 (i.e., the output Vout of the O2 sensor 15 fluctuates with respect to the target value Vop), the target air/fuel ratio KCMD(k) may be generated to produce an output deviation VO2* having an opposite phase waveform to cancel the output deviation VO2, as indicated by a broken line in FIG. 8, in order to converge the output deviation VO2 to zero (i.e., to converge the output Vout to the target value Vop).

However, as described above, the controlled object in the first embodiment experiences a time delay equal to the prediction time period dt from the time at which the target air/fuel ratio KCMD(k) is inputted to the controlled object as the control input φop(k) to the time at which it is reflected to the output Vout of the O2 sensor 15. Therefore, an output deviation VO2# derived when the target air/fuel ratio KCMD(k) is calculated based on the current output deviation VO2 delays from the output deviation VO2*, as indicated by a solid line in FIG. 9, thereby causing slippage in control timing. To compensate the control timing for the slippage, the DSM controller 24 in the ADSM controller 20 according to the first embodiment employs the predicted value PREVO2 of the output deviation VO2 to generate the target air/fuel ratio KCMD(k) as a signal which generates an output deviation (an output deviation similar to the output deviation VO2* in opposite phase waveform) that cancels the current output deviation VO2 without causing the slippage in control timing.

Figure 9:
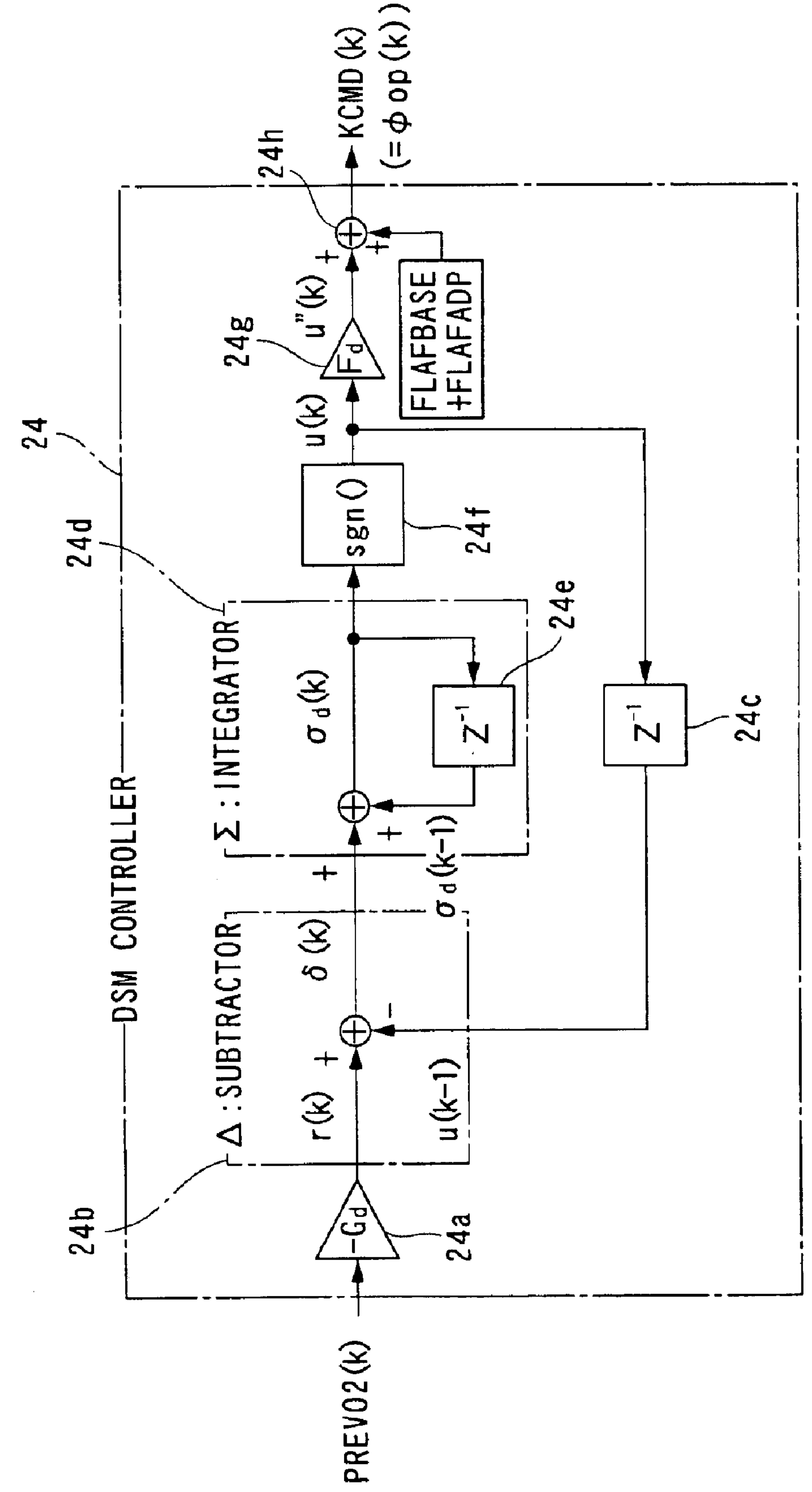
FIG. 9 is a block diagram illustrating the configuration of a DSM controller in the ADSM controller.

Specifically, as illustrated in FIG. 9, an inverting amplifier 24*a* in the DSM controller 24 generates the reference signal r(k) by multiplying the value of −1, a non-linear gain $G_d$ for the reference signal, and the predicted value PREVO2(k). Next, a subtractor 24*b* generates the deviation signal δ(k) as a deviation between the reference signal r(k) and a DSM signal u"(k−1) delayed by a delay element 24*c*.

Next, an integrator 24*d* generates the integrated deviation value $\sigma_d(k)$ as the sum of the deviation signal δ(k) and an integrated deviation value $\sigma_d(k-1)$ delayed by a delay element 24*e*. Then, a quantizer 24*f* (sign function) generates a DSM signal u(k) as a sign of the integrated deviation value $\sigma_d(k)$. An amplifier 24*g* next generates an amplified DSM signal u"(k) by amplifying the DSM signal u(k) by a predetermined gain $F_d$. Then, an adder 24*h* adds the amplified DSM signal u"(k) to a predetermined reference value FLAFBASE and an adaptive correction term FLAFADP, later described, to generate the target air/fuel ratio KCMD (k).

The control algorithm of the DSM controller 24 described above is expressed by the following equations (19)–(24):

$$r(k)=-1\cdot G_d\cdot PREVO2(k) \tag{19}$$

$$\delta(k)=r(k)-u(k-1) \tag{20}$$

$$\sigma_d(k)=\sigma_d(k-1)+\delta(k) \tag{21}$$

$$u(k)=sgn(\sigma_d(k)) \tag{22}$$

$$u''(k)=F_d\cdot u(k) \tag{23}$$

$$KCMD(k)=FLAFBASE+FLAFADP+u''(k) \tag{24}$$

Here, the value of the non-linear gain $G_d$ is set to a predetermined positive value $G_d1$ (for example, 0.2) when PREVOS2(k) is equal to or larger than zero (PREVOS(k) ≧0), and to a predetermined value $G_d2$ (for example, two) larger than the predetermined value $G_d1$ when PREVOS(k) is smaller than zero (PREVOS(k)<0). The reason for using the non-linear gain $G_d$ will be described later. The value of the sign function $sgn(\sigma_d(k))$ takes 1 ($sgn(\sigma_d(k))=1$) when $\sigma_d(k)0$, and −1 ($sgn(\sigma_d(k))=-1$) when $\sigma_d(k)<0$ ($sgn(\sigma_d(k))$ may be set to zero ($sgn(\sigma_d(k))=0$) when $\sigma_d(k)=0$).

The DSM controller 24 relies on the control algorithm expressed by the foregoing equations (19)–(24) to calculate the target air/fuel ratio KCMD(k) or control input as a value which generates the output deviation VO2* that cancels the output deviation VO2 without causing slippage in control timing, as described above.

Next, the aforementioned PRISM controller 21 will be described with reference again to FIG. 3. The PRISM controller 21 relies on a control algorithm for on-board identification sliding mode control processing (hereinafter called the "PRISM processing"), later described, to calculate the target air/fuel ratio KCMD for converging the output Vout of the O2 sensor 15 to the target value Vop. The PRISM controller 21 comprises the state predictor 22, on-board identifier 23, and sliding mode controller (hereinafter called the "SLD controller") 25. A specific program for executing the PRISM processing will be described later.

Since the state predictor 22 and on-board identifier 23 have been described in the PRISM controller 21, the following description will be centered on the SLD controller 25. The SLD controller 25 performs the sliding mode control based on the sliding mode control algorithm. In the following, a general sliding mode control algorithm will be described. Since the sliding mode control algorithm uses the aforementioned discrete time based model expressed by the equation (1) as a controlled object model, a switching function σ is set as a linear function of time series data of the output deviation VO2 as expressed by the following equation (25):

$$\sigma(k)=S1\cdot VO2(k)+S2\cdot VO2(k-1) \tag{25}$$

where S1, S2 are predetermined coefficients which are set to satisfy a relationship represented by −1<(S2/S1)<1.

Generally, in the sliding mode control algorithm, when the switching function σ is made up of two state variables (time series data of the output deviation VO2 in the first embodiment), a phase space defined by the two state variables forms a two-dimensional phase plane in which the two state variables are represented by the vertical axis and horizontal axis, respectively, so that a combination of values of the two state variables satisfying σ=0 on this phase plane rests on a line called a "switching line." Therefore, both the two state variables can be converged (slid) to a position of equilibrium at which the state variables take the value of zero by appropriately determining a control input to a controlled object such that a combination of the two state variables converges to (rests on) the switching line. Further, the sliding mode control algorithm can specify the dynamic characteristic, more specifically, convergence behavior and convergence rate of the state variables by setting the switching function σ. For example, when the switching function σ is made up of two state variables as in the first embodiment, the state variables converge slower as the slope of the switching line is brought closer to one, and faster as it is brought closer to zero.

In the first embodiment, as shown in the aforementioned equation (25), the switching function σ is made up of two time series data of the output deviation VO2, i.e., a current value VO2(k) and the preceding value VO2(k−1) of the output deviation VO2, so that the control input to the controlled object, i.e., the target air/fuel ratio KCMD may be set such that a combination of these current value VO2(k) and preceding vale VO2(k−1) of the output deviation VO2 (k) is converged onto the switching line. Specifically, assuming that a control amount Usl(k) is set as a value which causes the sum of the reference value FLAFBASE and adaptive correction term FLALADP is equal to the target air/fuel ratio KCMD, the control amount Usl(k) for converging the combination of the current value VO2(k) and preceding value VO2(k−1) onto the switching line is set as a total sum of an equivalent control input Ueq(k), an reaching law input Urch(k), and an adaptive law input Uadp(k), as shown in equation (26) shown in FIG. 10, in accordance with an adaptive sliding mode control algorithm.

The equivalent control input Ueq(k) is provided for restricting the combination of the current value VO2(k) and preceding value VO2(k−1) of the output deviation VO2 on the switching line, and specifically is defined as equation (27) shown in FIG. 10. The reaching law input Urch(k) is provided for converging the combination of the current value VO2(k) and preceding value VO2(k−1) of the output deviation VO2 onto the switching line if it deviates from the switching line due to disturbance, a modelling error or the like, and specifically is defined as equation (28) shown in FIG. 10. In the equation (28), F represents a gain.

The adaptive law input Uadp(k) is provided for securely converging the combination of the current value VO2(k) and preceding value VO2(k−1) of the output deviation VO2 onto a switching hyperplane while preventing the influence of a steady-state deviation of the controlled object, a modelling error, and disturbance, and specifically defined as equation (29) shown in FIG. 10. In the equation (29), G represents a gain, and $\Delta T$ a control period, respectively.

As described above, the SLD controller 25 in the PRISM controller 21 according to the first embodiment uses the predicted value PREVO2 instead of the output deviation VO2, so that the algorithm expressed by the equations (25)–(29) is rewritten to equations (30)–(34) shown in FIG. 11 for use in the control by applying a relationship expressed by $PREVO2(k) \approx VO2(k+dt)$. $\sigma PRE$ in the equation (30) represents the value of the switching function when the predicted value PREVO2 is used (hereinafter called the "prediction switching function"). In other words, the SLD controller 25 calculates the target air/fuel ratio KCMD by adding the control amount Usl(k) calculated in accordance with the foregoing algorithm to the reference value FLAFBASE and adaptive correction term FLAFADP.

Figure 12:
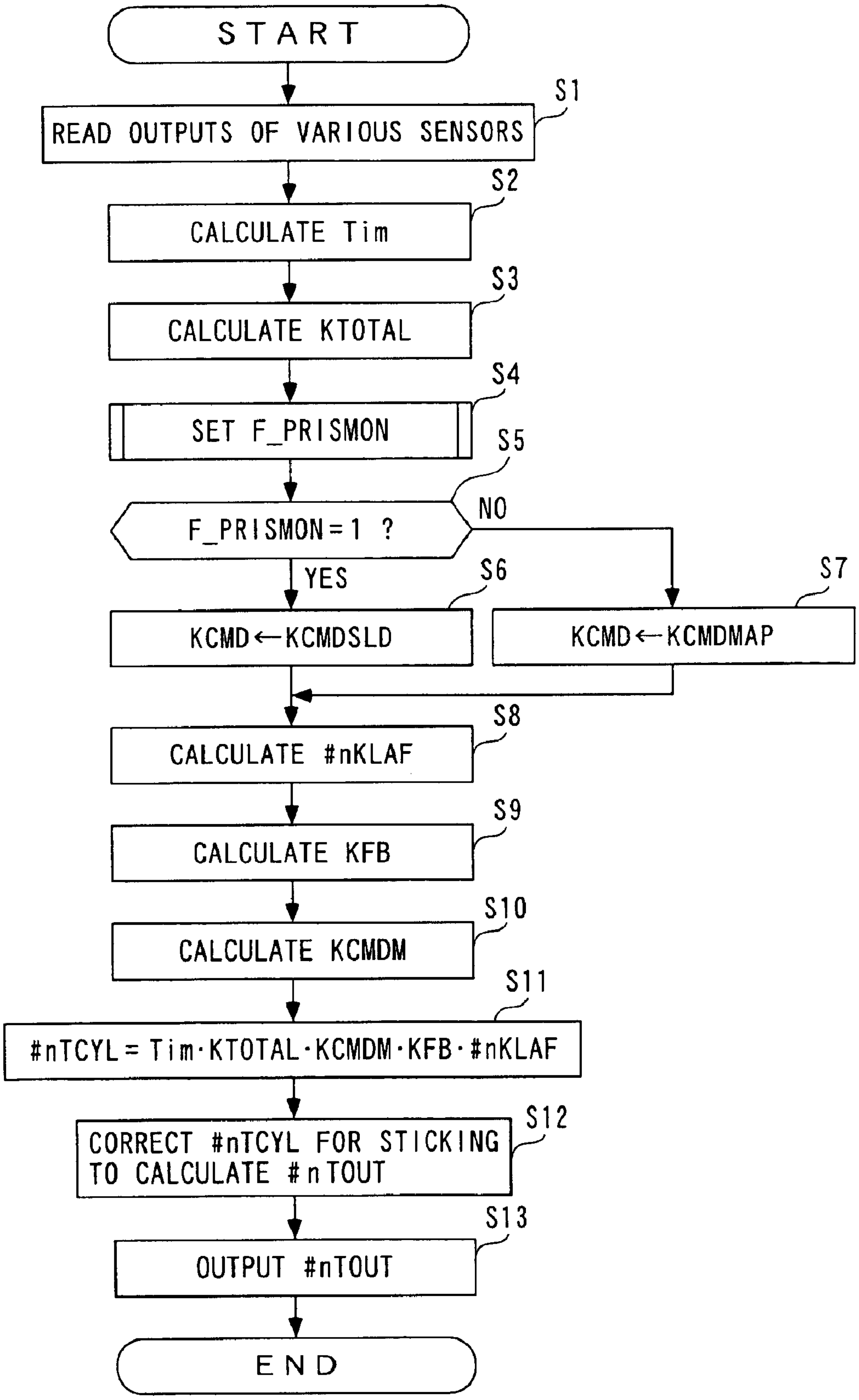
FIG. 12 is a flow chart illustrating a routine for executing fuel injection control processing for an internal combustion engine.

In the following, the processing involved in a calculation of a fuel injection amount, executed by the ECU 2, will be described with reference to FIG. 12. In the following description, the symbol (k) indicative of the current value is omitted as appropriate. FIG. 12 illustrates a main routine of this control processing which is executed in synchronism with an inputted TDC signal as an interrupt. In this processing, the ECU 2 uses the target air/fuel ratio KCMD calculated in accordance with adaptive air/fuel ratio control processing or map search processing, later described, to calculate the fuel injection amount TOUT for each cylinder.

First at step 1 (abbreviated as "S1" in the figure. The same applies to subsequent figures), the ECU 2 reads outputs of the variety of aforementioned sensors 10–19, and stores the read data in the RAM.

Next, the routine proceeds to step 2, where the ECU 2 calculates a basic fuel injection amount Tim. In this processing, the ECU 2 searches a map, not shown, for the basic fuel injection amount Tim in accordance with the engine rotational speed NE and absolute intake pipe inner pressure PBA.

Next, the routine proceeds to step 3, where the ECU 2 calculates a total correction coefficient KTOTAL. For calculating the total correction coefficient KTOTAL, the ECU 2 searches a variety of tables and maps for a variety of correction coefficients in accordance with a variety of operating parameters (for example, the intake air temperature TA, atmospheric pressure PA, engine water temperature TW, accelerator opening AP, and the like), and multiplies these correction coefficients by one another.

Next, the routine proceeds to step 4, where the ECU 2 sets an adaptive control flag F_PRISMON. Though details of this processing are not shown in the figure, specifically, when the following conditions (f1)–(f6) are fully satisfied, the ECU 2 sets the adaptive control flag F_PRISMON to "1" for showing the satisfied conditions, on the assumption that the conditions are met for using the target air/fuel ratio KCMD calculated in the adaptive air/fuel ratio control processing. On the other hand, if at least one of the conditions (f1)–(f6) is not satisfied, the ECU 2 sets the adaptive control flag F_PRISMON to "0":

(f1) the LAF sensor 14 and O2 sensor 15 are both activated;

(f2) the engine 3 is not in a lean burn operation;

(f3) the throttle valve 5 is not fully opened;

(f4) the ignition timing is not controlled to be retarded;

(f5) the engine 3 is not in a fuel cut operation; and (f6) the engine rotational speed NE and absolute intake pipe inner pressure PBA are both within their respective predetermined ranges.

Next, the routine proceeds to step 5, where it is determined whether or not the adaptive control flag F_PRISMON set at step 4 is "1." If the result of the determination at step 5 is YES, the routine proceeds to step 6, where the ECU 2 sets the target air/fuel ratio KCMD to an adaptive target air/fuel ratio KCMDSLD which is calculated by adaptive air/fuel ratio control processing, later described.

On the other hand, if the result of the determination at step 5 is NO, the routine proceeds to step 7, where the ECU 2 sets the target air/fuel ratio KCMD to a map value KCMDMAP. The map value KCMDMAP is searched from a map, not shown, in accordance with the engine rotational speed NE and absolute intake pipe inner pressure PBA.

At step 8 subsequent to the foregoing step 6 or 7, the ECU 2 calculates an observer feedback correction coefficient #nKLAF for each cylinder. The observer feedback correction coefficient #nKLAF is provided for correcting variations in the actual air/fuel ratio for each cylinder. Specifically, the ECU 2 calculates the observer feedback correction coefficient #nKLAF based on a PID control in accordance with an actual air/fuel ratio estimated by an observer for each cylinder from the output KACT of the LAF sensor 14. The symbol #n in the observer feedback correction coefficient #nKLAF represents the cylinder number #1–#4. The same applies as well to a required fuel injection amount #nTCYL and a final fuel injection amount #nTOUT, later described.

Next, the routine proceeds to step 9, where the ECU 2 calculates a feedback correction coefficient KFB. Specifically, the ECU 2 calculates the feedback coefficient KFB in the following manner. The ECU 2 calculates a feedback coefficient KLAF based on a PID control in accordance with a deviation of the output KACT of the LAF sensor 14 from the target air/fuel ratio KCMD. Also, the ECU 2 calculates a feedback correction coefficient KSTR by calculating the feedback correction coefficient KSTR by a self tuning regulator type adaptive controller, not shown, and dividing the feedback correction coefficient KSTR by the target air/fuel ratio KCMD. Then, the ECU 2 sets one of these two feedback coefficient KLAF and feedback correction coefficient KSTR as the feedback correction coefficient KFB in accordance with an operating condition of the engine 3.

Next, the routine proceeds to step 10, where the ECU 2 calculates a corrected target air/fuel ratio KCMDM. This corrected target air/fuel ratio KCMDM is provided for compensating filling efficiency for a change due to a change in the air/fuel ratio A/F. The ECU 2 searches a table, not shown, for the corrected target air/fuel ratio KCMDM in accordance with the target air/fuel ratio KCMD calculated at step 6 or 7.

Next, the routine proceeds to step 11, where the ECU 2 calculates the required fuel injection amount #nTCYL for each cylinder in accordance with the following equation (35) using the basic fuel injection amount Tim, total correction coefficient KTOTAL, observer feedback correction coefficient #nKLAF, feedback correction coefficient KFB, and corrected target air/fuel ratio KCMDM, which have been calculated as described above.

$$\#nTCYL = Tim \cdot KTOTAL \cdot KCMDM \cdot KFB \cdot \#nKLAF \tag{35}$$

Next, the routine proceeds to step 12, where the ECU 2 corrects the required fuel injection amount #nTCYL for sticking to calculate the final fuel injection amount #nTOUT. Specifically, the ECU 2 calculates this final fuel injection amount #nTOUT by calculating the proportion of fuel injected from the injector 6 which is stuck to the inner wall of the combustion chamber in the current combustion cycle in accordance with an operating condition of the engine 3, and correcting the required fuel injection amount #nTCYL based on the proportion thus calculated.

Next, the routine proceeds to step 13, where the ECU 2 outputs a driving signal based on the final fuel injection amount #nTOUT calculated in the foregoing manner to the injector 6 of a corresponding cylinder, followed by termination of the control processing.

Figure 13:
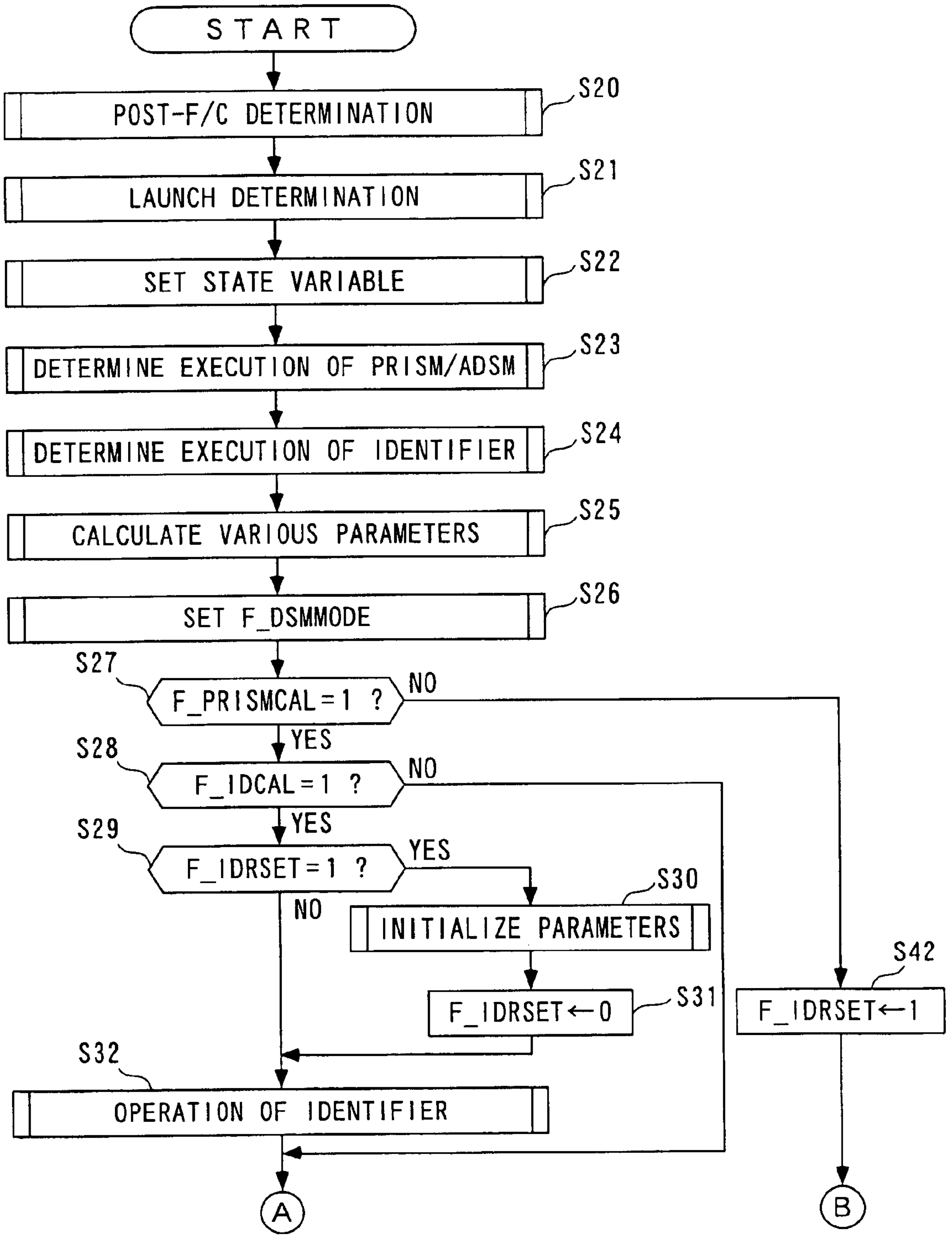
FIGS. 13 and 14 are flow charts illustrating in combination a routine for executing adaptive air/fuel ratio control processing.
Figure 14:
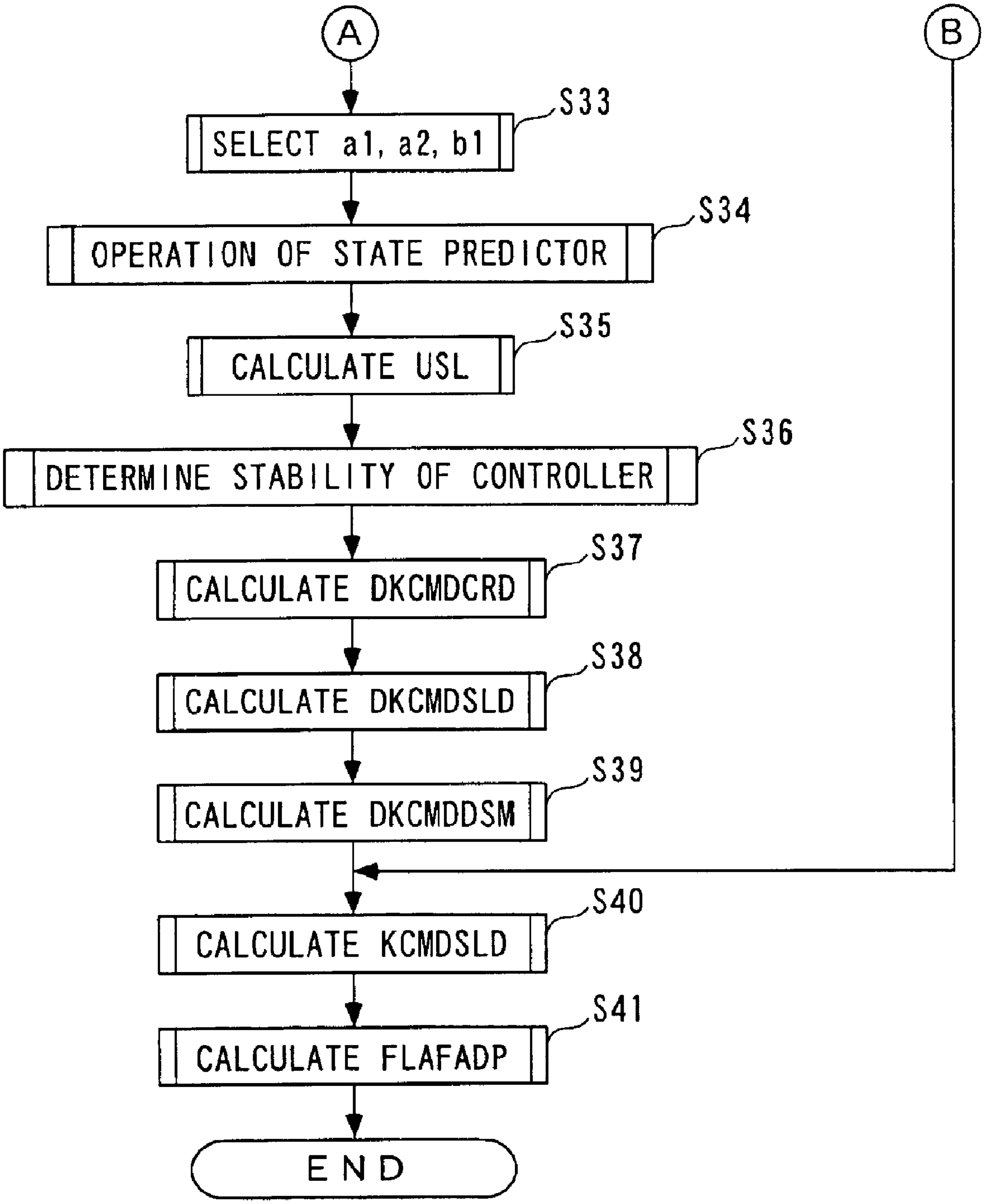

Referring next to FIGS. 13 and 14 which illustrate a routine for executing adaptive air/fuel ratio control processing, description will be made on the adaptive air/fuel ratio control processing including the ADSM processing and PRISM processing. This processing is executed at a predetermined period (for example, 10 msec). Also, in this processing, the ECU 2 calculates the target air/fuel ratio KCMD in accordance with an operating condition of the engine 3 by the ADSM processing, PRISM processing, catalyst reduction mode processing, or processing for setting a sliding mode control amount DKCMDSLD to a predetermined value SLDHOLD.

First, in this processing, the ECU 2 executes post-F/C determination processing at step 20. Though not shown in detail in the figure, during a fuel cut operation, the ECU 2 sets a post-F/C determination flag F_AFC to "1" for indicating that the engine 3 is in a fuel cut operation. When a predetermined time TM_AFC has elapsed after the end of the fuel cut operation, the ECU 2 sets the post-F/C determination flag F_AFC to "0" for indicating this situation.

Next, the routine proceeds to step 21, where the ECU 2 executes launch determination processing based on the vehicle speed VP for determining whether or not the vehicle equipped with the engine 3 has started. Specific details on this processing will be described later.

At step 22 subsequent to step 21, the ECU 2 executes processing for setting state variables. Though not shown, in this processing, the ECU 2 shifts all of the target air/fuel ratio KCMD, the output KACT of the LAF sensor 14, and time series data of the output deviation VO2, stored in the RAM, to the past by one sampling cycle. Then, the ECU 2 calculates current values of KCMD, KACT and VO2 based on the latest values of KCMD, KACT and time series data of VO2, the reference value FLAFBASE, and an adaptive correction term FLFADP, later described.

Next, the routine proceeds to step 23, where it is determined whether or not the PRISM/ADSM processing should be executed. This processing sets the value for a PRISM/ADSM execution flag F_PRISMCAL depending on whether conditions have been satisfied for executing the PRISM processing, ADSM processing and catalyst reduction mode processing, later described.

More specifically, when the following conditions (f7)–(f10) are fully satisfied, the ECU 2 sets the PRISM/ADSM execution flag F_PRISMCAL to "1" for indicating that the vehicle is in an operating condition in which the PRISM processing, ADSM processing or catalyst reduction mode processing should be executed. On the other hand, if at least one of the conditions (f7)–(f10) is not satisfied, the ECU 2 sets the PRISM/ADSM execution flag F_PRISMCAL to "0" for indicating that the vehicle is not in an operating condition in which the PRISM processing, ADSM processing or catalyst reduction mode processing should be executed:

(f7) the O2 sensor 15 is activated;

(f8) the LAF sensor 14 is activated;

(f9) the engine 3 is not in a lean burn operation; and (f10) the ignition timing is not controlled to be retarded.

At step 24 subsequent to step 23, the ECU 2 executes processing for determining whether or not the identifier 23 should executes the operation. In this processing, ECU 2 sets the value for an identification execution flag F_IDCAL in accordance with whether or not conditions are met for the on-board identifier 23 to identify parameters. Specifically, when the throttle valve opening θTH is not fully opened and the engine 3 is not in a fuel cut operation, the ECU 2 sets the identification execution flag F_IDCAL to "1" for indicating that the engine 3 is in an operating condition in which the identification of parameters should be executed. On the other hand, when the throttle valve opening θTH is fully opened or when the engine 3 is in a fuel cut operation, the ECU 2 sets the identification execution flag F_IDCAL to "0" on the assumption that the engine 3 is not in an operating condition in which the identification of parameters should be executed.

Next, the routine proceeds to step 25, where the ECU 2 calculates a variety of parameters (exhaust gas volume AB_SV and the like). Specific details of this calculation will be described later.

Next, the routine proceeds to step 26, where the ECU 2 sets an ADSM mode flag F_DSMMODE. Specific details of this setting will be described later.

Next, the routine proceeds to step 27, where it is determined whether or not the PRISM/ADSM execution flag F_PRISMCAL set at step 23 is "1." If the result of the determination at step 27 is YES, i.e., when conditions are met for executing the PRISM processing or ADSM processing, the routine proceeds to step 28, where it is determined whether or not the identification execution flag F_IDCAL set at step 24 is "1."

If the result of the determination at step 28 is YES, i.e., when the engine 3 is in an operating condition in which the on-board identifier 23 should execute the identification of parameters, the routine proceeds to step 29, where it is determined whether or not a parameter initialization flag F_IDRSET is "1." If the result of the determination at step 29 is NO, i.e., when the initialization is not required for the model parameters a1, a2, b1 stored in the RAM, the routine proceeds to step 32, later described.

On the other hand, if the result of the determination at step 29 is YES, i.e., when the initialization is required for the model parameters a1, a2, b1, the routine proceeds to step 30, where the ECU 2 sets the model parameters a1, a2, b1 to their respective initial values. Then, the routine proceeds to step 31, where the ECU 2 sets the parameter initialization flag F_IDRSET to 0 for indicating that the model parameters a1, a2, b1 have been set to the initial values.

At step 32 subsequent to step 31 or 29, the on-board identifier 23 executes the operation to identify the model parameters a1, a2, b1, followed by the routine proceeding to step 33 in FIG. 14, later described. Specific details on the operation of the on-board identifier 23 will be described later.

On the other hand, if the result of the determination at step 28 is NO, i.e., when the engine 3 is not in an operating condition in which the identification of the parameters should be executed, the routine skips the foregoing steps 29–32, and proceeds to step 33 in FIG. 14. At step 33 subsequent to step 28 or 32, the ECU 2 selects identified values or predetermined values for the model parameters a1, a2, b1. Though details on this operation are not shown, specifically, the model parameters a1, a2, b1 are set to the identified values provided at step 32 when the identification execution flag F_IDCAL set at step 24 is "1." On the other hand, when the identification execution flag F_IDCAL is "0," the model parameters a1, a2, b1 are set to the predetermined values.

Next, the routine proceeds to step 34, where the state predictor 22 executes the operation to calculate the predicted value PREVO2. Subsequently, the ECU 2 calculates the matrix elements α1, α2, βi, βj in the aforementioned equation (7), and substitutes these matrix elements α1, α2, βi, βj into equation (7) to calculates the predicted value PREVOS2 for the output deviation VO2.

Next, the routine proceeds to step 35, where the ECU 2 calculates the control amount USL (=Usl), as later described.

Next, the routine proceeds to step 36, where the ECU 2 executes processing for determining whether or not the SLD controller 25 is stable. Specifically, it is determined based on the value of the prediction switching function σPRE whether or not the sliding mode control conducted by the SLD controller 25 is stable. If it is determined that the sliding mode control remains stable, the ECU 2 sets both a low instability flag F_SLDST1 and a high instability flag F_SLDST2 to "0" for indicating the stable sliding mode control. On the other hand, if it is determined that the sliding mode control is instable in a low level range (hereinfater called the "low instability level"), the ECU 2 sets the low instability flag F_SLDST1 to "1" and the high instability flag F_SLDST2 to "0," respectively, for indicating the state of the sliding mode control. Further, if it is determined that the sliding mode control is instable in a high level range (hereinafter called the "high instability level"), the ECU 2 sets the low instability flag F_SLDST1 to "1" and the high instability flag F_SLDST2 to "1," respectively, for indicating the state of the sliding mode control.

Next, the routine proceeds to step 37, where the ECU 2 calculates a catalyst reduction mode control amount DKCMDCRD. The catalyst reduction mode control amount DKCMDCRD is provided for calculating the target air/fuel ratio KCMD in the catalyst reduction mode. Specifically, the ECU 2 searches a table, not shown, in accordance with an exhaust gas volume AB_SV for an appropriate value for the catalyst reduction mode control amount DKCMDCRD. In this table, the catalyst reduction mode control amount DKCMDCRD is set such that the target air/fuel ratio KCMD becomes richer to a smaller extent as the exhaust gas volume AB_SV is larger. Alternatively, the catalyst reduction mode control amount DKCMDCRD may be set to a predetermined value which corresponds to the air/fuel ratio A/F equal to 12. The catalyst reduction mode is an operation mode which is executed for reducing the catalyzers 8*a*, 8*b* after a fuel cut operation.

Next, at steps 38 and 39, the SLD controller 25 and DSM controller 24 calculate the sliding mode control amount DKCMDSLD and ΔΣ modulation control amount DKCMDDSM, respectively, as described later.

Next, the routine proceeds to step 40, where the ECU 2 calculates the adaptive target air/fuel ratio KCMDSLD using the sliding mode control amount DKCMDSLD calculated by the SLD controller 25 or the ΔΣ modulation control amount DKCMDDSM calculated by the DSM controller 24, as later described. Subsequently, the routine proceeds to step 41, where the ECU 2 calculates an adaptive correction term FLAFADP, as later described, followed by termination of the adaptive air/fuel ratio control processing.

Turning back again to FIG. 13, if the result of the determination at step 27 is NO, i.e., when conditions are not met for executing either the PRISM processing or the ADSM processing, the routine proceeds to step 42, where the ECU 2 sets the parameter initialization flag F_IDRSET to "1." Then, after executing the aforementioned steps 40, 41 in FIG. 14, the adaptive air/fuel ratio control processing is terminated.

Figure 15:
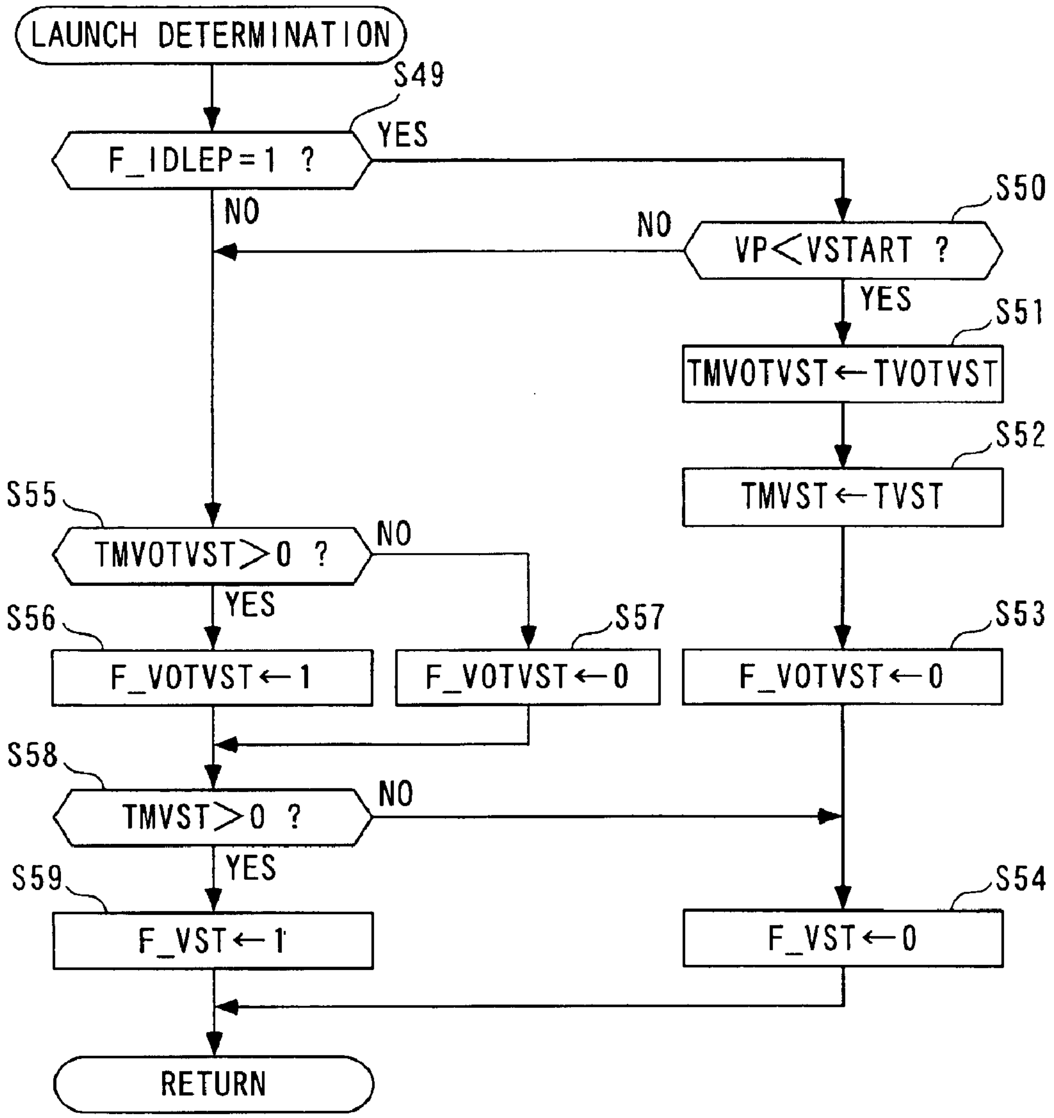
FIG. 15 is a flow chart illustrating a routine for executing launch determination processing at step 21 in FIG. 13.

Referring next to FIG. 15, description will be made on the aforementioned launch determination processing at step 21. In this processing, it is first determined at step 49 whether or not an idle operation flag F_IDLEP is "1." The idle operation flag F_IDLEP is set to "1" during an idle operation and otherwise to "0." It should be noted that for setting the idle operation flag F_IDLEP, it is determined whether or not the engine 3 is in idle operation based on the engine rotational speed NE, absolute intake pipe inner pressure PBA, throttle valve opening θTH, and the like.

If the result of the determination at step 49 is YES, indicating the idle operation, the routine proceeds to step 50, where it is determined whether or not the vehicle speed VP is lower than a predetermined vehicle speed VSTART (for example, 1 km/h). If the result of the determination at step 50 is YES, indicating that the vehicle is at rest, the routine proceeds to step 51, where the ECU 2 sets a timer value TMVOTVST on a fist launch determination timer of down-count type to a first predetermined time TVOTVST (for example, 3 msec).

Next, the routine proceeds to step 52, where the ECU 2 sets a timer value TMVST on a second launch determination timer of down-count type to a second predetermined time TVST (for example, 500 msec) longer than the first predetermined time TVOTVST. Then, at steps 53, 54, the ECU 2 sets both a first and a second launch flag F_VOTVST, F_VST to "0," followed by termination of the launch determination processing.

On the other hand, if the determination result at step 49 or 50 is NO, i.e., when the vehicle is not in idle operation or when the vehicle has been launched, the routine proceeds to step 55, where it is determined whether or not the timer value TMVOTVST on the first launch determination timer is larger than zero. If the result of the determination at step 55 is YES, indicating that the first predetermined time TVOVST has not elapsed after the end of the idle operation or after the vehicle was launched, the routine proceeds to step 56, where the ECU 2 sets the first launch flag F_VOTVST to 1 for indicating that the vehicle is now in a first launch mode.

On the other hand, if the result of the determination at step 55 is NO, indicating that the first predetermined time TVOTVST has elapsed after the end of the idle operation or after the vehicle was launched, the routine proceeds to step 57, where the ECU 2 sets the first launch flag F_VOTVST to "0" for indicating that the first launch mode has been terminated.

At step 58 subsequent to step 56 or 57, it is determined whether or not the timer value TMVST on the second launch determination timer is larger than zero. If the result of the determination at step 58 is YES, i.e., when the second predetermined time TVST has not elapsed after the end of the idle operation or after the vehicle was launched, the routine proceeds to step 59, where the ECU 2 sets the second launch flag F_VST to "1," indicating that the vehicle is now in a second launch mode, followed by termination of the launch determination processing.

On the other hand, if the result of the determination at step 58 is NO, i.e., when the second predetermined time TVST has elapsed after the end of the idle operation or after the vehicle was launched, the ECU 2 executes the aforementioned step 54 on the assumption that the second launch mode has been terminated, followed by termination of the launch determination processing.

Figure 16:
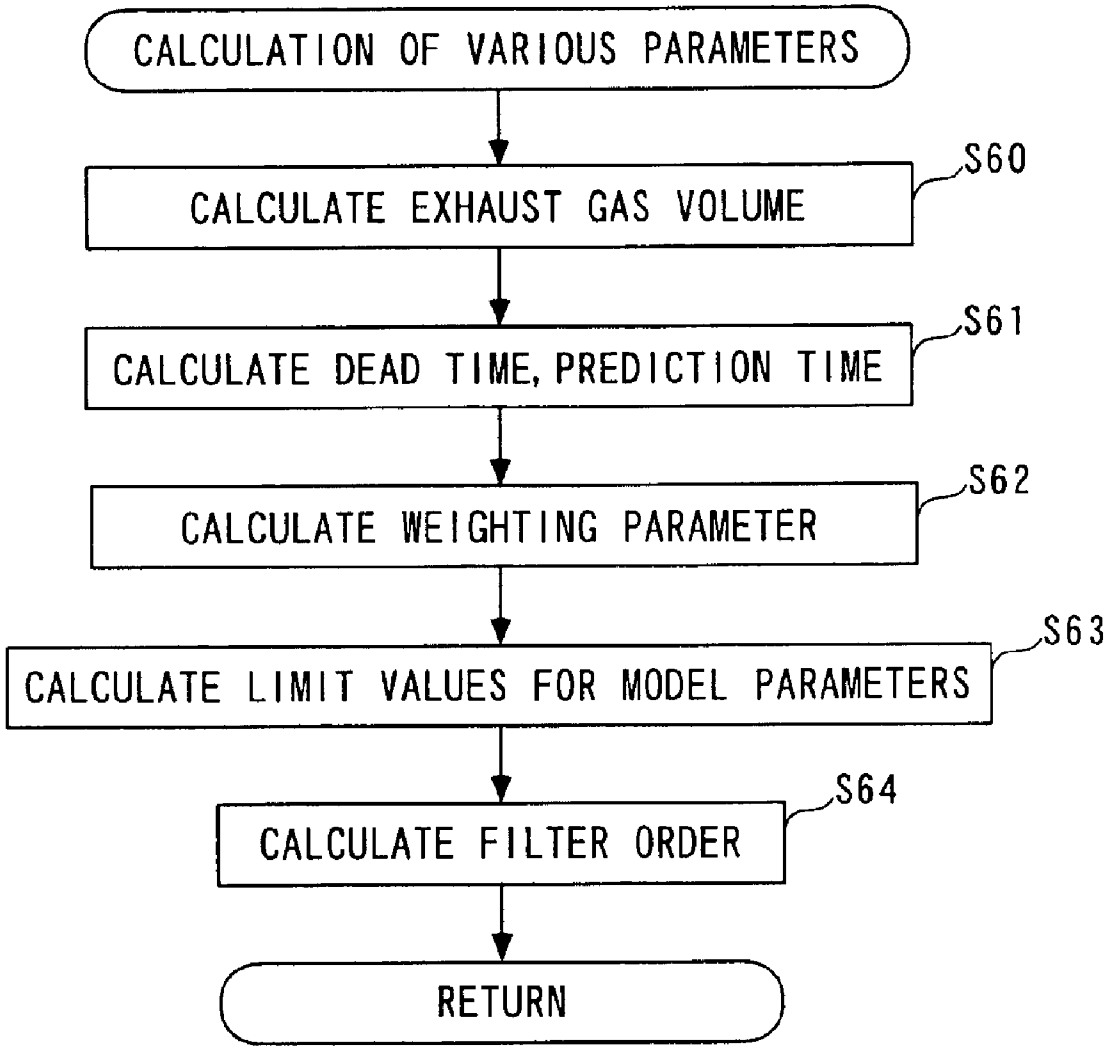
FIG. 16 is a flow chart illustrating a routine for calculating a variety of parameters at step 25 in FIG. 13.

Referring next to FIG. 16, description will be made on a routine for calculating a variety of parameters at the aforementioned step 25. First, in this processing, the ECU 2 calculates the exhaust gas volume AB_SV (estimated value of a space velocity) in accordance with the following equation (36) at step 60:

$$AB\_SV=(NE/1500)\cdot PBA\cdot SVPRA \tag{36}$$

where SVPRA is a predetermined coefficient which is determined based on the displacement of the engine 3.

Next, the routine proceeds to step 61, where the ECU 2 calculates a dead time KACT_D (=d') in the aforementioned air/fuel ratio manipulation system, a dead time CAT_DELAY (=d) in the exhaust system, and a prediction time dt. Specifically, the ECU 2 searches a table, not shown, for the dead times KACT_D, CAT_DELAY, respectively, in accordance with the exhaust gas volume AB_SV calculated at step 60, and sets the sum of these dead times (KACT_D+CAT_DELAY) as the prediction time dt. In other words, in this control program, the phase delay time dd is set to zero.

Next, the routine proceeds to step 62, where the ECU 2 calculates weighting parameters $\lambda 1$, $\lambda 2$ of the identification algorithm. Specifically, the ECU 2 sets the weighting parameter $\lambda 2$ to one, and simultaneously searches a table, not shown, for the weighting parameter $\lambda 1$ in accordance with the exhaust gas volume AB_SV.

Next, the routine proceeds to step 63, where the ECU 2 searches a table, not shown, for a lower limit value IDA2L for limiting allowable ranges of the model parameters a1, a2, and a lower limit value X_IDB1L and an upper limit value IDB1H for limiting an allowable range of the model parameter b1 in accordance with the exhaust gas volume AB_SV.

Next, the routine proceeds to step 64, where the ECU 2 calculates the filter order n of the moving average filtering processing, followed by termination of the processing. In this processing, the ECU 2 searches a table, not shown, for the filter order n in accordance with the exhaust gas volume AB_SV.

Figure 17:
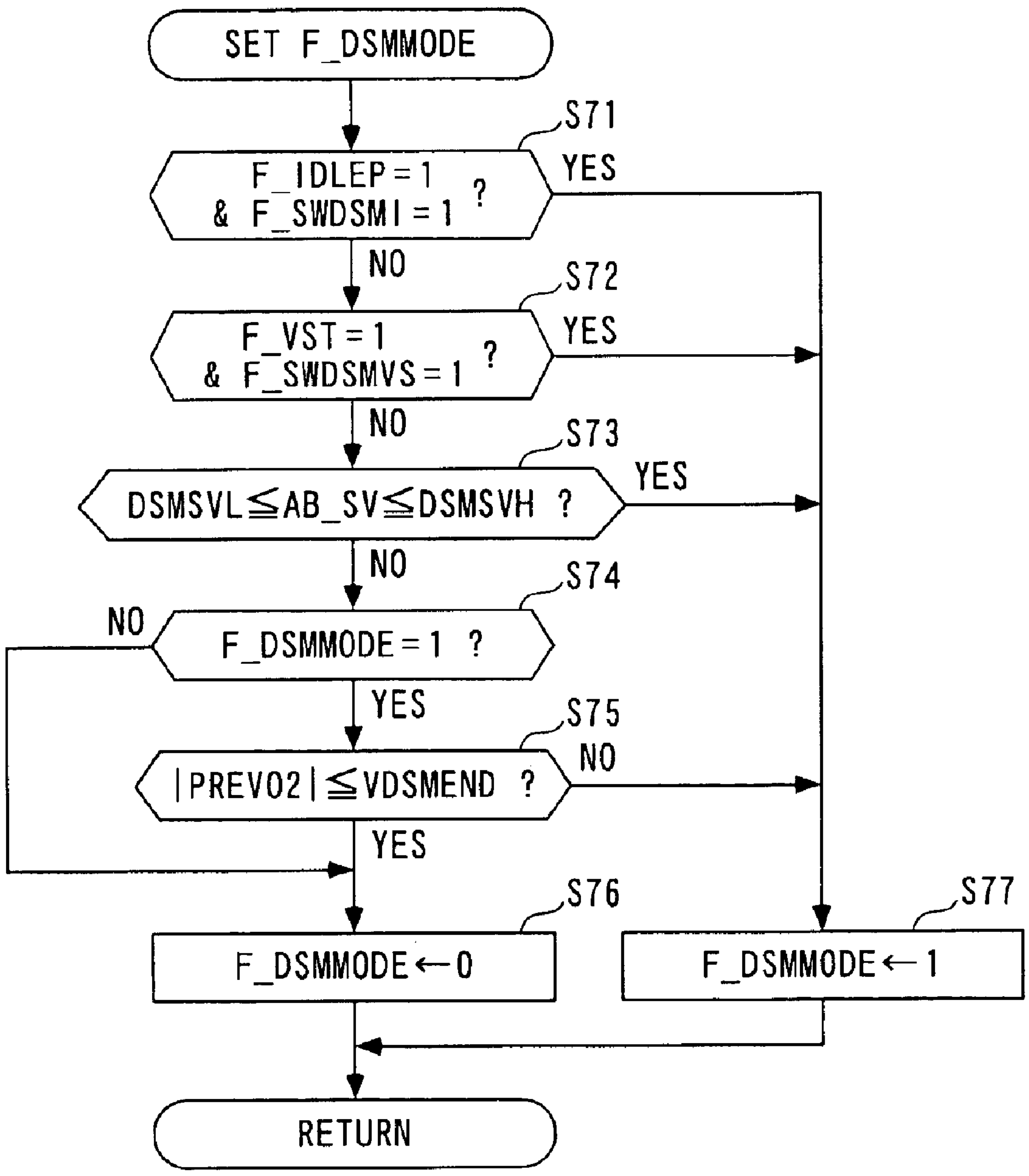
FIG. 17 is a flow chart illustrating a routine for setting an ADSM mode flag F_DSMMODE at step 26 in FIG. 13.

Referring next to FIG. 17, description will be made on a routine for setting the ADSM mode flag F_DSMMODE at the aforementioned step 26. As illustrated in FIG. 17, in this processing, it is first determined at step 71 whether or not the idle operation flag F_IDLEP and an idle time ADSM flag F_SWDSMI are both set at "1." The idle time ADSM flag F_SWDSM1 is set to "1" when the engine 3 is in idle operation and in an operating condition in which the ADSM processing should be executed, and otherwise to "0."

If the result of the determination at step 71 is YES, indicating that the engine 3 is in idle operation and in an operating condition in which the ADSM processing can be executed, the routine proceeds to step 77, where the ECU 2 sets the ADSM mode flag F_DSMMODE to "1" for indicating that the engine 3 is in an operating condition in which the ADSM processing should be executed, followed by termination of the setting routine.

On the other hand, if the result of the determination at step 71 is NO, the routine proceeds to step 72, where it is determined whether or not both the second launch flag F_VST and a launch time ADSM flag F_SWDSMVS are both "1." The launch time ADSM flag F_SWDSMVS is set to "1" when the engine 3 is in an operating condition in which the ADSM processing should be executed during a launch of the vehicle, and otherwise to "0."

If the result of the determination at step 72 is YES, indicating that the engine 3 is in the second launch mode and in an operating condition in which the ADSM processing should be executed during a launch of the vehicle, the ECU 2 executes the aforementioned step 77, followed by termination of the setting routine.

On the other hand, if the result of the determination at step 72 is NO, the routine proceeds to step 73, where it is determined whether or not the exhaust gas volume AB_SV falls within a range between a predetermined lower limit value DSMSVL and a predetermined upper limit value DSMSVH. If the result of the determination at step 73 is YES, the ECU 2 executes the aforementioned step 77 on the assumption that a load on the engine 3 is in a condition in which the ADSM processing should be executed, followed by termination of the setting routine.

On the other hand, if the result of the determination at step 73 is NO, the routine proceeds to step 74, where it is determined whether or not "1" is set to the ADSM mode flag F_DSMMODE in the preceding loop which is stored in the RAM.

If the result of the determination at step 74 is YES, the routine proceeds to step 75, where it is determined whether or not the absolute value of the predicted value PREVO2 of the output deviation, calculated in the preceding loop and stored in the RAM, is equal to or smaller than a predetermined value VDSMEND (value for defining a predetermined range). If the result of the determination at step 75 is YES, the routine proceeds to step 76, where the ECU 2 sets the ADSM mode flag F_DSMMODE to "0" for indicating that the engine 3 is in an operating condition in which the target air/fuel ratio KCMD should be calculated by the PRISM processing which is switched from the ADSM processing, followed by termination of the setting routine.

On the other hand, if the result of the determination at step 75 is NO, the ECU 2 executes the aforementioned step 77, followed by termination of the setting routine.

If the result of the determination at step 74 is NO, the ECU 2 skips step 75 and executes step 76, followed by termination of the setting routine.

As described above, in the setting of the ADSM mode flag F_DSMMODE, when the conditions for executing the ADSM processing at steps 71–73 are not satisfied, and when the conditions for executing the ADSM processing had been satisfied in the preceding loop, the ADSM mode flag F_DSMMODE is set to "0" when the absolute value of the preceding predicted value PREVO2 for the output deviation is equal to or less than the predetermined value VDSMEND, in other words, when the output Vout of the O2 sensor 15 is close to the target value Vop, and otherwise to "1." The reason for this setting will be described later.

Figure 18:
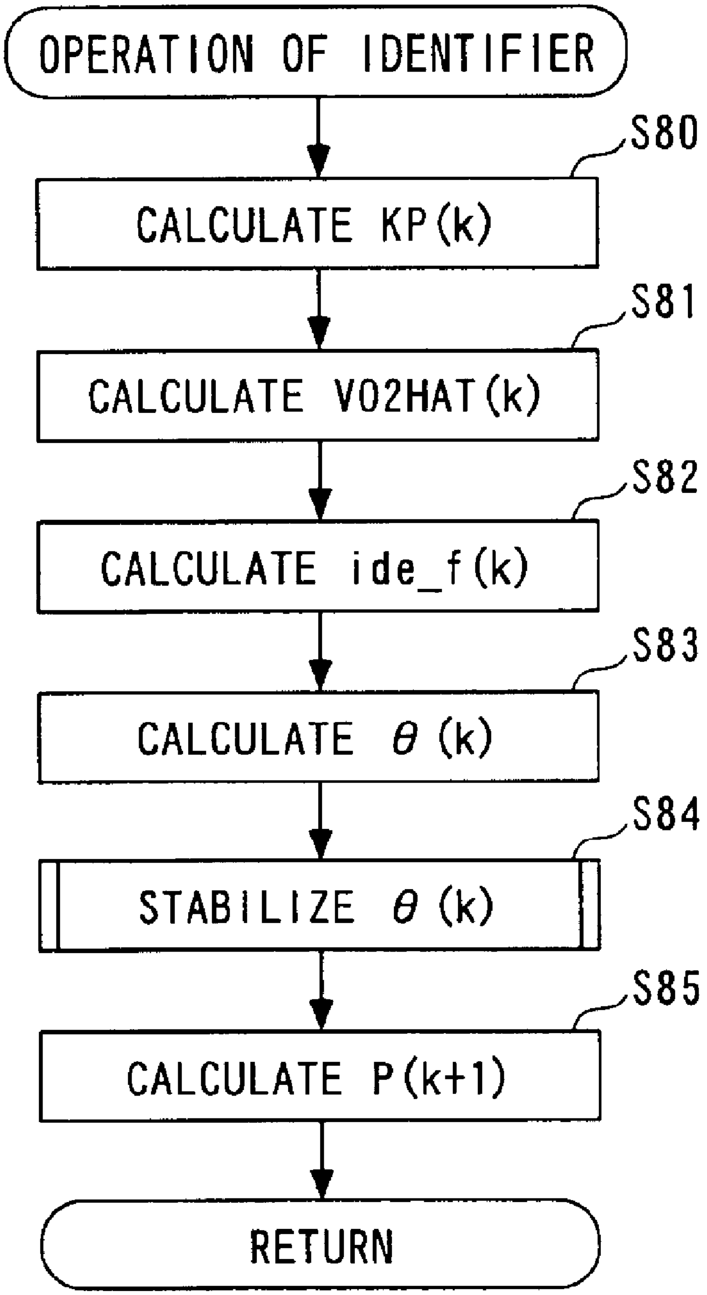
FIG. 18 is a flow chart illustrating a routine of the operation performed by an on-board identifier at step 32 in FIG. 13.

Referring next to FIG. 18, description will be made on the operation performed by the on-board identifier 23 at step 32. As illustrated in FIG. 18, in this operation, the on-board identifier 23 first calculates the gain coefficient KP(k) in accordance with the aforementioned equation (14) at step 80. Next, the routine proceeds to step 81, where the on-board identifier 23 calculates the identified value VO2HAT(k) for the output deviation VO2 in accordance with the aforementioned equation (12).

Next, the routine proceeds to step 82, where the on-board identifier 23 calculates the identification error filter value ide_f(k) in accordance with the aforementioned equations (10), (11). Subsequently, the routine proceeds to step 83, where the on-board identifier 23 calculates the vector θ(k) for model parameters in accordance with the aforementioned equation (8).

Next, the routine proceeds to step 84, where the on-board identifier 23 executes processing for stabilizing the vector θ(k) for the model parameters. Though details on the stabilization are not illustrated, the on-board identifier 23 limits the identified values a1', a2' for the model parameters calculated at step 83 within an allowable range based on the lower limit value IDA2L calculated at step 63 to calculate the model parameters a1, a2. In addition, the on-board identifier 23 limits the identified value b1' for the model parameter b1 within an allowable range based on the upper and lower limit values IDB1L, IDB1H calculated at step 63 to calculate the model parameter b1. With the foregoing calculations, the model parameters a1, a2, b1 are set to those values which can ensure the stability of the control system.

Next, the routine proceeds to step 85, where the on-board identifier 23 calculates the next value P(k+1) for the square matrix P(k) in accordance with the aforementioned equation (15). This next value P(k+1) is used as the value for the square matrix P(k) in the calculation in the next loop.

Figure 19:
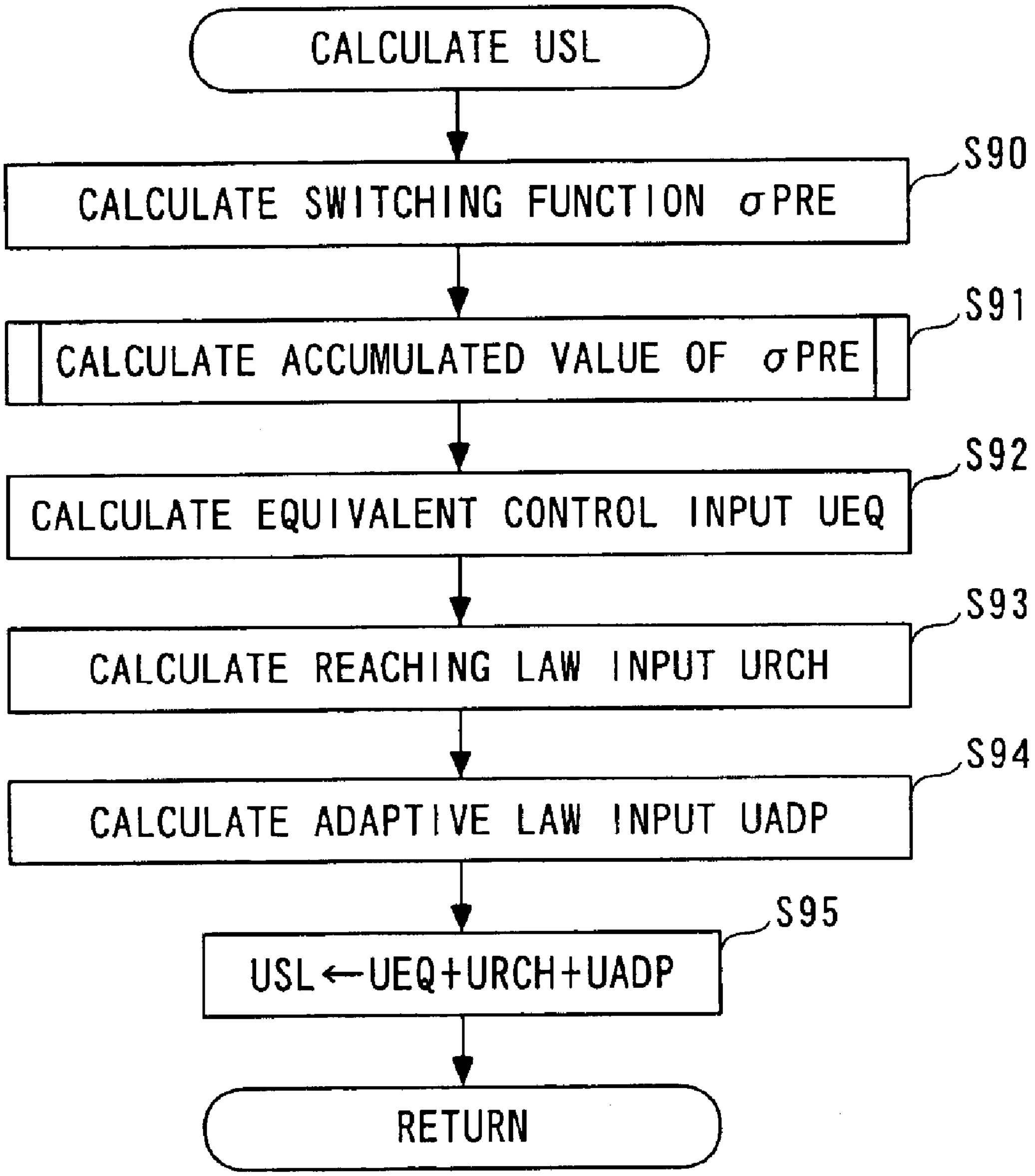
FIG. 19 is a flow chart illustrating a routine for calculating a control amount USL at step 35 in FIG. 14.

Referring next to FIG. 19, description will be made on a routine for calculating the control amount USL at the aforementioned step 35. In this routine, at step 90, the ECU 2 first calculates the prediction switching function σPRE in accordance with the aforementioned equation (30) in FIG. 11.

Figure 20:
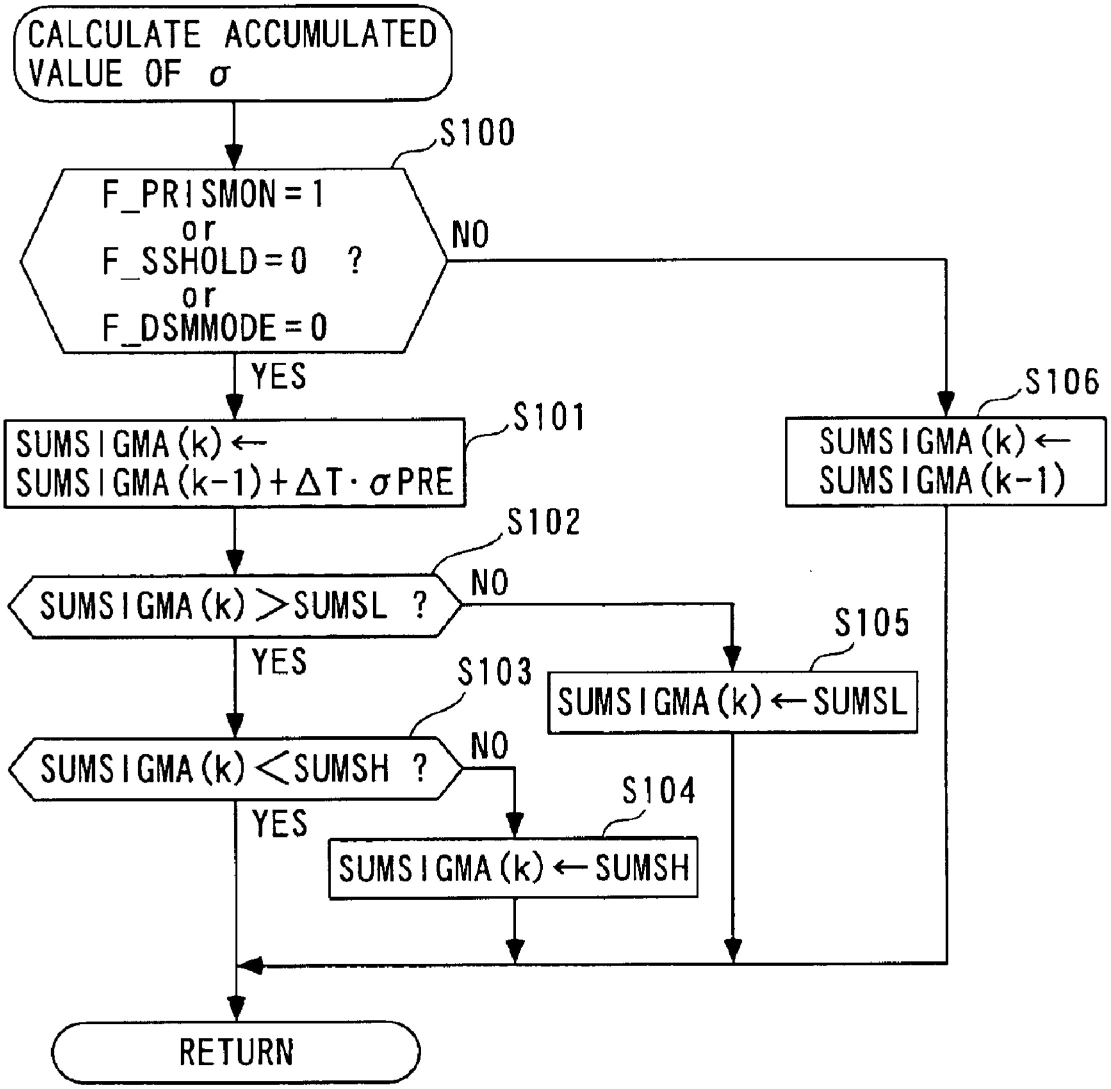
FIG. 20 is a flow chart illustrating a routine for calculating an accumulated value of a prediction switching function σPRE at step 91 in FIG. 19.

Then, the routine proceeds to step 91, where the ECU 2 calculates an integrated value SUMSIGMA of the prediction switching function σPRE. As illustrated in FIG. 20, in the calculation of the integrated value SUMSIGMA, it is first determined at step 100 whether or not at least one of the following three conditions (f11)–(f13) is satisfied:

(f11) the adaptive control flag F_PRISMON is "1";

(f12) an integrated value holding flag F_SSHOLD, later described, is 0; and (f13) the ADSM mode flag F_DSMMODE is "0."

If the result of the determination at step 100 is YES, i.e., when the condition is satisfied for calculating the integrated value SUMSIGMA, the routine proceeds to step 101, where the ECU 2 sets a current value SUMSIGMA (k) of the integrated value SUMSIGMA to a value which is calculated by adding the product of a control period ΔT and the prediction switching function σPRE to the preceding value $$SUMSIGMA(k-1)\ [SUMSIGMA(k-1)+\Delta T\cdot\sigma PRE].$$

Next, the routine proceeds to step 102, where it is determined whether or not the current value SUMSIGMA(k) calculated at step 101 is larger than a predetermined lower limit value SUMSL. If the result of the determination at step 102 is YES, the routine proceeds to step 103, where it is determined whether or not the current value SUMSIGMA(k) is smaller than a predetermined upper limit value SUMSH. If the result of the determination at step 103 is YES, indicating that SUMSL<SUMSIGMA(k)<SUMSH, the routine for calculating the prediction switching function σPRE is terminated without further processing.

On the other hand, if the result of the determination at step 103 is NO, indicating that SUMSIGMA(k)≧SUMSH, the routine proceeds to step 104, where the ECU 2 sets the current value SUMSIGMA(k) to the upper limit value SUMSH, followed by termination of the routine for calculating the prediction switching function σPRE. On the other hand, if the result of the determination at step 102 is NO, indicating SUMSIGMA(k)≦SUMSL, the routine proceeds to step 165, where the ECU 2 sets the current value SUMSIGMA(k) to the lower limit value SUMSL, followed by termination of the routine for calculating the prediction switching function σPRE.

At step 100, if the result of the determination is NO, i.e., when any of the three conditions (f11)–(f13) is not satisfied to result in a failed establishment of the condition for calculating the integrated value SUMSIGMA, the routine proceeds to step 106, where the ECU 2 sets the current value SUMSIGMA(k) to the preceding value SUMSIGMA(k−1). In other words, the integrated value SUMSIGMA is held unchanged. Subsequently, the routine for calculating the prediction switching function σPRE is terminated.

Turning back to FIG. 19, at steps 92–94 subsequent to step 91, the ECU 2 calculates the equivalent control input UEQ (=Ueq), reaching law input URCH (=Urch), and adaptive law input UADP (=Uadp) in accordance with the aforementioned equations (32)–(34), respectively, in FIG. 11.

Next, the routine proceeds to step 95, where the ECU 2 sets the sum of these equivalent control input UEQ, reaching law input URCH, and adaptive law input UADP as the control amount USL, followed by termination of the routine for calculating the control amount USL.

Figure 21:
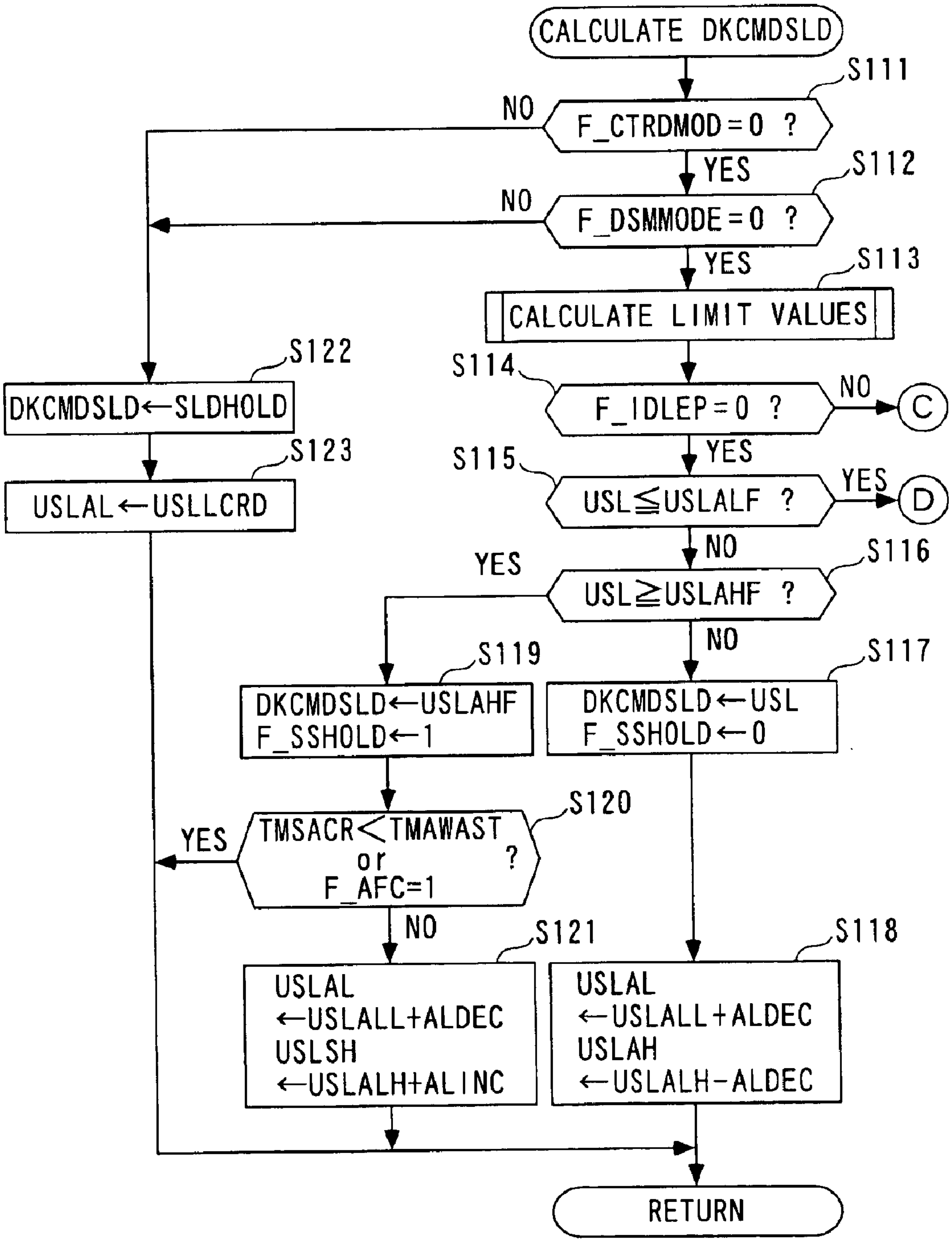
FIGS. 21 and 22 are flow charts illustrating in combination a routine for calculating a sliding mode control amount DKCMDSLD at step 38 in FIG. 14.
Figure 22:
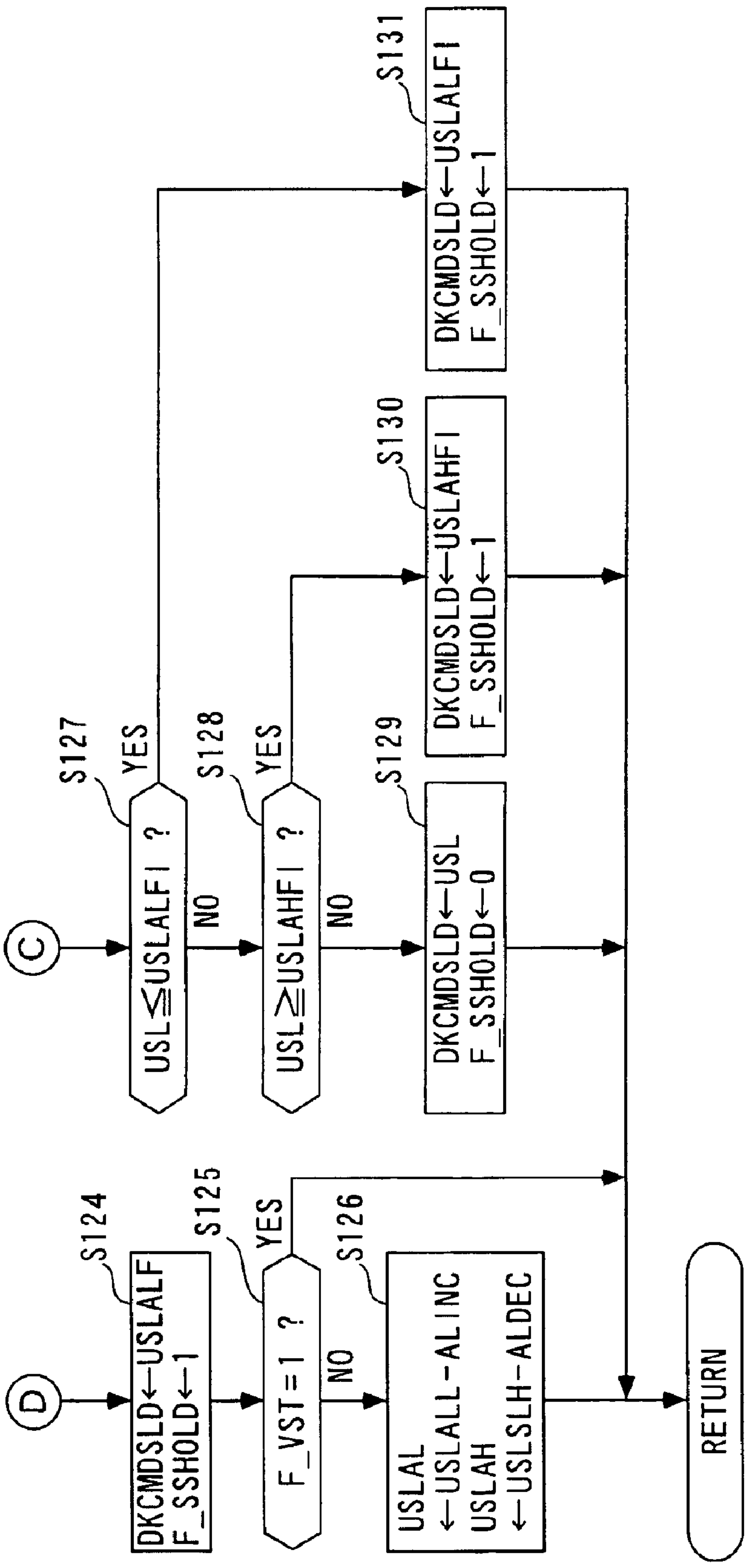

Referring next to FIGS. 21 and 22, description will be made on a routine for calculating the sliding mode control amount DKCMDSLD at the aforementioned step 38 in FIG. 14. This routine limits the control amount USL calculated at step 95 within an allowable range defined by a variety of upper and lower limit values, later described, to calculate the sliding mode control amount DKCMDSLD.

First, in this routine, it is determined at step 111 whether or not a catalyst reduction mode flag F_CTRDMOD is "0." The catalyst reduction mode flag F_CTRDMOD is set to "1" when the engine 3 is in a catalyst reduction mode, and otherwise to "0."

If the result of the determination at step 111 is YES, indicating that the engine 3 is not in the catalyst reduction mode, the routine proceeds to step 112, where it is determined whether or not the ADSM mode flag F_DSMMODE is "0."

If the result of the determination at step 112 is YES, indicating that the engine 3 is in an operating condition in which the PRISM processing should be executed, the routine proceeds to step 113, where the ECU 2 calculates limit values. As will be later described, in the limit value calculation, the ECU 2 calculates adaptive upper and lower limit values USLAH, USLAL, their limited values USLALH, USLALL, upper and lower limit values USLAHF, USLALF for non-idle operation, and upper and lower limit values USLAHFI, USLALFI for idle operation.

Next, the routine proceeds to step 114, where it is determined whether or not the idle operation flag F_IDLEP is "0." If the result of the determination at step 114 is YES, indicating that the engine 3 is not in idle operation, the routine proceeds to step 115, where it is determined whether or not the control amount USL calculated at step 95 is equal to or lower than the lower limit value USLALF for non-idle operation (a value which defines a lower limit of an allowable range).

If the result of the determination at step 115 is NO, indicating that USL>USLALF, the routine proceeds to step 116, where it is determined whether or not the control amount USL is equal to or higher than the upper limit value USLAHF for non-idle operation. If the result of the determination at step 116 is NO, indicating that USLALF<USL<USLAHF, the routine proceeds to step 117, where the ECU 2 sets the sliding mode control amount DKCMDSLD to the control amount USL, and simultaneously sets an accumulated value hold flag F__SSHOLD to "0."

Next, the routine proceeds to step 118, where the ECU 2 sets the adaptive lower limit value USLAL to the sum of its limited value USLALL and a predetermined reduction side value ALDEC [USLALL+ALDEC], and simultaneously sets the adaptive upper limit value USLAH to the resulting value of subtracting the predetermined reduction side value ALDEC from its limited value USLALH [USLALH−ALDEC], followed by termination of the routine for calculating the sliding mode control amount DKCMDSLD.

On the other hand, if the result of determination at step 116 is YES, indicating that USLUSLAHF, the routine proceeds to step 119, where the ECU 2 sets the sliding mode control amount DKCMDSLD to the adaptive upper limit value USLAHF for non-idle operation, and simultaneously sets the accumulated value hold flag F__SSHOLD to "1."

Next, the routine proceeds to step 120, where it is determined whether or not a post-start timer presents a timer value TMACR smaller than a predetermined time TMAWAST, or whether or not an post-F/C determination flag F__AFC is "1." This post-start timer is an up-count type timer for measuring a time elapsed after the start of the engine 3.

If the result of the determination at step 120 is YES, i.e., when the predetermined time TMAWAST has not elapsed after the start of the engine 3, or when a predetermined time TM__AFC has not elapsed after a fuel cut operation is terminated, the processing for calculating the sliding mode control amount DKCMDSLD is terminated without further processing.

On the other hand, if the result of the determination at step 120 is NO, i.e., when the predetermined time TMAWAST has elapsed after the start of the engine 3, and when the predetermined time TM__AFC has elapsed after a fuel cut operation, the routine proceeds to step 121, where the ECU 2 sets the adaptive lower limit value USLAL to the sum of its limited value USLALL and the reduction side value ALDEC [USLALL+ALDEC], and simultaneously sets the adaptive upper limit value USLAH to the sum of its limited value USLALH and a predetermined extension side value ALINC [USLALH+ALINC], followed by termination of the routine for calculating the sliding mode control amount DKCMDSLD.

On the other hand, if the result of the determination at step 115 is YES, indicating that USLUSLALF, the routine proceeds to step 124 in FIG. 22, where the ECU 2 sets the sliding mode control amount DKCMDSLD to the adaptive lower limit value USLALF for non-idle operation, and simultaneously sets the accumulated value hold flag F__SSHOLD to "1."

Next, the routine proceeds to step 125, where it is determined whether or not a second launch flag F__VST is "1." If the result of the determination at step 125 is YES, i.e., when a second predetermined time TVST has not elapsed after the launch of the vehicle so that the vehicle is still in a second launch mode, the processing for calculating the sliding mode control amount DKCMDSLD is terminated without further processing.

On the other hand, if the result of the determination at step 125 is NO, i.e., when the second predetermined time TVST has elapsed after the launch of the vehicle so that the second launch mode has been terminated, the routine proceeds to step 126, where the ECU 2 sets the adaptive lower limit value USLAL to the resulting value of subtracting the extension side value ALINC from its limited value USLALL [USLALL−ALINC], and simultaneously sets the adatpive upper limit value USLAH to the resulting value of subtracting the reduction side value ALDEC from its limited value USLALH [USLALH−ALDEC], followed by termination of the routine for calculating the sliding mode control amount DKCMDSLD.

Turning back to step 114, if the result of the determination is NO, indicating that the engine 3 is in an idle operation, the routine proceeds to step 127 in FIG. 22, where it is determined whether or not the control amount USL is equal to or smaller than the lower limit value USLALFI for idle operation. If the result of the determination at step 127 is NO, indicating that USL>USLALFI, the routine proceeds to step 128, where it is determined whether or not the control amount USL is equal to or larger than the upper limit value USLAHFI for idle operation.

If the result of the determination at step 128 is NO, indicating that USLALFI<USL<USLAHFI, the routine proceeds to step 129, where the ECU 2 sets the sliding mode control amount DKCMDSLD to the control amount USL, and simultaneously sets the accumulated value hold flag F__SSHOLD to "0," followed by termination of the routine for calculating the sliding mode control amount DKCMDSLD.

On the other hand, if the result of the determination at step 128 is YES, indicating that USL≧USLAHFI, the routine proceeds to step 130, where the ECU 2 sets the sliding mode control amount DKCMDSLD to the upper limit value USLAHFI for idle operation, and simultaneously sets the accumulated value hold flag F__SSHOLD to "1," followed by termination of the routine for calculating the sliding mode control amount DKCMDSLD.

On the other hand, if the result of the determination at step 127 is YES, indicating that USL≦USLALFI, the routine proceeds to step 131, where the ECU 2 sets the sliding mode control amount DKCMDSLD to the lower limit value USLALFI for idle operation, and simultaneously sets the accumulated value hold flag F__SSHOLD to "1," followed by termination of the routine for calculating the sliding mode control amount DKCMDSLD.

Turning back to FIG. 21, if the result of the determination at any of the aforementioned steps 111, 112 is NO, i.e., when the engine 3 is in the catalyst reduction mode or when the engine 3 is in an operating condition in which the ADSM processing should be executed, the routine proceeds to step 122, where the ECU 2 sets the sliding mode control amount DKCMDSLD to the predetermined value SLDHOLD. This predetermined value SLDHOLD is set to such a value that prevents the target air/fuel ratio KCMD calculated at step 193 from being excessively lean immediately after the calculation of the target air/fuel ratio KCMD switched to the PRISM processing from the ADSM processing, as will be later described.

Next, the routine proceeds to step 123, where the ECU 2 sets the adaptive lower limit value USLAL to a predetermined initial value USLLCRD, followed by termination of the routine for calculating the sliding mode control amount DKCMDSLD. As will be later described, the initial value USLLCRD is provided for setting an allowable range for the sliding mode control amount DKCMDSLD in the foregoing processing in FIGS. 21 and 22 such that the target air/fuel ratio KCMD is not excessively lean in an initial stage after the calculation of the target air/fuel ratio KCMD is switched to the PRISM processing from the ADSM processing.

As described above, in the processing for calculating the sliding mode control amount DKCMDSLD, when the ECU

2 and engine 3 are in a condition in which the adaptive target air/fuel ratio KCMDSLD should be calculated by the PRISM processing, the sliding mode control amount DKCMDSLD is set to a value within an allowable range defined by the upper and lower limit values USLAHFI, USLALFI for idle operation and the upper and lower limit values USLAHF, USLALF for non-idle operation. In other words, the sliding mode control amount DKCMDSLD is set to a value within the limited range.

On the other hand, when the ECU 2 or engine 3 is not in a condition in which the adaptive target air/fuel ratio KCMDSLD should be calculated by the PRISM processing, the sliding mode control amount DKCMDSLD is set to the predetermined value SLDHOLD, and simultaneously the adaptive lower limit value USLAL is set to the predetermined initial value USLLCRD. These settings are intended to control the target air/fuel ratio KCMD not to change excessively to the leaner side in an initial stage after the calculation of the target air/fuel ratio KCMD switched to the PRISM processing from the ADSM processing, as will be later described.

Figure 23:
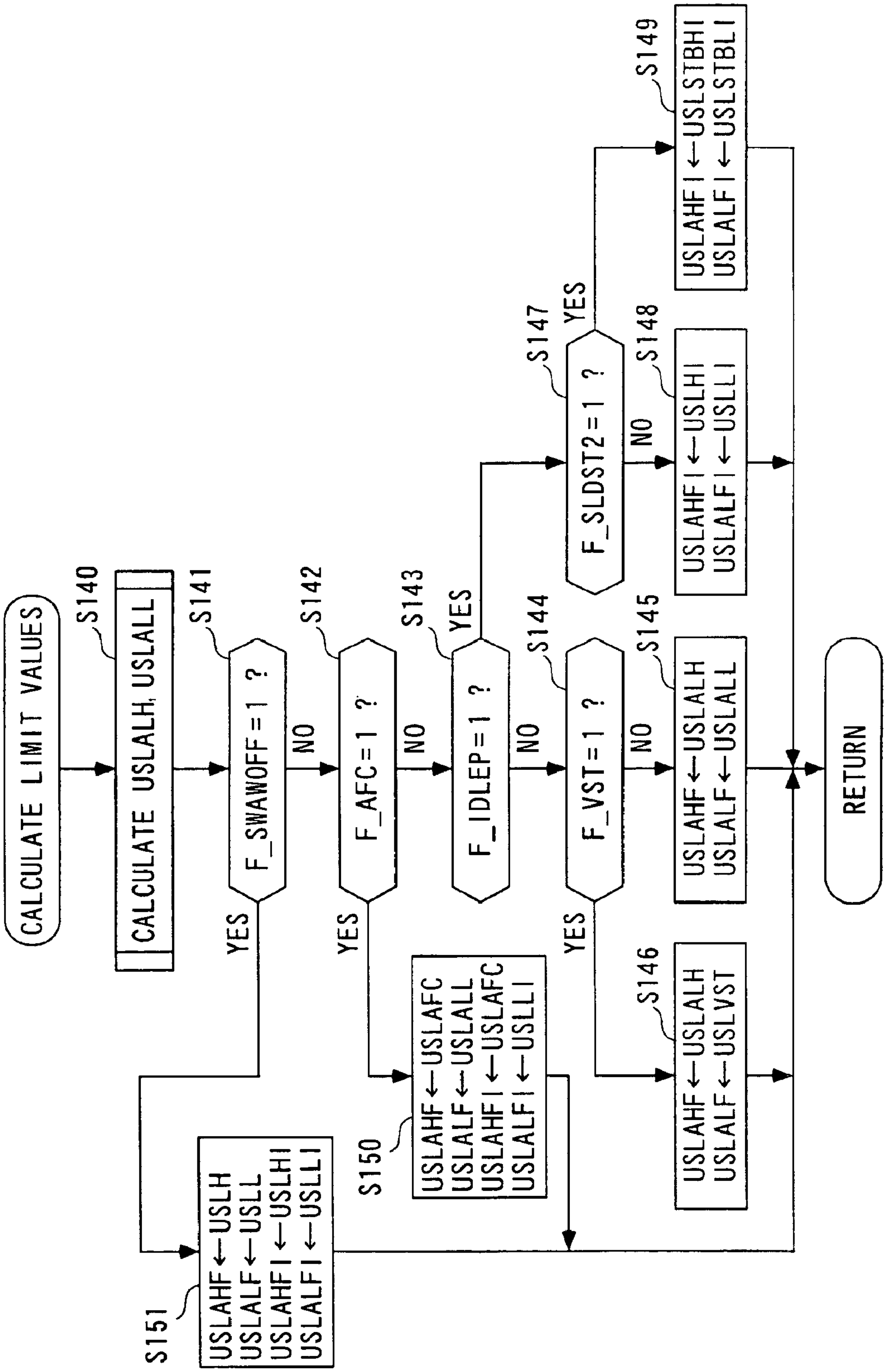
FIG. 23 is a flow chart illustrating a routine for calculating limit values at step 113 in FIG. 21.
Figure 24:
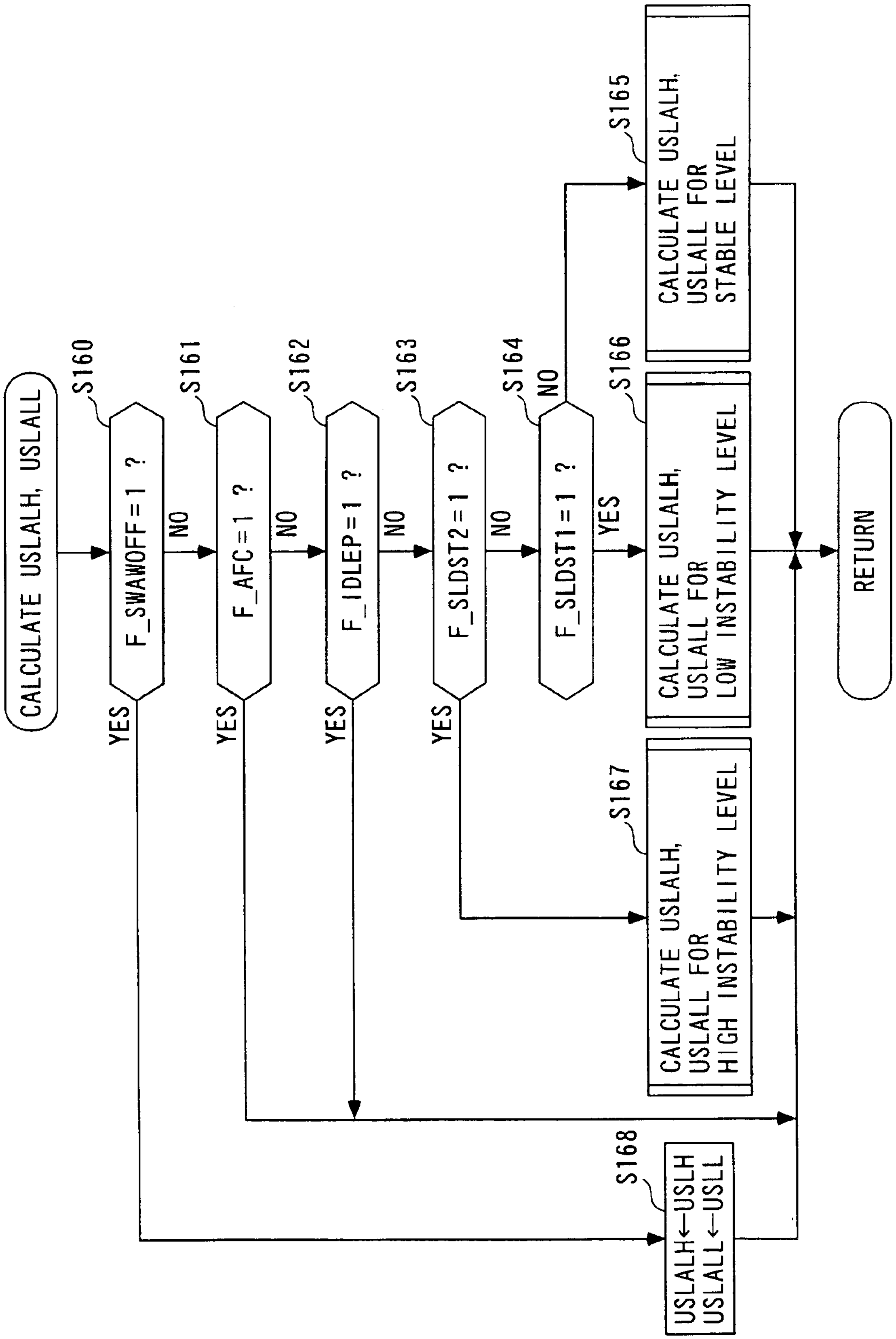
FIG. 24 is a flow chart illustrating a routine for calculating limited values USLALH, USLALL for adaptive upper and lower limit values at step 140 in FIG. 23.

Referring next to FIGS. 23 and 24, description will be made on a routine for calculating the aforementioned limit values at step 113. First, in this routine, the ECU 2 first calculates limited values USLALH, USLALL for the adaptive upper and lower limit values, respectively, at step 140.

As illustrated in FIG. 24, in this routine, it is determined at step 160 whether or not a limit processing off flag F_SWAWOFF is "1." This limit processing off flag F_SWAWOFF is set to "1" when the ECU 2 is not in a operating condition in which it cannot execute the limit processing, and otherwise to "0." If the result of the determination at step 160 is NO, indicating that the ECU 2 is in an operating condition in which it can execute the limit processing, the routine proceeds to step 161, where it is determined whether or not the post-F/C determination flag F_AFC is "1."

If the result of the determination at step 161 is NO, indicating that the predetermined time TM_AFC has elapsed after the end of a fuel cut operation, the routine proceeds to step 162, where it is determined whether or not the idle operation flag F_IDLEP is "1."

If the result of the determination at step 162 is NO, indicating that the engine 3 is not in idle operation, the routine proceeds to step 163, where it is determined whether or not the high instability flag F_SLDST2 is "1." If the result of the determination at step 163 is NO, indicating that the sliding mode control is not at a high instability level, the routine proceeds to step 164, where it is determined at step 164 whether or not the low instability flag F_SLDST1 is "1."

If the result of the determination at step 164 is NO, indicating that the sliding mode control is at a stable level, the routine proceeds to step 165, where the ECU 2 calculates the limited values USLALH, USLALL for adaptive upper and lower limit values for the stable level in a manner described below, followed by termination of the routine for calculating the limit values.

Though not shown, at step 165, the ECU 2 calculates the limited values USLALH for the adaptive upper limit value based on the result of a comparison of the adaptive upper limit value USLAH stored in the RAM with rich side upper and lower limit values USLHH, USLLMTH for a predetermined stable level. Specifically, the ECU 2 sets the limited value USLALH for the adaptive upper limit value to the adaptive upper limit value USLAH when USL≦LMTH≦USLAHUSLHH; to the rich side upper limit value USLHH for the stable level when USLHH<USLAH; and to the rich side lower limit value USLLMTH for the stable level when USLAH<USLLMTH, respectively.

The ECU 2 also calculates the limited value USLALL for the adaptive lower limit value based on the result of a comparison of the adaptive lower limit value USLAL stored in the RAM with lean side upper and lower limit values USLLL, USLLMTL for a predetermined stable level. Specifically, the ECU 2 sets the limited value USLALL for the adaptive lower limit value to the adaptive lower limit value USLAL when USLLL≦USLAL≦USLLMTL; to the lean side upper limit value USLLMTL for the stable level when USLLMTL<USLAL; and to the lean side lower limit value USLL for the stable level when USLAL<USLLL.

On the other hand, if the result of the determination at step 164 is YES, indicating that the sliding mode control is at a low instability level, the routine proceeds to step 166, where the ECU 2 calculates limited values USLALH, USLALL for the adaptive upper and lower limit values for the low instability level in a manner described below, followed by termination of the routine for calculating the limit values.

Though not shown, at step 166, the ECU 2 calculates the limited value USLALH for the adaptive upper limit value based on the result of a comparison of the adaptive upper limit value USLAH with a rich side upper limit value USLH for a predetermined low instability level and the rich side lower limit value USLLMTH for the stable level. Specifically, the ECU 2 sets the limited value USLALH for the adaptive upper limit value to the adaptive upper limit value USLAH when USLLMTH≦USLAH≦USLH; to the rich side upper limit value USLH for the low instability level when USLH<USLAH; and to the rich side lower limit value USLLMTH for the stable level when USLAH<USLLMTH, respectively.

The ECU 2 also calculates the limited value USLALL for the adaptive lower limit value based on the result of a comparison of the adaptive lower limit value USLAL with the lean side upper limit value USLLMTL for the stable level and the lean side lower limit value USLL for a predetermined low instability level. Specifically, the ECU 2 sets the limited value USLALL for the adaptive lower limit value to the adaptive lower limit value USLAL when USLL≦USLAL≦USLLMTL; to the lean side upper limit value USLLMTL for the stable level when USLLMTL<USLAL; and to the lean side lower limit value USLL for the low instability level when USLAL<USLL, respectively.

On the other hand, if the result of the determination at step 163 is YES, indicating that the sliding mode contort is in a high instability level, the routine proceeds to step 167, where the ECU 2 calculates limited values USLALH, USLALL for adaptive upper and lower limit values for a high instability level in a manner described below, followed by termination of the routine for calculating the limit values.

Though not shown, at step 167, the ECU 2 calculates the limited value USLALH for the adaptive upper limit value based on the result of a comparison of the adaptive upper limit value USLAH with a rich side upper limit value USLSTBH for a predetermined high instability level and a rich side lower limit value USLLMTH for the stable level. Specifically, the ECU 2 sets the limited value USLALH for the adaptive upper limit value to the adaptive upper limit value USLAH when USLLMTH≦USLAH≦USLSTBH; to the rich side upper limit value USLSTBH for the high instability level when USLSTBH<USLAH; and to the rich side lower limit value USLLMTH for the stable level when USLAH<USLLMTH, respectively.

The ECU 2 also calculates the limited value USLALL for the adaptive lower limit value based on the result of a comparison of the adaptive lower limit value USLAL with the lean side upper limit value USLLMTL for the stable level and a lean side lower limit value USLSTBL for a predetermined high instability level. Specifically, the ECU 2 sets the limited value USLALL for the adaptive lower limit value to the adaptive lower limit value USLAL when USLSTBL≦USLAL≦USLLMTL; to the lean side upper limit value USLLMTL for the stable level when USLLMTL<USLAL; and to the lean side lower limit value USLSTBL for the high instability level when USLAL<USLSTBL, respectively.

A variety of the foregoing upper and lower limit values used in the calculation of the limited value USLALH for the adaptive upper limit value are set to satisfy the relationship USLLMTH≦USLSTBH USLH≦USLHH, whereas a variety of the foregoing upper and lower limit values used in the calculation of the limited value USLALL for the adaptive lower limit value are set to satisfy the relationship USLLL≦USLL≦USLSTBL≦USLLMTL.

On the other hand, if the result of the determination at step 161 or 162 is YES, i.e., when the predetermined time TM_AFC has not elapsed after the end of the fuel cut operation, or when the engine 3 is in idle operation, the routine for calculating the limit values is terminated without further processing.

On the other hand, if the result of the determination at step 160 is YES, indicating that the ECU 2 is not in an operating condition in which it can execute the limit processing, the routine proceeds to step 168, where the ECU 2 sets the limited values USLALH, USLALL for the adaptive upper and lower limit values to the rich side upper limit value USLH for the low instability level and the lean side lower limit value USLL for the low instability level, respectively, followed by termination of the routine for calculating the limit values.

Turning back to FIG. 23, at step 141 subsequent to step 140, it is determined whether or not the limit processing off flag F_SWAWOFF is "1." If the result of the determination at step 141 is NO, indicating that the ECU 2 is in an operating condition in which it can execute the limit processing, the routine proceeds to step 142, where it is determined whether or not the post-F/C determination flag F_AFC is "1."

If the result of the determination at step 142 is NO, indicating that the predetermined time TM_AFC has elapsed after the end of a fuel cut operation, the routine proceeds to step 143, where it is determined whether or not the idle operation flag F_IDLEP is "1." If the result of the determination at step 143 is NO, indicating that the engine 3 is not in idle operation, the routine proceeds to step 144, where it is determined whether or not the second launch flag F_VST is "1."

If the result of the determination at step 144 is NO, indicating that the second launch mode is terminated, i.e., the second predetermined time TVST has elapsed after the vehicle has launched, the routine proceeds to step 145, where the ECU 2 sets the upper and lower limit values USLAHF, USLALF for non-idle operation to the limited values USLALH, USLALL for the adaptive upper and lower limit values calculated at step 140, respectively, followed by termination of the routine for calculating the limit values.

On the other hand, if the result of the determination at step 144 is YES, indicating that the engine 3 is in the second launch mode, the routine proceeds to step 146, where the ECU 2 sets the upper limit value USLAHF for non-idle operation to the limited value USLALH for the adaptive upper limit value calculated at step 140, and the lower limit value USLALF for non-idle operation to a predetermined lower limit value USLVST for the second launch mode, respectively, followed by termination of the routine for calculating the limit values.

On the other hand, if the result of the determination at step 143 is YES, indicating that the engine 3 is in idle operation, the routine proceeds to step 147, where it is determined whether or not the high instable flag F_SLDST2 is "1." If the result of the determination at step 143 is NO, indicating that the sliding mode control is not at the high instability level, the routine proceeds to step 148, where the ECU 2 sets the upper and lower limit values USLAHFI, USLALFI for idle operation to upper and lower limit values USLHI, USLLI for stable level during a predetermined idle operation, respectively, followed by termination of the routine for calculating the limit values.

On the other hand, if the result of the determination at step 147 is YES, indicating that the sliding mode control is at the high instability level, the routine proceeds to step 149, where the ECU 2 sets the upper and lower limit values USLAHFI, USLALFI for idle operation to upper and lower limit values USLSTBHI, USLSTBLI for the high instability level during a predetermined idle operation, respectively, followed by termination of the routine for calculating the limit values.

Turning back to step 142, if the result of the determination is YES, indicating that the predetermined time TM_AFC has not elapsed after the end of the fuel cut operation, the routine proceeds to step 150, wherein the ECU 2 sets the upper limit value USLAHF for non-idle operation to an upper limit value USLAFC for predetermined post-idle; the lower limit value USLALF for non-idle operation to the limited value USLALL for the adaptive lower limit value calculated at step 140; the upper limit value USLAH for idle operation to the upper limit value USLAFC for post-idle; and the lower limit value USLALFI for idle operation to the lower limit value USLLI for the stable level during the idle operation, respectively, followed by termination of the routine for calculating the limit values.

Turning back to step 141, if the result of the determination is YES, indicating that the ECU 2 is not in an operating condition in which it can execute the limit processing, the routine proceeds to step 151, where the ECU 2 sets the upper and lower limit values USLAHF, USLALF for non-idle operation to the rich side upper limit value USLH for the low instability level and the lean side lower limit value USLL for the low instability level, respectively, and simultaneously sets the upper and lower limit values USLAHFI, USLALFI for idle operation to the upper and lower limit values USLHI, USLLI for the stable level during the idle operation, respectively, followed by termination of the routine for calculating the limit values.

Figure 25:
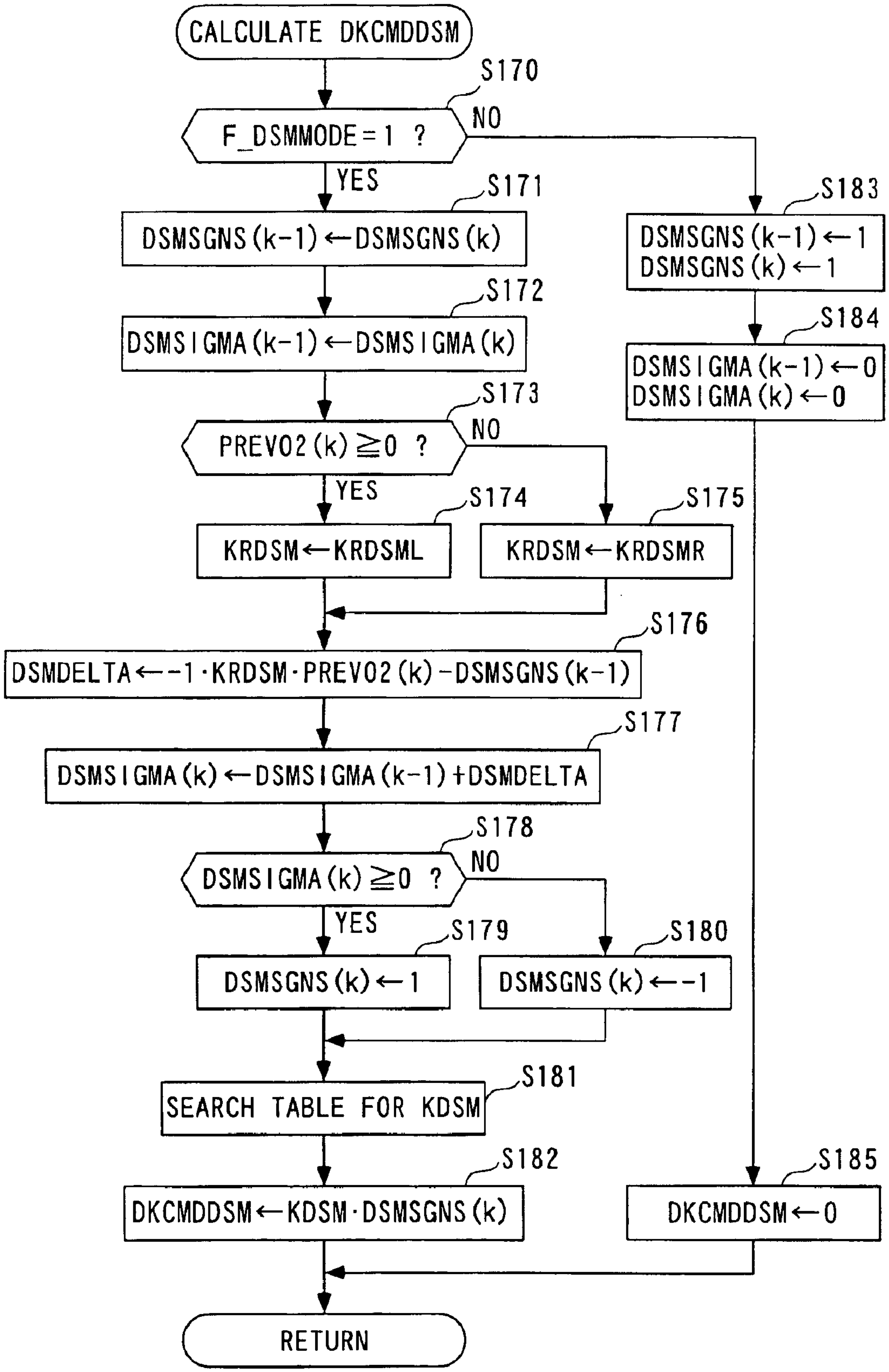
FIG. 25 is a flow chart illustrating a routine for calculating a ΔΣ modulation control amount DKCMDDSM at step 39 in FIG. 14.

Referring next to FIG. 25, description will be made on a routine for calculating the ΔΣ modulation control amount DKCMDDSM at the aforementioned step 39 in FIG. 14. As illustrated, at step 170, it is first determined whether or not the ADSM mode flag F_DSMMODE is "1." If the result of the determination at step 170 is YES, indicating that the engine 3 is in an operating condition in which it should execute the ADSM processing, the routine proceeds to step 171, where the ECU 2 sets a current value DSMSGNS(k) [=u(k)] of a DSM signal value calculated in the preceding loop, which is stored in the RAM, as the preceding value DSMSGNS(k−1) [=u(k−1)].

Next, the routine proceeds to step 172, where the ECU 2 sets a current value DSMSIGMA(k) [=$\sigma_d$(k)] of a deviation integrated value calculated in the preceding loop and stored in the RAM as the preceding value DSMSIGMA(k−1) [=$\sigma_d$(k−1)].

Next, the routine proceeds to step 173, where it is determined whether or not the predicted value PREVO2(k) of the output deviation is equal to or larger than zero. If the result of the determination at step 173 is YES, the routine proceeds to step 174, where a non-linear gain KRDSM (=$G_d$) for reference signal value is set to a leaning coefficient KRDSML (=$G_d$1), on the assumption that the engine 3 is in an operating mode in which the air/fuel ratio of the air-fuel mixture should be changed to be leaner. Then, the routine proceeds to step 176, later described.

On the other hand, if the result of the determination at step 173 is NO, the routine proceeds to step 175, where the non-linear gain KRDSM for reference signal value is set to an enriching coefficient KRDSMR (=$G_d2>G_d1$), larger than the leaning coefficient KRDSML, on the assumption that the engine 3 is in an operating mode in which the air/fuel ratio of the air-fuel mixture should be changed to be richer. Then, the routine proceeds to step 176.

The non-linear gain KRDSM is set to the leaning coefficient KRDSML and the enriching coefficient KRDSMR (>KRDSML) different from each other in accordance with the predicted value PREVOS2(k), as described above, for the reason set forth below. For changing the air/fuel ratio of the air/fuel mixture to be leaner, the leaning coefficient KRDSML is set to a value smaller than the enriching coefficient KRDSMR to control the air/fuel ratio such that the output Vout of the O2 sensor 15 converges to the target value Vop slower than when the air/fuel ratio is changed to be richer, thereby preventing the upstream end of the catalyst in the first catalyzer 8*a* from being excessively leaner to improve the NOx purification percentages of the first and second catalyzers 8*a*, 8*b*. On the other hand, for changing the air/fuel ratio of the air/fuel mixture to be richer, the enriching coefficient KRDSMR is set to a value larger than the leaning coefficient KRDSML to control the air/fuel ratio such that the output Vout of the O2 sensor 15 converges to the target value Vop faster than when the air/fuel ratio is changed to be leaner, thereby rapidly eliminating a leaning atmosphere in the first and second catalyzers 8*a*, 8*b* to change the first and second catalyzers 8*a*, 8*b* to a an enriching atmosphere, with the intention that the NOx purification percentages of the first and second catalyzers 8*a*, 8*b* are rapidly recovered. In the foregoing manner, a high NOx purification percentages can be ensured in the first and second catalyzers 8*a*, 8*b* whenever the air/fuel ratio of the air/fuel mixture is changed to be either leaner or richer.

At step 176 subsequent to step 174 or 175, the ECU 2 sets a value calculated by subtracting the preceding value DSMSGNS(k−1) of the DSM signal value calculated at the aforementioned step 171 from the product of a value of −1, the non-linear gain KRDSM for reference signal value, and the current value PREVO2(k) of the predicted value [−1·KRDSM·PREVO2(k)−DSMSGNS(k−1)] as a deviation signal value DSMDELTA [=$\delta$(k)]. This setting corresponds to the aforementioned equations (19), (20).

Next, the routine proceeds to step 177, where the ECU 2 sets the current value DSMSIGMA(k) of the deviation integrated value to the sum of the preceding value DSMSIGMA(k−1) calculated at step 172 and the deviation signal value DSMDELTA calculated at step 176 [DSMSIGMA(k−1)+DSMDELTA]. This setting corresponds to the aforementioned equation (21).

Next, in a sequence of steps 178–180, the ECU 2 sets the current value DSMSGNS(k) of the DSM signal value to 1 when the current value DSMSIGMA(k) of the deviation integrated value calculated at step 177 is equal to or larger than zero, and sets the current value DSMSGNS(k) of the DSM signal value to −1 when the current value DSMSIGMA(k) of the deviation integrated value is smaller than zero. The setting in this sequence of steps 178–180 corresponds to the aforementioned equation (22).

Next, at step 181, the ECU 2 searches a table, not shown, for a gain KDSM (=$F_d$) for the DSM signal value in accordance with the exhaust gas volume AB_SV. In this table, the gain KDSM is set to a larger value as the exhaust gas volume AB_SV is smaller. This is because the responsibility of the output Vout of the O2 sensor 15 is degraded as the exhaust gas volume AB_SV is smaller, i.e., as the engine 3 is operating with a smaller load, so that the gain KDSM is set larger to compensate for the degraded responsibility of the output Vout.

The table for use in the calculation of the gain KDSM is not limited to the foregoing table which sets the gain KDSM in accordance with the exhaust gas volume AB_SV, but any table may be used instead as long as it previously sets the gain KDSM in accordance with a parameter indicative of an operating load of the engine 3 (for example, a basic fuel injection time Tim). Also, when a deterioration determining unit is provided for the catalyzers 8*a*, 8*b*, the gain DSM may be corrected to a smaller value as the catalyzers 8*a*, 8*b* are deteriorated to a higher degree, as determined by the deterioration determining unit. Further, the gain KDSM may be determined in accordance with the model parameters identified by the on-board identifier 23. For example, the gain KDSM may be set to a larger value as the inverse of the model parameter b1 (1/b1) is larger, in other words, as the model parameter b1 presents a smaller value.

Next, the routine proceeds to step 182, where the ECU 2 sets the ΔΣ modulation control amount DKCMDDSM to the product of the gain KDSM for DSM signal value and the current value DSMSGNS(k) of the DSM signal value [KDSM·DSMSGNS(k)], followed by termination of the routine for calculating the ΔΣ modulation control amount DKCMDDSM. The setting at step 182 corresponds to the aforementioned equation (23).

On the other hand, if the result of the determination at step 170 is NO, indicating that the engine 3 is not in an operating condition in which it should execute the ADSM processing, the routine proceeds to step 183, where the ECU 2 sets both the preceding value DSMSGNS(k−1) and the current value DSMSGNS(k) of the DSM signal value to 1.

Next, the routine proceeds to step 184, where the ECU 2 sets both the preceding value DSMSIGMA(k−1) and current value DSMSIGMA(k) of the integrated deviation value to 0. Then, the routine proceeds to step 185, where the ECU 2 sets the ΔΣ modulation control amount DKCMDDSM to 0, followed by termination of the routine for calculating the ΔΣ modulation control amount DKCMDDSM.

Figure 26:
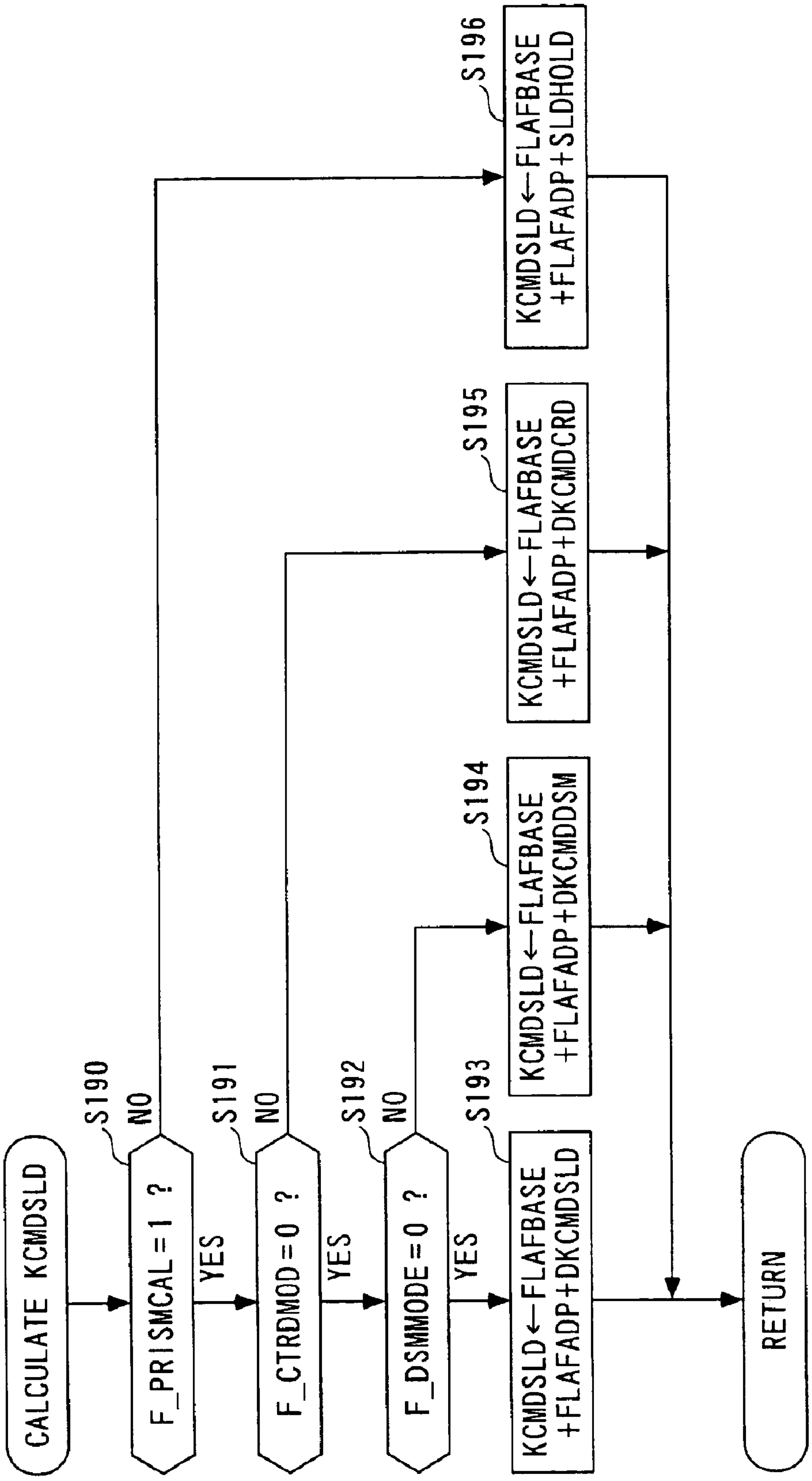
FIG. 26 is a flow chart illustrating a routine for calculating an adaptive target air fuel ratio KCMDSLD at step 40 in FIG. 14.

Referring next to FIG. 26, description will be made on a routine for calculating the adaptive target air/fuel ratio KCMDSLD at the aforementioned step 40 in FIG. 14. As illustrated, in this routine, it is first determined at step 190 whether or not the PRISM/ADSM execution flag F_PRISMCAL set at the aforementioned step 23 is "1."

If the result of the determination at step 190 is YES, the routine proceeds to step 191, where it is determined whether or not the catalyst reduction mode flag F_CTRMOD is "0." The catalyst reduction mode flag F_CTRMOD is set to "1" when the engine 3 is in an operating condition in which it should execute the catalyst reduction mode, and otherwise to "0."

If the result of the determination at step 191 is YES, indicating that the engine 3 is not in an operating condition in which the catalyst reduction mode should be executed, the routine proceeds to step 192, where it is determined whether or not the ADSM mode flag F_DSMMODE is "0."

If the result of the determination at step 192 is YES, indicating that the engine 3 is in an operating condition in which the adaptive target air/fuel ratio KCMDSLD should be calculated by the PRISM processing, the routine proceeds to step 193, where the ECU 2 sets the adaptive target air/fuel ratio KCMDSLD to the sum of the reference value FLAFBASE, adaptive correction term FLAFADP and sliding mode control amount DKCMDSLD [FLAFBASE+FLAFADP+DKCMDSLD], followed by termination of the routine for calculating the adaptive target air/fuel ratio KCMDSLD.

On the other hand, if the result of the determination at step 192 is NO, indicating that the engine 3 is in an operating condition in which the adaptive target air/fuel ratio KCMDSLD should be calculated by the ADSM processing, the routine proceeds to step 194, where the ECU 2 sets the adaptive target air/fuel ratio KCMDSLD to the sum of the reference value FLAFBASE, adaptive correction term FLAFADP and $\Delta\Sigma$ modulation control amount DKCMDDSM [FLAFBASE+FLAFADP+DKCMDDSM], followed by termination of the routine for calculating the adaptive target air/fuel ratio KCMDSLD.

On the other hand, if the result of the determination at step 191 is NO, indicating that the engine 3 is in an operating condition in which the catalyst reduction mode should be executed, the routine proceeds to step 195, where the ECU 2 sets the adaptive target air/fuel ratio KCMDSLD to the sum of the reference value FLAFBASE, adaptive correction term FLAFADP and catalyst reduction mode control amount DKCMDCRD [FLAFBASE+FLAFADP+DKCMDCRD], followed by termination of the routine for calculating the adaptive target air/fuel ratio KCMDSLD.

Turning back to step 190, if the result of the determination is NO, indicating that the engine 3 is in an operating condition in which either the PRISM processing, ADSM processing or catalyst reduction mode should not be executed, the routine proceeds to step 196, where the ECU 2 sets the adaptive target air/fuel ratio KCMDSLD to the sum of the reference value FLAFBASE, adaptive correction term FLAFADP and predetermined value SLDHOLD [FLAFBASE+FLAFADP+SLDHOLD], followed by termination of the routine for calculating the adaptive target air/fuel ratio KCMDSLD.

Figure 27:
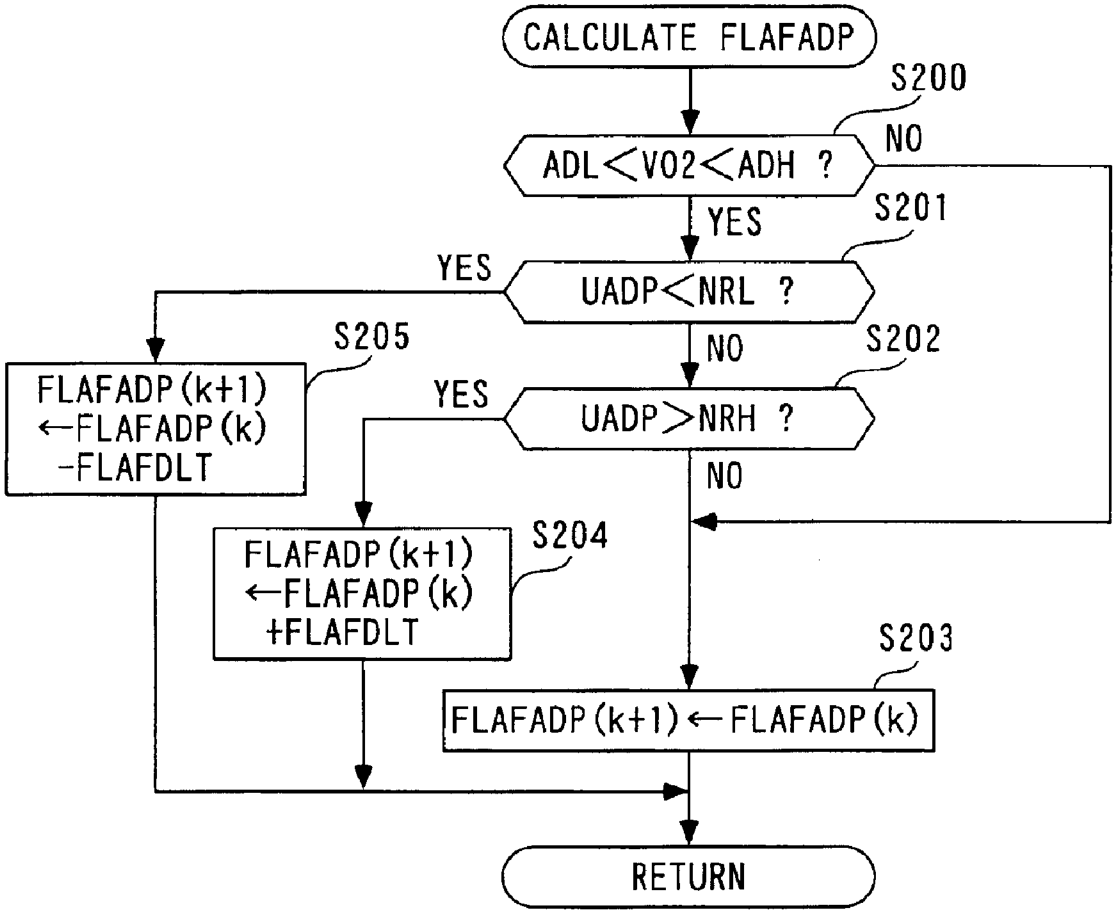
FIG. 27 is a flow chart illustrating a routine for calculating an adatpive correction term FLAFADP at step 41 in FIG. 14.

Referring next to FIG. 27, description will be made on a routine for calculating the adaptive correction term FLAFADP at the aforementioned step 41 in FIG. 14. This routine is provided for calculating the next value FLAFADP(k+1) for the adaptive correction term, which is used as the current value FLAFADP(k) in the next loop.

In this routine, it is first determined at step 200 whether or not the output deviation VO2 is within a predetermined range ($ADL<VO2<ADH$). If the result of the determination at step 200 is YES, i.e., when the output deviation VO2 is small so that the output Vout of the O2 sensor 15 is near the target value Vop, the routine proceeds to step 201, where it is determined whether or not the adaptive law input UADP is smaller than a predetermined lower limit value NRL.

If the result of the determination at step 201 is NO, indicating that $UADP \geqq NRL$, the routine proceeds to step 202, where it is determined whether or not the adaptive law input UADP is larger than a predetermined upper limit value NRH. If the result of the determination at step 202 is NO, indicating that $NRL \leqq UADP \leqq NRH$, the routine proceeds to step 203, where the ECU 2 sets the next value FLAFADP(k+1) for the adaptive correction term to the current value FLAFADP(k). In other words, the value of the adaptive correction term FLAFADP is held. Then, the routine for calculating the adaptive correction term FLAFADP is terminated.

On the other hand, if the result of the determination at step 202 is YES, indicating that $UADP>NRH$, the routine proceeds to step 204, where the ECU 2 sets the next value FLAFADP(k+1) for the adaptive correction term to the sum of the current value FLAFADP(k) and a predetermined update value FLAFDLT [FLAFADP(k)+FLAFDLT], followed by termination of the routine for calculating the adaptive correction term FLAFADP.

On the other hand, if the result of the determination at step 201 is YES, indicating that $UADP<NRL$, the routine proceeds to step 205, where the ECU 2 sets the next value FLAFADP(k+1) for the adaptive correction term to the resulting value of subtracting the predetermined update value FLAFDLT from the current value FLAFADP(k) [FLAFADP(k)−FLAFDLT], followed by termination of the routine for calculating the adaptive correction term FLAFADP.

Figure 28:
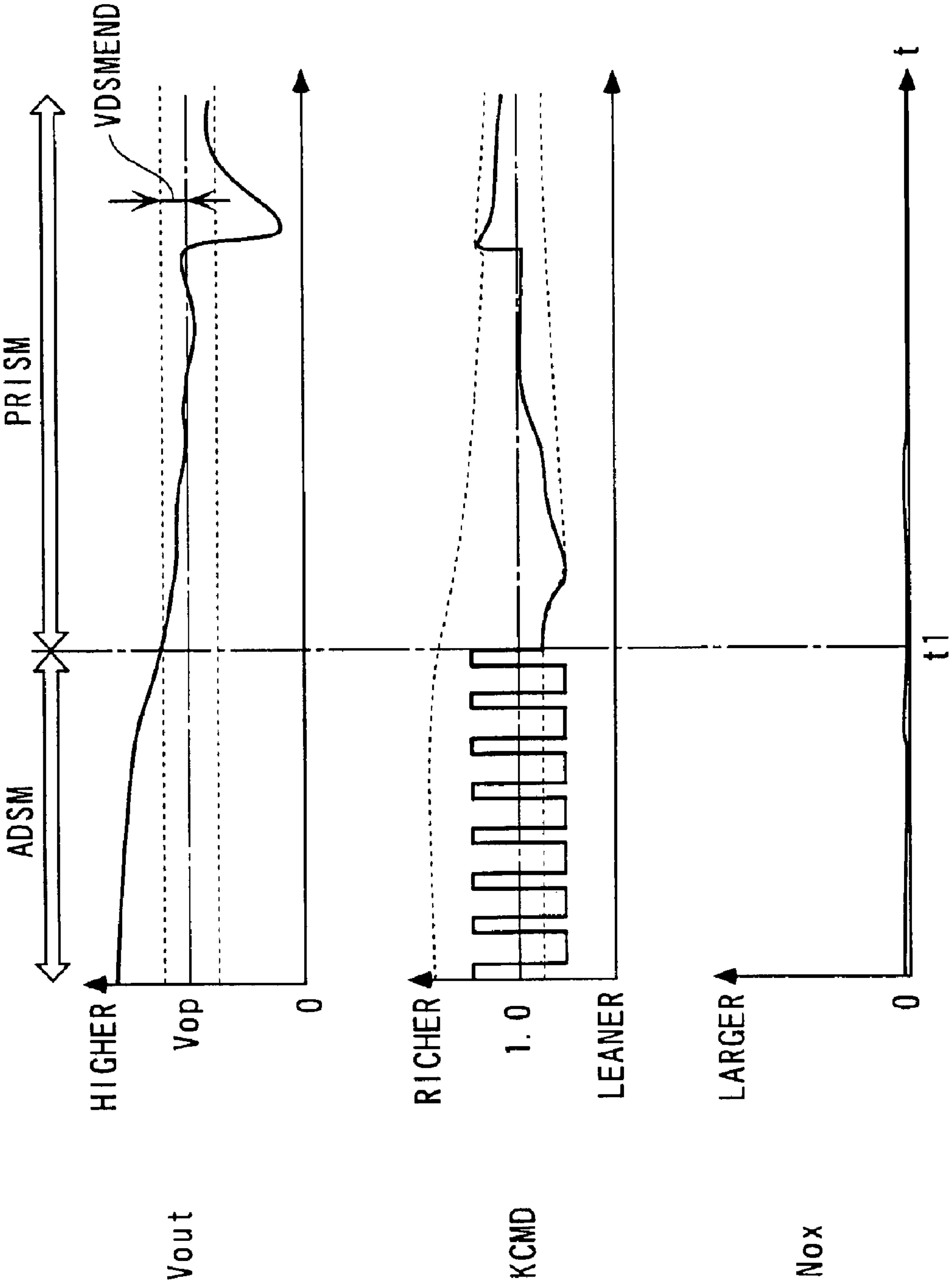
FIG. 28 is a timing chart showing an exemplary operation performed by the control apparatus of the present invention for controlling the air/fuel ratio.
Figure 29:
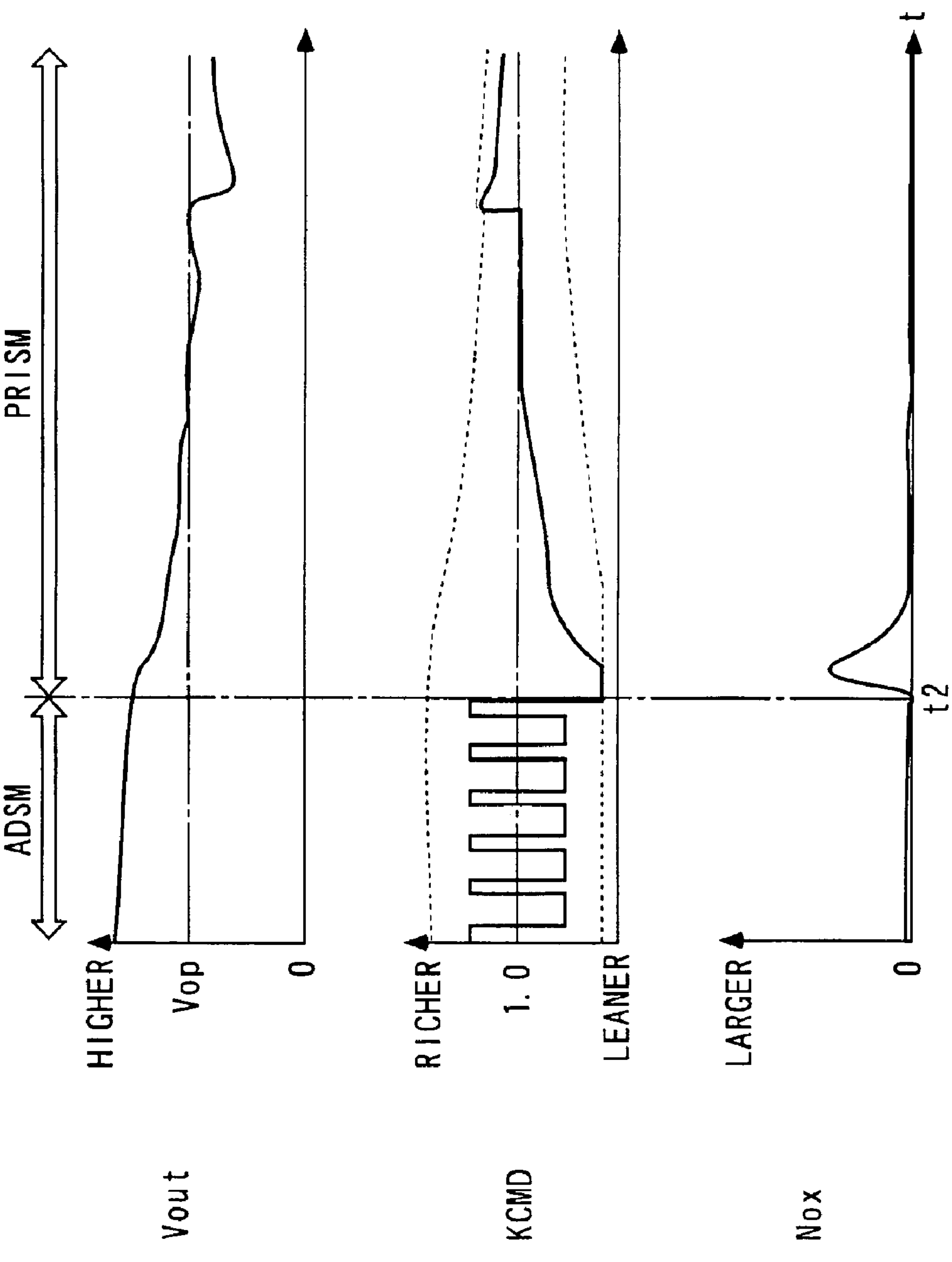
FIG. 29 is a timing chart showing a comparative example in regard to the air/fuel ratio control operation.

Referring next to FIGS. 28 and 29, description will be made on the operation which is performed when the calculation of the target air/fuel ratio KCMD is switched from the ADSM processing to the PRISM processing, where the output Vout of the O2 sensor 15 is larger or richer than the target value Vop in the control of the air/fuel ratio conducted in accordance with the respective control strategies described above. FIG. 28 illustrates an exemplary operation of the control apparatus 1 for controlling the air/fuel ratio according to the first embodiment, and FIG. 29 illustrates a comparative example of the operation in accordance with the PRISM processing which omits steps 74, 75, 122 and 123 for purposes of comparison. It should be noted that data shown in the two graphs are taken when the value of (FLAFBASE+FLAFADP) is set to 1.0 (the value of the equivalent ratio corresponding to the stoichiometric air/fuel ratio) for facilitating the understanding. Also, data on NOx shown in the two graphs are measured at a location downstream of the second catalyzer **8*b***.

First, in the comparative example, it can be seen in FIG. 29 that immediately after the calculation of the target air/fuel ratio is taken over from the ADSM processing to the PRISM processing (at time t2), the target air/fuel ratio KCMD suddenly swings to a leaner value than that calculated by the ADSM processing, and simultaneously, the amount of emitted NOx in exhaust gases temporarily proliferates, causing a temporary degradation of the NOx purification percentages provided by the catalyzers **8*a*, 8*b*. On the other hand, in the exemplary operation of the first embodiment shown in FIG. 28, it can be seen that when the calculation of the target air/fuel ratio is taken over from the ADSM processing to the PRISM processing (at time t1), the target air/fuel ratio KCMD does not swing to a value leaner than the leanest value calculated by the ADSM processing, and the amount of emitted NOx in exhaust gases does not either increase, thereby maintaining high NOx purification percentages provided by the catalyzers 8*a*, 8*b***. Such benefits are justified in the following manner.

As described above, in the air/fuel ratio control according to the first embodiment, when the output Vout of the O2 sensor 15 is larger than the target value Vop, i.e., when the predicted value PREVOS is equal to or larger than zero (PREVO20) in the calculation of the target air/fuel ratio KCMD by the ADSM processing, the non-linear gain KRDSM is set to a value KRDSML smaller than when PREVO2<0 to control the air/fuel ratio of the air/fuel mixture to be leaner, wherein the O2 sensor 15 is controlled such that its output Vout slowly converges to the target value Vop, thereby preventing the upstream end of the catalyst in the first catalyzer 8*a* from being excessively leaner. On the other hand, the PRISM processing calculates the target air/fuel ratio KCMD such that the output Vout of the O2 sensor 15 rapidly converges to the target value Vop.

Therefore, as the ADSM processing is taken over to the PRISM processing when the output Vout of the O2 sensor 15 is far richer than the target value Vop, as is the case in the comparative example, the PRISM processing calculates the target air/fuel ratio KCMD which causes the output Vout of the O2 sensor 15 to rapidly converge to the target value Vop, i.e., an excessively leaner value, resulting in an excessively lean upstream end of the catalyst in the first catalyzer 8*a*, and a consequent degradation in the NOx purification percentage.

On the contrary, the control apparatus 1 of the first embodiment switches from the ADSM processing to the PRISM processing at steps 74, 75 and step 192 in FIG. 26 when the absolute value of the preceding predicted value PREVO2 (value calculated in the preceding loop) is equal to or less than the predetermined value VDSMEND, i.e., when the output Vout of the O2 sensor 15 approaches the target value Vop, thereby suppressing a step (sudden change) in the target air/fuel ratio KCMD before and after the switching.

In addition, the sliding mode control amount DKCMDSLD is set to the predetermined value SLDHOLD at step 122 to prevent the target air/fuel ratio KCMD from being an excessively lean value immediately after the switching from the ADSM processing to the PRISM processing. Further, since the adaptive lower limit value USLAL is set to the predetermined initial value USLLCRD at step 123, the lower limit value USLALF for non-idle operation for defining a lower limit (i.e., a limit on the lean side) of an allowable range for the sliding mode control amount DKCMDSLD is set to this initial value USLLCRD in the calculation of limit values at step 113
immediately after the switching from the ADSM processing to the PRISM processing, and subsequently calculated based on this value. In this way, the sliding mode control amount DKCMDSLD is limited such that the target air/fuel ratio KCMD is not changed to be extremely lean in an initial stage of the switching from the ADSM processing to the PRISM processing. Therefore, unlike the comparative example, the control apparatus 1 of the first embodiment prevents the upstream end of the catalyst in the first catalyzer 8*a* from being extremely lean to maintain high NOx purification percentages of the catalyzers 8*a*, 8*b*, as shown in FIG. 28.

As described above, since the control apparatus 1 of the first embodiment switches from the ADSM processing to the PRISM processing when the absolute value of the preceding predicted value PREVO2 is equal to or less than the predetermined value VDSMEND, it is possible to suppress a step in the target air/fuel ratio KCMD before and after the switching. In addition, the control apparatus 1 sets the sliding mode control amount DKCMDSLD to the predetermined value SLDHOLD at all times and the adaptive lower limit value USLAL to the predetermined initial value USLLCRD at all times except for the PRISM processing, so that the target air/fuel ratio KCMD can be controlled not to be extremely lean immediately after the switching from the ADSM processing to the PRISM processing and in an initial stage of the switching. As a result, it is possible to prevent the upstream end of the catalyst in the first catalyzer 8*a* from being extremely lean, thus maintaining high NOX purification percentages of the catalyzers 8*a*, 8*b*.

Figure 30:
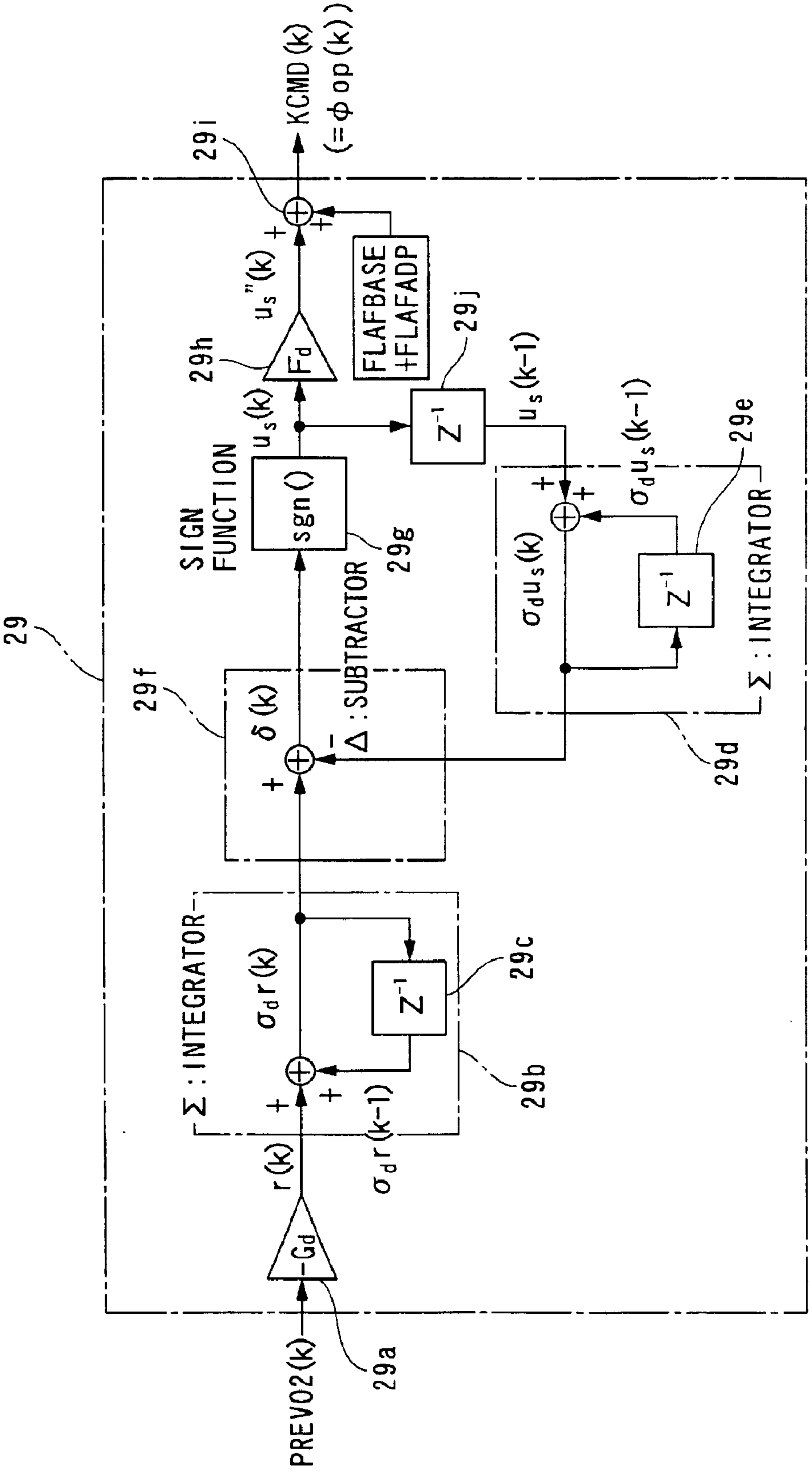
FIG. 30 is a block diagram illustrating the configuration of an SDM controller in a control apparatus according to a second embodiment.

Referring next to FIG. 30, description will be made on a control apparatus according to a second embodiment. The control apparatus 201 in the second embodiment differs from the control apparatus 1 in the first embodiment only in that an SDM controller 29 is used instead of the DSM controller 24. The SDM controller 29 calculates the target air/fuel ratio KCMD(k) as the control input $\phi op(k)$ in accordance with a control algorithm which applies the ΣΔ modulation algorithm based on the predicted value PREVO2 (k).

Specifically, in the SDM controller 29 illustrated in FIG. 30, an inverting amplifier 29*a* generates a reference signal r(k) as the product of the value of −1, gain $G_d$ for reference signal, and predicted value PREVO2(k). Next, an integrator 29*b* generates a reference signal integrated value $\sigma_d r(k)$ as the sum of a reference signal integrated value $\sigma_d r(k-1)$ delayed by a delay element 29*c* and the reference signal r(k). On the other hand, an integrator 29*d* generates an SDM signal integrated value $\sigma_d u_s(k)$ as the sum of an SDM signal integrated value $\sigma_d u_s(k-1)$ delayed by a delay element 29*e*, and an SDM signal $u_s(k-1)$ delayed by a delay element 29*j*. Then, a subtractor 29*f* generates a deviation signal δ(k) of the SDM signal integrated value $\sigma_d u_s(k)$ from the reference signal integrated value $\sigma_d r(k)$.

Next, a quantizer 29*g* (sign function) generates an SDM signal $u_s(k)$ as the sign of the deviation signal δ(k). Then, an amplifier 29*h* generates an amplified SDM signal $u_s$"k) by amplifying the SDM signal $u_s(k)$ by a predetermined gain $F_d$. Then, an adder 29*i* generates the target air/fuel ratio KCMD(k) as the sum of the amplified SDM signal $u_s''(k)$, a reference value FLAFBASE and adaptive correction term FLAFADP.

The foregoing control algorithm of the SDM controller 29 is expressed by the following equations (37)–(43):

$$r(k)=-1\cdot G_d\cdot PREVO2(k) \qquad (37)$$

$$\sigma_d r(k)=\sigma_d r(k-1)+r(k) \qquad (38)$$

$$\sigma_d u_s(k)=\sigma_d u_s(k-1)+u_s(k-1) \qquad (39)$$

$$\delta(k)=\sigma_d r(k)-\sigma_d u_s(k) \qquad (40)$$

$$u_s(k)=sgn(\delta(k)) \qquad (41)$$

$$u_s''(k)=F_d\cdot u_s(k) \qquad (42)$$

$$KCMD(k)=FLAFBASE+FLAFADP+u_s''(k) \qquad (43)$$

where $F_d$ represents a gain. The value of the non-linear gain $G_d$ is set to a predetermined positive value $G_d1$ (for example, 0.2) when PREVOS2(k) is equal to or larger than zero (PREVOS(k)≧0), and to a predetermined value $G_d2$ (for example, two) larger than the predetermined value $G_d1$ when PREVOS(k) is smaller than zero (PREVOS(k)<0). The sign function sgn(δ(k)) takes the value of 1 (sgn(δ(k))=1) when δ(k)≧0, and −1 (sgn(δ(k))=−1) when δ(k)<0 (alternatively, sgn(δ(k)) may be set to 0 (sgn(δ(k)=0) when δ(k)=0).

The ΣΔ modulation algorithm in the control algorithm of the SDM controller 29 is characterized in that the SDM signal $u_s(k)$ can be generated (calculated) such that the reference signal r(k) is reproduced at the output of the controlled object when the SDM signal $u_s(k)$ is inputted to the control object, as is the case with the aforementioned ΔΣ modulation algorithm. In other words, the SDM controller 29 has the characteristic of generating the target air/fuel ratio KCMD(k) as the control input similar to the aforementioned DSM controller 24. Therefore, the control apparatus 201 according to the second embodiment, which utilizes the SDM controller 29, can provide similar advantages to the control apparatus 1 according to the first embodiment. Though no specific program is shown for the SDM controller 29, such a program may be organized substantially similar to the DSM controller 24.

Figure 31:
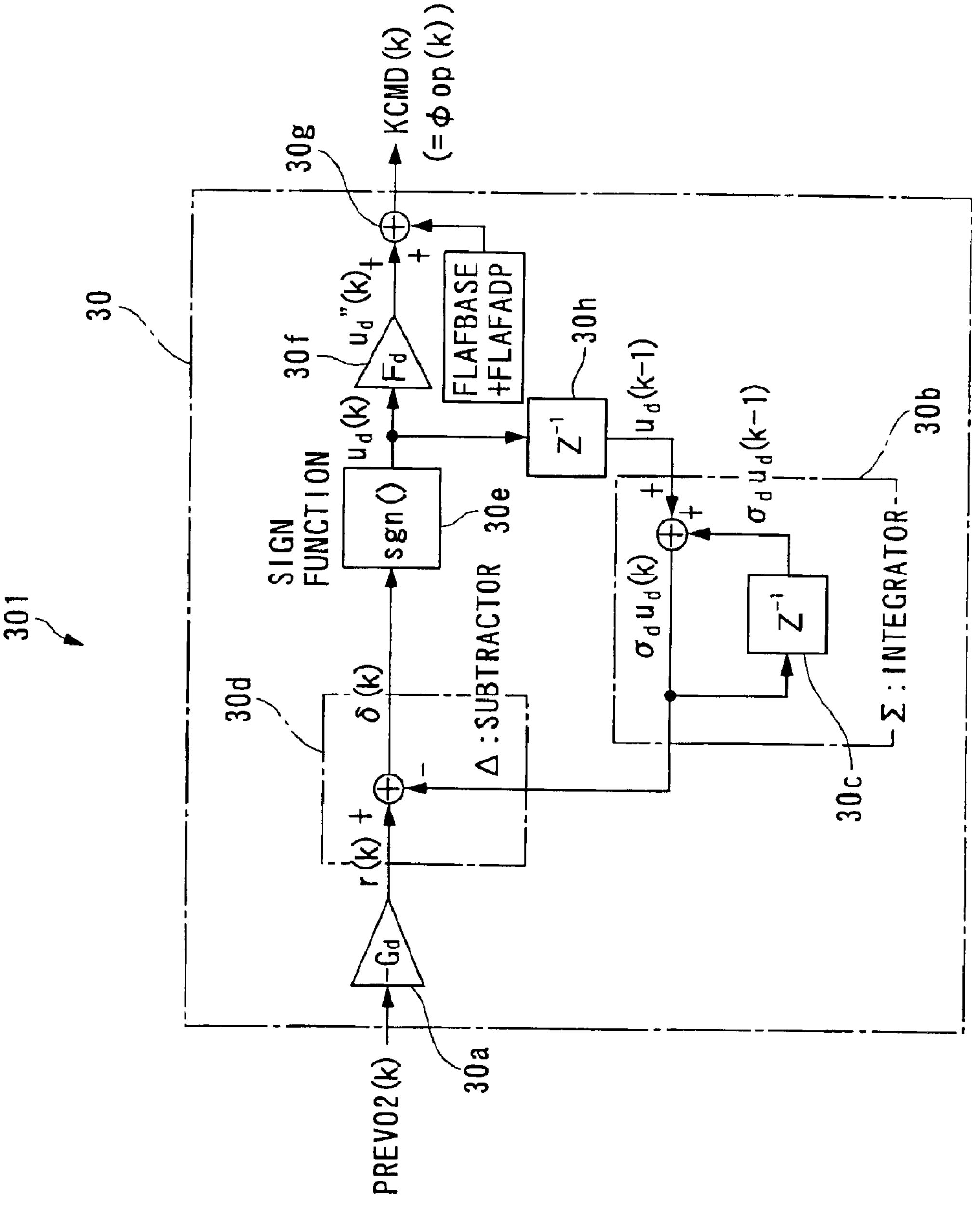
FIG. 31 is a block diagram illustrating the configuration of a DM controller in a control apparatus according to a second embodiment.

Referring next to FIG. 31, description will be made on a control apparatus according to a third embodiment of the present invention. The control apparatus 301 according to the third embodiment differs from the control apparatus 1 according to the first embodiment only in that a DM controller 30 is used in place of the DSM controller 24. The DM controller 30 calculates the target air/fuel ratio KCMD(k) as the control input ϕop(k) in accordance with a control algorithm which applies a Δ modulation algorithm based on the predicted value PREVO2(k).

Specifically, as illustrated in FIG. 30, in the DM controller 30, an inverting amplifier 30*a* generates the reference signal r(k) as the product of the value of −1, gain $G_d$ for reference signal, and predicted value PREVO2(k). An integrator 30*b* generates a DM signal integrated value $\delta_d u_d(k)$ as the sum of a DM signal integrated value $\delta_d u_d(k-1)$ delayed by a delay element 30*c* and a DM signal $u_d(k-1)$ delayed by a delay element 30*h*. Then, a subtractor 30*d* generates a deviation signal δ(k) of the DM signal integrated value $\delta_d u_d(k)$ from the reference signal r(k).

Next, a quantizer 30*e* (sign function) generates a DM signal $u_d(k)$ as a sign of the deviation signal δ(k). Then, an amplifier 30*f* generates an amplified DM signal $u_d''(k)$ by amplifying the DM signal $u_d(k)$ by a predetermined gain $F_d$. Next, an adder 30*g* generates the target air/fuel ratio KCMD (k) as the sum of the amplified DM signal $u_d''(k)$ and the predetermined reference value FLAFBASE.

The foregoing control algorithm of the DM controller 30 is expressed by the following equations (44)–(49):

$$r(k)=-1\cdot G_d\cdot PREVO2(k) \quad (44)$$

$$\sigma_d u_d(k)=\sigma_d u_d(k-1)+u_d(k-1) \quad (45)$$

$$\delta(k)=r(k)-\sigma_d u(k) \quad (46)$$

$$u_d(k)=sgn(\delta(k)) \quad (47)$$

$$u_d''(k)=F_d\cdot u_d(k) \quad (48)$$

$$KCMD(k)=FLAFBASE+FLAFADP+u_d''(k) \quad (49)$$

where $F_d$ represents a gain. The value of the non-linear gain $G_d$ is set to a predetermined positive value $G_d1$ (for example, 0.2) when PREVOS2(k) is equal to or larger than zero (PREVOS(k)≧0), and to a predetermined value $G_d2$ (for example, two) larger than the predetermined value $G_d1$ when PREVOS(k) is smaller than zero (PREVOS(k)<0). The sign function sgn(δ(k)) takes the value of 1 (sgn(δ(k))=1) when δ(k)≧0, and −1 (sgn(δ(k))=−1) when δ(k)<0 (alternatively, sgn(δ(k) may be set to 0 (sgn(δ(k)=0)) when δ(k)=0).

The foregoing control algorithm for the DM controller 30, i.e., the Δ modulation algorithm is characterized in that the DM signal $u_d(k)$ can be generated (calculated) such that the reference signal r(k) is reproduced at the output of the controlled object when the DM signal $u_d(k)$ is inputted to the controlled object, as is the case with the aforementioned ΔΣ modulation algorithm and ΣΔ modulation algorithm. In other words, the DM controller 30 has the characteristic of generating the target air/fuel ratio KCMD(k) as the control input similar to the aforementioned DSM controller 24 and SDM controller 29. Therefore, the control apparatus 301 according to the third embodiment, which utilizes the DM controller 30, can provide similar advantages to the control apparatus 1 according to the first embodiment. Though no specific program is shown for the DM controller 30, such a program may be organized substantially similar to the DSM controller 24.

It should be understood that while the respective embodiments have illustrated exemplary configurations in which the control apparatus according to the present invention controls the air/fuel ratio for the internal combustion engine 3 for use in a vehicle, the present invention is not limited to this particular configuration but may be widely applied to control apparatuses for controlling other arbitrary controlled objects, for example, for controlling the air/fuel ratio of an internal combustion engine for shipping or for controlling other industrial devices. Also, the ADSM controller 20 and PRISM controller 21 may be implemented by an electric circuit instead of the programs as shown in the embodiment.

As described above, the control apparatus according to the present invention controls a controlled object such that its output converges to a target value by switching from the control processing based on one of a Δ modulation algorithm, a ΔΣ modulation algorithm and a ΣΔ modulation algorithm, to the control processing based on a response specified control algorithm, and vice versa, wherein the control apparatus is capable of eliminating a step in a control input before and after the switching from one control processing to the other to avoid a sudden change in the output of the controlled object upon such switching.

What is claimed is:

1. A control apparatus comprising:

deviation calculating means for calculating a deviation of an output of a controlled object from a predetermined target value;

first control input calculating means for calculating a control input to said controlled object for converging the output of said controlled object to said target value in accordance with the calculated deviation based on one modulation algorithm selected from a Δ modulation algorithm, a ΔΣ modulation algorithm, and a ΣΔ modulation algorithm;

second control input calculating means for calculating a control input to said controlled object for converging the output of said controlled object to said target value in accordance with the calculated deviation based on a response specified control algorithm;

detecting means for detecting a state of said controlled object;

selecting means for selecting one of said first and second control input calculating means in accordance with the detected state of said controlled object as control input calculating means; and switching means responsive to a change in said control input calculating means selected by said selecting means from one of said first and second control input calculating means to the other for switching from said one control input calculating means to said other control input calculating means when the calculated deviation falls within a predetermined range.

2. A control apparatus according to claim 1, wherein:

said second control input calculating means comprises a limiting means for setting said control input to a value within a predetermined allowable range in an initial stage of the switching from said first control input calculating means to said second control input calculating means.

3. A control method comprising the steps of:

calculating a deviation of an output of a controlled object from a predetermined target value;

calculating a first control input to said controlled object for converging the output of said controlled object to said target value in accordance with the calculated deviation based on one modulation algorithm selected from a Δ modulation algorithm, a ΔΣ modulation algorithm, and a ΣΔ modulation algorithm;

calculating a second control input to said controlled object for converging the output of said controlled object to said target value in accordance with the calculated deviation based on a response specified control algorithm;

detecting a state of said controlled object;

selecting one of said first and second control inputs in accordance with the detected state of said controlled object as a control input; and switching, in response to a change from one of said first and second control inputs to the other one, from said one control input to said other control input when the calculated deviation falls within a predetermined range.

4. A control method according to claim 3, wherein:

said step of calculating a second control input comprises the step of setting said control input to a value within a predetermined allowable range in an initial stage of the switching from said first control input to said second control input.

5. An engine control unit including a control program for causing a computer to calculate a deviation of an output of a controlled object from a predetermined target value; calculate a first control input to said controlled object for converging the output of said controlled object to said target value in accordance with the calculated deviation based on one modulation algorithm selected from a Δ modulation algorithm, a ΔΣ modulation algorithm, and a ΣΔ modulation algorithm; calculate a second control input to said controlled object for converging the output of said controlled object to said target value in accordance with the calculated deviation based on a response specified control algorithm; detect a state of said controlled object; select one of said first and second control inputs in accordance with the detected state of said controlled object as a control input; and switch, in response to a change from one of said first and second control inputs to the other one, from said one control input to said other control input when the calculated deviation falls within a predetermined range.

6. An engine control unit according to claim 5, wherein said control program further causes the computer to set said control input to a value within a predetermined allowable range in an initial stage of the switching from said first control input to said second control input.

* * * * *